US008055258B2

(12) United States Patent
Hwang et al.

(10) Patent No.: US 8,055,258 B2
(45) Date of Patent: Nov. 8, 2011

(54) ROAMING SERVICE METHOD IN A MOBILE BROADCASTING SYSTEM, AND SYSTEM THEREOF

(75) Inventors: Sung-Oh Hwang, Yongin-si (KR); Jong-Hyo Lee, Pyeongtaek-si (KR); Kook-Heui Lee, Yongin-si (KR); Byung-Rae Lee, Seoul (KR); Jae-Kwon Oh, Seoul (KR); Bo-Sun Jung, Seongnam-si (KR); Jai-Yong Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 675 days.

(21) Appl. No.: 11/581,057

(22) Filed: Oct. 16, 2006

(65) Prior Publication Data
US 2007/0093202 A1    Apr. 26, 2007

(30) Foreign Application Priority Data

| Oct. 14, 2005 | (KR) | 10-2005-0097241 |
| Nov. 7, 2005 | (KR) | 10-2005-0106213 |
| Apr. 20, 2006 | (KR) | 10-2006-0035949 |

(51) Int. Cl.
    *H04W 4/00* (2009.01)
(52) U.S. Cl. .......... 455/432.1; 455/432.2; 455/3.06
(58) Field of Classification Search ........... 455/432.1, 455/432.2
See application file for complete search history.

(56) References Cited

U.S. PATENT DOCUMENTS

| 5,960,365 A | 9/1999 | Leih et al. |
| 7,260,409 B2 * | 8/2007 | Hanson ............ 455/456.1 |
| 2004/0158618 A1 * | 8/2004 | Shaw ................. 709/217 |
| 2005/0170842 A1 | 8/2005 | Chen .................. 455/454 |
| 2005/0193197 A1 * | 9/2005 | Patel et al. ............. 713/168 |
| 2006/0030312 A1 * | 2/2006 | Han et al. ............ 455/432.1 |
| 2006/0155995 A1 * | 7/2006 | Torvinen et al. ........... 713/169 |
| 2006/0270423 A1 * | 11/2006 | Hellgren ................ 455/461 |

FOREIGN PATENT DOCUMENTS

| EP | 1 538 861 A2 | 8/2005 |
| GB | 2 506 754 A | 4/2005 |
| JP | 2000-261575 | 9/2000 |

(Continued)

OTHER PUBLICATIONS

OMA (Open Mobile Alliance), "Mobile Broadcast Services Architecture", Clean Version 1.0, May 5, 2005, pp. 1-87.

(Continued)

*Primary Examiner* — Nimesh Patel
(74) *Attorney, Agent, or Firm* — Roylance, Abrams, Berdo & Goodman L.L.P.

(57) ABSTRACT

A roaming service method in a mobile broadcasting system and a system thereof are provided. A terminal receives a service guide from a corresponding visited service provider (Visited SP) when the terminal moves to a roaming area. The terminal transmits a roaming request message for requesting a purchase item allowable for individual services to a home service provider (Home SP) based on the received service guide. Upon receipt of the roaming request message, the Home SP negotiates roaming availability and allowable scope for each individual service with the Visited SP where the terminal is located, based on the roaming request message. The Home SP transmits the roaming availability and allowable scope for the individual service, negotiated with the Visited SP, to the terminal.

18 Claims, 25 Drawing Sheets

FOREIGN PATENT DOCUMENTS

| | | |
|---|---|---|
| JP | 2001-285916 | 10/2000 |
| JP | 2004-007422 | 1/2004 |
| JP | 2004-166197 | 6/2004 |
| KR | 1020030001042 | 1/2003 |
| KR | 1020060043295 | 5/2006 |
| KR | 1020060087368 | 8/2006 |
| RU | 2121227 C1 | 10/1998 |
| RU | 2207726 C2 | 6/2003 |
| WO | WO 99/04514 | 1/1999 |
| WO | WO 03/063418 | 7/2003 |
| WO | WO 03/081937 | 10/2003 |
| WO | WO 2004/062304 | 7/2004 |
| WO | WO 2005/076641 | 8/2005 |
| WO | WO 2006/014076 A1 | 2/2006 |

OTHER PUBLICATIONS

OMA (Open Mobile Alliance), "Mobile Broadcast Services Architecture", Draft Version 1.0, May 5, 2005, pp. 80-82.

Anonymous, "Mobile Broadcast Services Requirements", Open Mobile Alliance, Draft Version 1.0, Oct. 29, 2004.

* cited by examiner

ROAMING SERVICE METHOD IN A MOBILE BROADCASTING SYSTEM, AND SYSTEM THEREOF

PRIORITY

This application claims the benefit under 35 U.S.C. §119 (a) of Korean Patent Applications filed in the Korean Intellectual Property Office on Oct. 14, 2005 and assigned Serial No. 2005-97241, filed in the Korean Intellectual Property Office on Nov. 7, 2005 and assigned Serial No. 2005-106213, and filed in the Korean Intellectual Property Office on Apr. 20, 2006 and assigned Serial No. 2006-35949, the entire disclosures of all of which are hereby incorporated by reference.

BACKGROUND OF THE INVENTION

1. Field of the Invention

The present invention relates generally to a mobile broadcasting system. More particularly, the present invention relates to a roaming service method in a mobile broadcasting system, and a system thereof.

2. Description of the Related Art

The mobile communication market continuously requires production of new services through recombination or integration of the existing technologies. Today, with the development of communication and broadcast technologies, the conventional broadcasting system or mobile communication system has reached a phase of providing broadcast services through portable terminals (or mobile terminals), such as mobile phone and personal digital assistant (PDA). Due to the latent and actual market needs and an increasing demand for multimedia services, service providers' intended strategies for providing new services such as broadcast service in addition to the existing voice service, and identified interests of Information Technology (IT) companies which are bolstering their mobile communication businesses to meet user's demands, convergence of the mobile communication service and the Internet Protocol (IP) now becomes a mainstream of development of a next generation mobile communication technologies.

Open Mobile Alliance (OMA), a group for studying the standard for interworking between individual mobile solutions, serves to define various application standards for mobile games and Internet services. Within the OMA working groups, Open Mobile Alliance Browser and Content Mobile Broadcast Sub Working Group (OMA BAC BCAST) currently makes research on technology for providing broadcast services using mobile terminals. A brief description will now be made of the mobile broadcasting system which is under discussion in OMA.

In a mobile broadcasting system, a mobile terminal desiring to receive a broadcast service should receive so-called service guide information containing description information for the service itself, billing information for the service, and information on a receiving method for the service. The mobile terminal receives the corresponding service using the service guide information.

A description of conventional technology and novel technology will be made herein based on OMA BCAST technology, which is one of mobile broadcasting technologies, by way of example.

FIG. 1 is a diagram illustrating a logical structure of an application layer and its lower transport layer for mobile broadcast service, established by a BCAST working group of OMA.

Logical entities shown in FIG. 1 will first be described in detail. A Content Creation (CC) 101 provides contents for BCAST service, and the contents may include the common broadcast service file, for example, movie, audio and video data. In addition, the Content Creation 101 generates a service guide and provides a BCAST Service Application (BSA) 102 with an attribute for the contents, used for determining a transport bearer where the service is to be transmitted. The BCAST Service Application 102 receives BCAST service data provided from the Content Creation 101, and handles the received data in the form appropriate for providing media encoding, content protection and interaction service. Further, the BCAST Service Application 102 provides an attribute for the contents provided from the Content Creation 101 to a BCAST Service Distribution/Adaptation (BSDA) 103 and a BCAST Subscription Management (BSM) 104.

The BCAST Service Distribution/Adaptation 103 performs such operations as file/streaming transmission, service collection, service protection, service guide generation/delivery, and service notification, using BCAST service data provided from the BCAST Service Application 102. In addition, the BCAST Service Distribution/Adaptation 103 adapts the service such that it should be suitable for a Broadcast Distribution System (BDS) 112.

The BCAST Subscription Management 104 prescribes such service as a subscription and billing-related function for a BCAST service user, prescribes information used for the BCAST service, and manages a terminal receiving the BCAST service by hardware or software.

A Terminal 105 receives such program resource information as a content/service guide and content protection, and provides a broadcast service to a user. A BDS Service Distribution (BDS-SD) 111 transmits a mobile broadcast service to a plurality of terminals through mutual communication with the Broadcast Distribution System 112 and an Interaction Network (IN) 113.

The Broadcast Distribution System 112 transmits mobile broadcast service through a broadcast channel. For example, the mobile broadcast service can include Multimedia Broadcast Multicast Service (MBMS) of 3rd Generation Project Partnership (3GPP), Broadcast Multicast Service (BCMCS) of 3rd Generation Project Partnership 2 (3GPP2), and DVB-Handheld (DVB-H) or Internet Protocol (IP)-based broadcast/communication network of Digital Video Broadcasting (DVB). The Interaction Network 113 provides an interaction channel. For example, the Interaction Network 113 can be a cellular network.

A description will now be made of reference points, which are connection paths between the logical entities. The reference point can have a plurality of interfaces according to purpose, and such an interface is used for communication between more than two logical entities for a specific purpose. A message format and protocol for this is applied.

BCAST-1 121 is a transmission path of content and content attribute, and BCAST-2 122 is a transmission path of content-protected or content-unprotected BCAST service, attribute of the BCAST service, and content attribute.

BCAST-3 123 is a transmission path of attribute of BCAST service, attribute of content, user preference and subscription information, user request, and response to the request. BCAST-4 124 is a transmission path of notification message, attribute used for service guide, and key used for content protection and service protection.

BCAST-5 125 is a transmission path of protected BCAST service, unprotected BCAST service, content-protected BCAST service, content-unprotected BCAST service, BCAST service attribute, content attribute, notification, service guide, security material such as Digital Right Management (DRM) Right Object (RO) and key value used for BCAST service protection, and all data and signals transmitted through a broadcast channel.

BCAST-6 126 is a transmission path of protected BCAST service, unprotected BCAST service, content-protected BCAST service, content-unprotected BCAST service, BCAST service attribute, content attribute, notification, service guide, security material such as DRM RO and key value used for BCAST service protection, and all data and signals transmitted through an interaction channel.

BCAST-7 127 is a transmission path of service provisioning, subscription information, device management, and user preference information transmitted through an interaction channel of control information related to reception of security material such as DRM RO and key value used for BCAST service protection.

BCAST-8 128 is a transmission path through which user data for BCAST service is interacted. BDS-1 129 is a transmission path of protected BCAST service, unprotected BCAST service, BCAST service attribute, content attribute, notification, service guide, and security material such as DRM RO and key value used for BCAST service protection.

BDS-2 130 is a transmission path of service provisioning, subscription information, device management, and security material such as DRM RO and key value used for BCAST service protection. X-1 131 is a reference point between the BDS Service Distribution 111 and the Broadcast Distribution System 112. X-2 132 is a reference point between the BDS Service Distribution 111 and the Interaction Network 113. X-3 133 is a reference point between the Broadcast Distribution System 112 and the Terminal 105. X-4 134 is a reference point between the BDS Service Distribution 111 and the Terminal 105 via the broadcast channel. X-5 135 is a reference point between the BDS Service Distribution 111 and the Terminal 105 via the interaction channel. X-6 136 is a reference point between the Interaction Network 113 and the Terminal 105.

FIG. 2 is a diagram illustrating a structure of a service guide used for receiving a broadcast service in a general mobile broadcasting system. This structure is proposed in OMA BAC BCAST to provide broadcast service to a mobile terminal. One service guide is composed of a plurality of fragments each having its own purpose, and the fragments are classified into 4 groups according to use, as shown in FIG. 2.

FIG. 2 illustrates an exemplary service guide composed of an Administrative group 200, a Provisioning group 210, a Core group 220, and an Access group 230. In FIG. 2, a solid line connecting the fragments means mutual reference between the fragments.

The Administrative group 200, a group for providing basic information needed by a mobile terminal to receive a service guide, includes a Service Guide Context fragment 201 and a Service Guide Delivery Descriptor fragment 202.

The Service Guide Context fragment 201 provides a service guide identifier (ID), identification information of the service provider that generated and transmitted the service guide, and the entire information on the service guide. The Service Guide Delivery Descriptor fragment 202 provides a channel capable of receiving a plurality of service guide fragments, scheduling information, and update information to a mobile terminal so that the mobile terminal may receive only the necessary service guide at an appropriate time.

The Provisioning group 210, a group for providing charging information for service reception, includes a Purchase Item fragment 211, a Purchase Data fragment 212, and a Purchase Channel fragment 213. The Purchase Item fragment 211 provides charging information for a service or a service bundle, the Purchase Data fragment 212 indicates actual price information for a purchase item, and the Purchase Channel fragment 213 provides information on the system where the service user can actually purchase the service, and a payment method.

The Core group 220, a group for providing information on the service itself, includes a Service fragment 221, a Schedule fragment 222, and a Content fragment 223. The Service fragment 221 provides a description of the service itself that the user will receive, and also provides information indicating with which content the service can be configured. The Schedule fragment 222 provides information on the time at which the service can be provided and used. The Content fragment 223 provides information on a plurality of contents constituting the service.

The Access group 230 includes an Access fragment 231 and a Session Description fragment 232, and provides service access information indicating how to receive the services provided through the Core group 220, and detailed information on the session in which the contents constituting the corresponding service are transmitted to allow the mobile terminal to access the corresponding service.

The Access fragment 231 provides a plurality of access methods for one service to the mobile terminal, thereby providing a method capable of accessing various additional services based on one service. The Session Description fragment 232 provides session information for the service defined in one access fragment. In addition, the service guide information, as shown in FIG. 2, can further include a Preview Data fragment 224 that provides preview and icon for the service and content in addition to the foregoing four fragments.

FIG. 3 is a diagram illustrating a roaming procedure performed when a mobile broadcasting terminal desires to receive broadcast service not in a service area of its Home Network (Home N/W) 310, but in a service area of a Visited Network (Visited N/W) 320 in OMA BCAST. Before a description of each step in the roaming procedure is given, each entity of FIG. 3 will first be described.

BCAST Service Applications (BSAs) 311 and 321 in the Home N/W 310 and the Visited N/W 320 are equal in function to the BCAST Service Application 102 of FIG. 1, so they are separately shown to differentiate the BSA in the Home N/W 310 from the BSA in the Visited N/W 320 during roaming. Similarly, BCAST Subscription Managements (BSMs) 312 and 322 have the same function as that of the BCAST Subscription Management 104 of FIG. 1. BCAST Service Distribution Adaptations (BSDAs) 313 and 323 have the same function as that of the BCAST Service Distribution/Adaptation 103 of FIG. 1, and group entities 314 and 324, each composed of BDS Service Distribution (BDS-SD), BCAST Distribution System (BDS) and/or Interaction Network (IN), have the same function as the group entity of the BDS-SD 111, the BDS 112 and/or the IN 113 of FIG. 1. A Terminal 330 has the same function as that of the Terminal 105 of FIG. 1. Each step in the roaming procedure will now be described.

In step 301, a user requests a BCAST roaming service in its Home N/W 310, and then moves to the Visited N/W 320. A procedure for roaming from the Home N/W 310 to the Visited N/W 320 should be performed outside the BCAST area in the lower layers 313 and 323. In step 302, the Terminal 330 automatically receives a service guide from the Visited N/W 320 to which it is roaming, without connection to the Home N/W 310. In step 303, upon receiving the service guide, the Terminal 330 sends a request for Rights Object for a particular BCAST service desired by the user to the BSM 322 of the Visited N/W 320. In step 304, the BSM 322 of the Visited N/W 320 acquires authorization for user roaming to the BSM 312 of the Home N/W 310. In step 305, the BSM 322 delivers the Right Object requested by the Terminal 330 in step 303 to the Terminal 330 via the BSM 321 of the Visited N/W 320. After receiving the Right Object in step 305, the Terminal 330 receives the BCAST service via the BSDA 323 of the Visited N/W 320 in step 306. Finally, in step 307, the Visited N/W 320 generates charging information and delivers the charging information to the Home N/W 310, which is outside the BCAST standard, so a description thereof will not be given.

As described in FIG. 3, BCAST currently presents the roaming procedure. Although there is a need for a message for communication between the entities and its message format in order to actually make the roaming possible, a message for communication between the entities and its message format, they are not presented. In the mobile broadcast service where several service providers may exist, in order for user terminals to freely roam and receive the service, the message flow between BCAST service entities should be specifically presented. In the current roaming procedure, when a user has performed roaming, the procedure is achieved without notification for charging information. However, when roaming occurs actually, the charging system is different from that of the Home N/W 310, which has been used by the user, and the user is not also charged according to the charge in the service guide of the Visited N/W 320, which was received while in roaming. Because of this, there is a need for a step capable of providing information on a change in the charge to the user and allowing the user to determine whether he/she will use the roaming service. In addition, in order to make the roaming procedure possible, a request for the roaming service should be previously sent to the Home N/W 310. However, because such a situation is not always possible, the roaming should be possible even after the terminal moves the area. It is assumed in the roaming procedure of FIG. 3 that the scheme used for deciphering the enciphered content or service received in step 305 is OMA DRM 2.0. Actually, the roaming procedure should be updated such that the content or service can be enciphered/deciphered even by the schemes other than the OMA DRM 2.0. Accordingly, there is a need for an improved method for supporting a roaming service in the mobile broadcasting system.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a roaming service method in a mobile broadcasting system, and a system thereof.

It is another aspect of exemplary embodiments of the present invention to provide a roaming service method capable of supporting various charging systems in a mobile broadcasting system, and a system thereof.

It is further another aspect of exemplary embodiments of the present invention to provide a roaming service method for supporting various enciphering schemes in a mobile broadcasting system, and a system thereof.

According to one aspect of exemplary embodiments of the present invention, there is provided a roaming service method in a mobile broadcasting system, in which a service guide from a corresponding visited service provider (Visited SP) is received by the terminal when the terminal moves to a roaming area, a roaming request message for requesting a purchase item allowable for each individual service is transmitted by the terminal to a home service provider (Home SP) based on the received service guide, upon receipt of the roaming request message, roaming availability and allowable scope for each individual service with the Visited SP where the terminal is located is negotiated by the Home SP, based on the roaming request message, the roaming availability and allowable scope for each individual service, negotiated with the Visited SP, is transmitted by the Home SP to the terminal, agreement/disagreement on the allowable scope for each individual service is transmitted by the terminal to the Visited SP, and if the terminal agrees, an enciphering key for receiving the agreed service is transmitted by the Visited SP.

In an exemplary implementation, the roaming request message further includes an allowability request of a particular service selected by the terminal.

In another exemplary implementation, the negotiating of the roaming availability and allowable scope comprises transmitting, by the Home SP, a message including a subscription type of the terminal to the Visited SP, for roaming registration; and determining, by the Visited SP, roaming availability and allowable scope for each individual service based on the subscription type, and transmitting the result to the Home SP In still another exemplary implementation, the enciphering key is a long-term key.

According to another aspect of exemplary embodiments of the present invention, there is provided a roaming service method in a mobile broadcasting system, in which a service guide from a corresponding visited service provider (Visited SP) is received by a terminal when the terminal moves to a roaming area, a roaming request message for requesting a purchase item allowable for each individual service is transmitted by the terminal to the Visited SP based on the received service guide, upon receipt of the roaming request message, whether a roaming service of the terminal is authorized from a home service provider (Home SP) for which the terminal has subscribed, based on the roaming request message is determined by the Visited SP, availability of the roaming service of the terminal and an allowable scope for each individual roaming service is verified by the Visited SP, and the result is transmitted to the terminal, agreement/disagreement on the allowable scope for each individual service is transmitted by the terminal to the Visited SP, and if the terminal agrees, an enciphering key for receiving the agreed service is transmitted by the Visited SP.

In an exemplary implementation, the transmitted of the roaming request message further comprises including an allowability request of a service selected by the terminal in the roaming request message.

In another exemplary implementation, the determining of whether a roaming service of the terminal is authorized comprises transmitting, by the Visited SP, a message including a subscription type of the terminal to the Home SP, for roaming registration; and determining, by the Home SP, roaming availability based on the subscription type, and transmitting the determined roaming availability to the Home SP.

According to a further aspect of exemplary embodiments of the present invention, there is provided a mobile broadcasting system comprising a home service provider (Home SP) for, upon receipt of a roaming request message from a terminal, negotiating roaming availability and allowable scope for each individual roaming service with a visited service provider (Visited SP) where the terminal is located, based on the roaming request message, the Visited SP for transmitting the negotiated roaming availability and allowable scope for each individual roaming service to the terminal, and the terminal for verifying the received roaming availability and allowable scope for each individual roaming service, and receiving an enciphering key from the Home SP or the Visited SP.

In an exemplary implementation, the terminal further includes an allowability request of a service selected by the terminal in the roaming request message.

In another exemplary implementation, the enciphering key is a long-term key.

According to yet another aspect of exemplary embodiments of the present invention, there is provided a mobile broadcasting system comprising a visited service provider (Visited SP) for, upon receipt of a roaming request message from a terminal, inquiring of a home service provider (Home SP) for which the terminal has subscribed, regarding availability of the roaming service, based on the roaming request message, checking the roaming availability and allowable scope for each individual roaming service, and transmitting the result to the terminal, the Home SP for, upon receipt of a request for the roaming service of the terminal from the Visited SP, determining whether to authorize the roaming service of the terminal and transmitting the result to the Visited SP, and the terminal for checking the roaming availability and allowable scope for each individual roaming service, and receiving an enciphering key from the Home SP or the Visited SP.

In an exemplary implementation, the terminal further includes an allowability request of a service selected by the terminal in the roaming request message before transmission.

According to still another aspect of exemplary embodiments of the present invention, there is provided a roaming service method in a terminal of a mobile broadcasting system, in which a roaming request message for requesting a purchase item allowable for each individual service is transmitted to its home service provider (Home SP) or a visited service provider (Visited SP) based on a service guide received from the Visited SP when the terminal moves to a roaming area, a roaming response message from the Home SP or the Visited SP is received, roaming availability and allowable scope for each individual service is verified, and agreement/disagreement is transmitted to the Home SP or the Visited SP, and if the checked roaming condition is agreed, an enciphering key is received from the Home SP or the Visited SP.

In an exemplary implementation, the terminal further includes an allowability request of a service selected by a user in the roaming request message.

In another exemplary implementation, the roaming response message further includes charging information for a roaming service to the terminal.

According to still another aspect of exemplary embodiments of the present invention, there is provided a terminal in a mobile broadcasting system, in which a controller generates a roaming request message for requesting a purchase item allowable for each individual service based on a service guide received from a corresponding visited service provider (Visited SP), when the terminal moves to a roaming area, and deciphering a response message to the roaming request, and a transceiver transmits the generated roaming request message to a home service provider (Home SP) or the Visited SP, and receives a roaming response message from the Home SP or the Visited SP and transmits the received roaming response message to the controller.

In an exemplary implementation, the controller further includes an allowability request of a service selected by a user in the roaming request message.

In another exemplary implementation, the roaming response message further includes charging information for a roaming service to the terminal.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 3:
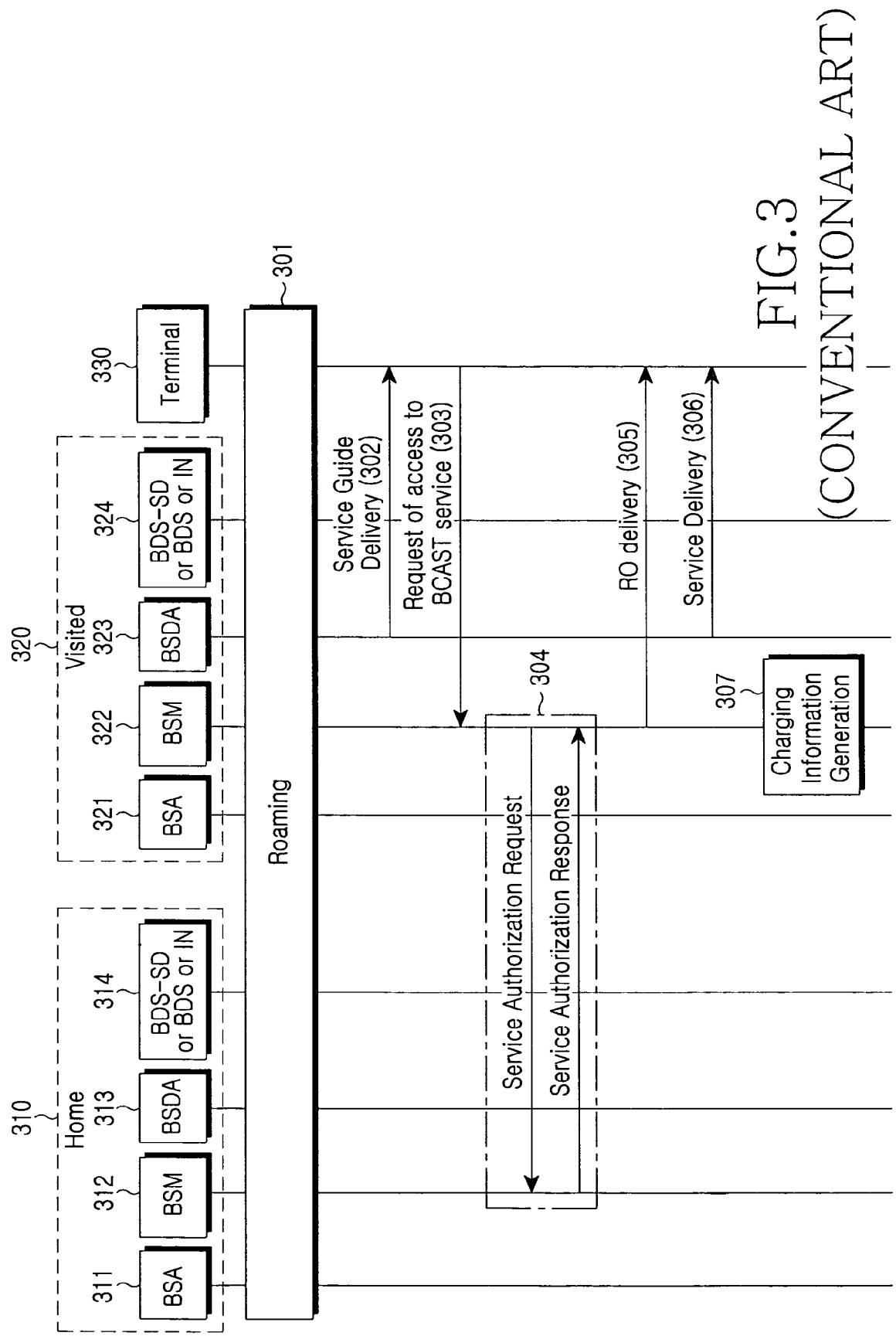
FIG. 3 is a diagram illustrating a conventional roaming procedure in OMA BCAST.

In the following description, the representative exemplary embodiments of the present invention will be presented. For convenience, although names of the entities defined in 3rd Generation Partnership Project (3GPP) which is a standard group for asynchronous mobile communication will be used as names of the entities defined in BCAST of Open Mobile Alliance (OMA) which is a standard group of an application of a mobile terminal, the standards and names will not limit the scope of the present invention, and can also be applied to the systems having the similar technical background. Actually, in the BCAST structure, the Home N/W 310 and the Visited N/W 320 of FIG. 3 should be replaced by a Home Service Provider (Home SP) and a Visited Service Provider (Visited SP).

Before a description of the BCAST roaming procedure according to an exemplary embodiment of the present invention is given, the information necessary for the procedure will be described.

Table 1 to Table 4 below show items stored in the Service Guide Context fragment 201 described in FIG. 2. Table 1 to Table 4 are divided from one table, for convenience, and those are described in detail in Korean Patent Application No. P2005-94675, entitled Method and Apparatus for Transmitting and Receiving Service Guide Context in a Mobile Broadcasting System. Exemplary embodiments of the present invention uses partial information provided in Table 1 to Table 4, so a description of the unused items will be omitted for clarity and conciseness. Therefore, for a detailed description of Table 1 to Table 4, refer to the earlier filed application.

TABLE 1

| Name | Type | Category | Cardinality | Description |
|---|---|---|---|---|
| ServiceGuideContext | E | M | 1 . . . N | Identifies the SGDD to the terminal. Each Service Providers may have their own announcement channel. ServiceGuideContext gives an session information of announcement channel which contains SGDDs. Contains the following elements: ServiceGuideInfo |
| ServiceGuideInfo | E1 | M | 1 . . . N | Specifies Service Guide Information. Contains the following attributes: SGVersion BSDAId Contains the following elements: Name ServiceProvider Broadcast_area SGAnnouncement SGFragmentsList |
| SGVersion | A | M | 1 | Version of Service Guide. The newer version overrides the older one as soon as it has been received |
| BSDAId | A | M | 1 | Identifier of BSDA system which distribute and aggregate service guide fragments. |
| ReleaseTime | | | | |

TABLE 2

| Name | E2 | M | 1 . . . N | Name of Service Guide, possibly in multiple languages. The language is expressed using built-in XML attribute xml:lang with this elements |
|---|---|---|---|---|
| ServiceProvider | E2 | O | 1 | Specifies an information of service provider who deliver the service guides Contains the following attributes: ProviderURI ProviderName |
| ProviderURI | A | M | 1 | Specifies a service provider's URI which is globally unique. This URI is registered by ICANN. |
| ProviderName | A | M | 1 | Specifies the Service Providers' name. |
| Broadcast_area | E2 | O | 0 . . . N | The broadcast area to distribute contents (as specified in the [OMA MLP] with modifications) Sub-elements: Shape cc name_area zip_code |

TABLE 2-continued

| | | | | |
|---|---|---|---|---|
| Shape | E3 | O | 0 . . . 1 | Shapes used to represent a geographic area that describes (as specified in the [OMA MLP]) |
| Cc | E3 | O | 0 . . . 1 | Country code, 1–3 digits e.g. 355 for Albania (as specified in the [OMA MLP]) |
| name_area | E3 | O | 0 . . . 1 | Geopolitical name of area such as 'Seoul' (as specified in the [OMA MLP]) |
| zip_code | E3 | O | 0 . . . 1 | Zip code |

TABLE 3

| | | | | |
|---|---|---|---|---|
| SGAnnouncement | E2 | M | 1 | Specifies an information of Service Guide Announcement Session. Contains the following elements: AnnouncementSession SGDDInfo |
| AnnouncementSession | E3 | M | 1 | The pointer to the Announcement Channel delivering ServiceGuideDeliveryDescriptor. Contains the following attributes: SrcIPAddress DestIPAddress PortNumber SessionID |
| SrcIPAddress | A | O | 1 | Source IP address of the announcement channel which is the FLUTE session |
| DestIPAddress | A | M | 1 | Destination IP address of the announcement channel which is the FLUTE session |
| PortNumber | A | O | 0 . . . 1 | Destination port of the announcement channel which is the FLUTE session |
| SessionID | A | M | 1 | Identifier of the announcement session |
| SGDDInfo | E3 | M | 1 | Specifies the SGDD information Contains the following attributes: NumberofSGDDs ListeningPeriod |
| ListeningPeriod | A | O | 0 . . . 1 | Time Duration for listening of SGDD Delivery by Terminal |

TABLE 4

| | | | | |
|---|---|---|---|---|
| SGFragmentsList | E2 | M | 1 | Specifies the total lists of Fragments which composed the service guide. Contains the following elements: ServiceFragmentList ScheduleFragmentList ContentFragmentList PurchaseItemFragmentList PurchaseDataFragmentList PurchaseChannelFragmentList AccessFragmentList |
| ServiceFragmentList | E3 | M | 1 | Specifies the total list of Service Fragments |
| FragmentID | E4 | M | 1 . . . N | Service Fragments IDs |
| ScheduleFragmentList | E3 | M | 1 | Specifies the total list of Schedule Fragments |
| FragmentID | E4 | M | 1 . . . N | Schedule Fragments IDs |
| ContentFragmentTable | E3 | M | 1 | Specifies the total list of Content Fragments |
| FragmentID | E4 | M | 1 . . . N | Content Fragments IDs |
| PurchaseItemFragmentList | E3 | M | 1 | Specifies the total list of PurchaseItem Fragments |
| FragmentID | E4 | M | 1 . . . N | PurchaseItem Fragments IDs |
| PurchaseDataFragmentList | E3 | M | 1 | Specifies the total list of PurchaseData Fragments |
| FragmentID | E4 | M | 1 . . . N | PurchaseData Fragments IDs |
| PurchaseChannelFragmentList | E3 | M | 1 | Specifies the total list of PurchaseChannel Fragments |
| FragmentID | E4 | M | 1 . . . N | PurchaseChannel Fragments IDs |
| AccessFragmentList | E3 | M | 1 | Specifies the total list of Access Fragments |
| FragmentID | E4 | M | 1 . . . N | Access Fragments IDs |

Referring to Table 1 to Table 4, 'Name' indicates names of element values and attribute values constituting a corresponding message. 'Type' indicates whether the corresponding name corresponds to an element value or an attribute value. The element value has values of E1, E2, E3 and E4. E1 means an upper element value for the whole message, E2 indicates a sub-element value of E1, E3 indicates a sub-element value of E2, and E4 indicates a sub-element value of E3. The attribute value is indicated by A, and A indicates an attribute value of the corresponding element. For example, A under E1 indicates an attribute value of E1. 'Category' is used for indicating whether a corresponding element value or attribute value is mandatory, and has a value M if the value is mandatory, and a value O if the value is optional. 'Cardinality' indicates relations between the elements, and has values of '0', '0 . . . 1', '1', '0 . . . n', '1 . . . n', where "0" means an optional relation, "1" means a mandatory relation, and 'n' means the possibility of having a plurality of values. For example, '0 . . . n' means the possibility that there is no corresponding element value or there are n corresponding element values. 'Description' defines the meaning of the corresponding element or attribute value.

Figure 2:
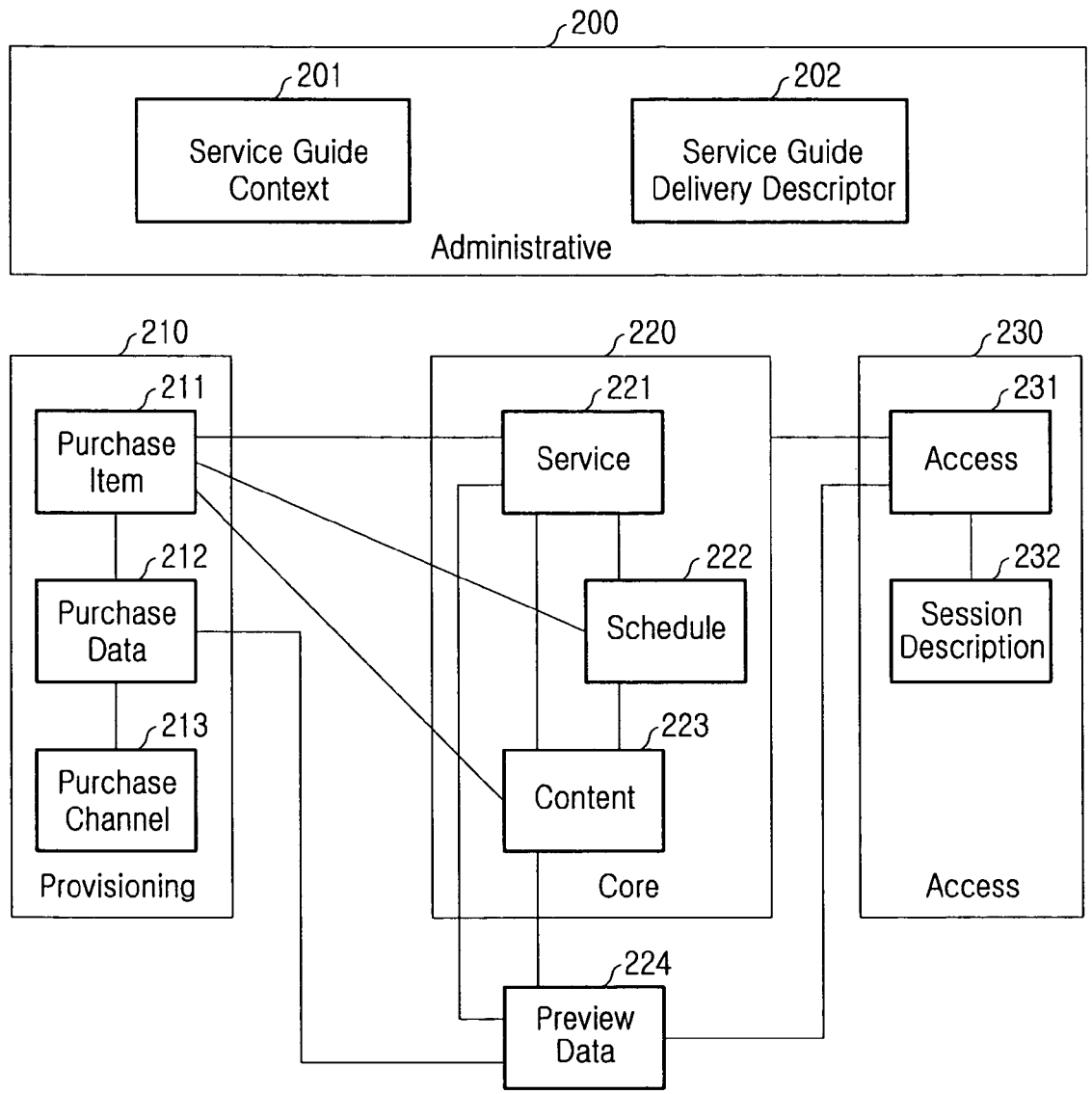
FIG. 2 is a diagram illustrating a structure of a service guide used for receiving a broadcast service in a general mobile broadcasting system.

As described in FIG. 2, the Service Guide Context fragment 201 provides overall information on the service guide and, in particular, has an attribute BSDAid and an element ServiceProvider. The attribute BSDAid is an identifier of the BSDA 103 for delivering the BCAST service in the corresponding area. The element ServiceProvider is composed of attributes of ProviderURL and ProviderName, and these are identifier information of the service provider that provides the BCAST service in the corresponding area. That is, the Terminal 105 can acquire information on the service provider and deliverer in the place where it is receiving the service through the information stored in the BSDAid and the ServiceProvider.

Table 5 to Table 7 below show items stored in the Purchase Item fragment 211. Table 5 to Table 7 are divided from one table, for convenience, and those are described in detail in the OMA standard document. Exemplary embodiments of the present invention uses partial information provided in Table 5 to Table 7, so a description of the unused items will be omitted for clarity and conciseness. For a detailed description of Table 5 to Table 7, refer to the documents in the OMA web site http://www.openmobilealliance.org/ftp/Public_documents/BAC/BCAST/Permanent_documents/OMA-TS-TS-BCAST_ServiceGuide-V1_0_0-20050930-D.zip, which are incorporated by reference. The reference documents were the newest edition as of the filing date of this application, and if there is any update in the documents in the future, the updated edition will be applied.

TABLE 5

| Name | Type | Category | Cardinality | Description |
|---|---|---|---|---|
| PurchaseItem | E | O | 0 . . . N | PurchaseItem fragment<br>Contains the following attributes:<br>id<br>version<br>validFrom<br>validTo<br>Weight<br>Contains the following sub-elements:<br>ExtensionURL<br>ServiceIDRef<br>ScheduleIDRef<br>ContentIDRef<br>Name<br>Description<br>ParentalRating<br>PurchaseDataIDRef |
| id | A | M | 1 | ID of the PurchaseItem fragment, globally unique |
| version | A | M | 1 | Version of this fragment. The newer version overrides the older one as soon as it has been received. |
| validFrom | A | O | 0 . . . 1 | The first moment when this fragment is valid. If not given, the validity is assumed to have started at some time in the past |

TABLE 6

| | | | | |
|---|---|---|---|---|
| validTo | A | O | 0 . . . 1 | The last moment when this fragment is valid. If not given, the validity is assumed to end in undefined time in the future. |
| Weight | A | NO/TM | 1 | Intended order of display of this purchase item relative to other purchase items as seen by the end user. The order of display is by increasing Weight value (i.e., purchase item with lowest Weight is displayed first). |
| ExtensionURL | E1 | O | 0 . . . N | URL containing additional information related to this fragment in a web page. The terminal can fetch further information by accessing this URL. |
| ServiceIDRef | E1 | O | 0 . . . N | References to the Service fragments which belong to this PurchaseItem.<br>Note: a Service fragment can be referenced by multiple PurchaseItems. |

TABLE 6-continued

| | | | | |
|---|---|---|---|---|
| ScheduleIDRef | E1 | O | 0...N | References to the Schedule fragments which belong to this PurchaseItem. Note: a Schedule fragment can be referenced by multiple PurchaseItems. |
| ContentIDRef | E1 | O | 0...N | References to the Content fragments which belong to this PurchaseItem. Note: a Content fragment can be referenced by multiple PurchaseItems. |
| Name | E1 | M | 1...N | Name of the PurchaseItem, possibly in multiple languages. The language is expressed using built-in XML attribute xml:lang with this element. |

TABLE 7

| | | | | |
|---|---|---|---|---|
| Description | E1 | NO/TM | 0...N | Description of the purchase item, possibly in multiple languages. The language is expressed using built-in XML attribute xml:lang with this element. |
| ParentalRating | E1 | O | 0...1 | This determines the age limit for service purchase, not the age limit of the actual service consumption. The allowed values are those defined in the ParentalRating Descriptor of the EIT table (cf. ETSI EN 300 468) |
| PurchaseDataIDRef | E1 | M | 1...N | References to PurchaseData fragment, which belongs this PurchaseItem. |
| <proprietary elements> | E1 or lower | O | 0...N | Any number of proprietary or application-specific elements that are not defined in this specification. |

As described in FIG. 2, the Purchase Item fragment 211 provides charging information for a service or a service bundle, and an attribute 'id' of Table 5 to Table 7 indicates an identifier ID of the service indicated by the Purchase Item fragment 211.

Table 8 to Table 10 below show items stored in the Purchase Channel fragment 213. Table 8 to Table 10 are divided from one table, for convenience, and those are described in detail in the OMA standard document. Exemplary embodiments of the present invention uses partial information provided in Table 8 to Table 10, so a description of the unused items will be omitted for clarity and conciseness. For a detailed description of Table 8 to Table 10, refer to the documents in the OMA web site http://www.openmobilealliance.org/ftp/Pubic_documents/BAC/BCAST/Permanent_documents/OMA-TS-TS-BCAST_ServiceGuide-V1_0_0-20050930-D.zip, which are incorporated by reference. The reference documents were the newest edition as of the filing date of this application, and if there is any update in the documents in the future, the updated edition will be applied.

TABLE 8

| Name | Type | Category | Cardinality | Description |
|---|---|---|---|---|
| PurchaseChannel | E | O | 0...N | PurchaseChannel fragment Contains the following attributes: id version validFrom validTo LocalFlag RightsIssuerURI Selector Contains the following sub-elements: ExtensionURL Name PortalURL Description Connection ContactInfo |
| id | A | M | 1 | ID of the PurchaseChannel fragment, globally unique |
| version | A | M | 1 | Version of this fragment. The newer version overrides the older one as soon as it has been received. |
| validFrom | A | O | 0...1 | The first moment when this fragment is valid. If not given, the validity is assumed to have started at some time in the past |

TABLE 8-continued

| Name | Type | Category | Cardinality | Description |
|------|------|----------|-------------|-------------|
| validTo | A | O | 0...1 | The last moment when this fragment is valid. If not given, the validity is assumed to end in undefined time in the future. |

TABLE 9

| | | | | |
|---|---|---|---|---|
| LocalFlag | A | M | 1 | If true, indicates that the BSM advertises the availability and purchase information completely in the service guide |
| RightsIssuerURI | A | NO/TO | 1 | ID of the rights issuer associated with the BSM (needed to allow unconnected devices to identify the RI service that may be operated by their Home BSM). If the service protection or content protection system is based on OMA DRM2.0, RightsIssuerURI SHALL be specified. |
| Selector | A | M | 1 | Allows a terminal to determine which purchase channel to use, among the purchase channels that are announced in the SG. Attributes: type (e.g. possible value: "SIMCode") Note: Purchase channel needs to be provided by the BCAST Service Provider. |
| ExtensionURL | E1 | O | 0...N | URL containing additional information related to this fragment in a web page. The terminal can fetch further information by accessing this URL. |
| Name | E1 | M | 1...N | Name of the Purchase Channel, possibly in multiple languages. The language is expressed using built-in XML attribute xml:lang with this element. |
| PortalURL | E1 | O | 0...1 | URL for the BSM, on which all purchase transactions can be made |
| Description | E1 | NO/TM | 0...N | Description of the purchase channel, possibly in multiple languages. The language is expressed using built-in XML attribute xml:lang with this element. |

TABLE 10

| | | | | |
|---|---|---|---|---|
| Connection | E1 | M | 1...N | Allows a terminal to construct a purchase request and send it to the purchase channel. In case multiple connection options are specified, it is up to the terminal to choose, e.g. to use IP (over GPRS), with SMS as a fallback option. Contains the following sub-elements: PurchaseURL |
| PurchaseURL | E2 | M | 1...N | The URL to which the purchase request should be addressed. Contains the following attribute: Bearer |
| Bearer | A | M | 1 | Bearer supporting this purchase channel |
| ContactInfo | E1 | O | 0...1 | A text string that indicates to a user how to contact a BSM to initiate an out-of-band purchase transaction (e.g. phone number, URL etc) |
| <proprietary elements> | E1 or lower | O | 0...N | Any number of proprietary or application-specific elements that are not defined in this specification. |

As described in FIG. 2, the Purchase Channel fragment 213 provides information indicating which entity the service user should access to actually purchase the service or service bundle indicated by the Purchase Item fragment 211. An element PortalURL in Table 8 to Table 10 has a URL of the BSM 104 that performs purchase management. As described in FIG. 1, the BSM 104 performs user management as well as the purchase management.

The elements and attributes mentioned for the roaming in Table 1 to Table 10 are listed in Table 11, and usage of the elements and attributes during the roaming will be described hereinbelow.

TABLE 11

| | | | | |
|---|---|---|---|---|
| BSDAId | A | M | 1 | Identifier of BSDA system which distribute and aggregate service guide fragments. |
| ServiceProvider | E2 | O | 1 | Specifies an information of service provider who deliver the service guides Contains the following attributes: ProviderURI ProviderName |
| ProviderURI | A | M | 1 | Specifies a service provider's URI which is globally unique. This URI is registered by ICANN. |
| ProviderName | A | M | 1 | Specifies the Service Providers' name. |
| id | A | M | 1 | ID of the PurchaseItem fragment, globally unique |
| PortalURL | E1 | O | 0 . . . 1 | URL for the BSM, on which all purchase transactions can be made |

BSDAid is an identifier of the BSDA 103, through which the entity from which the service is provided can be found. If the Terminal 105 is located in the Home SP, the BSDAid is a URL of the BSDA of its service provider. If the Terminal 105 is located in the Visited SP after roaming, the BSDAid is a URL of the BSDA of the service provider in the roaming area. Attributes ProviderURI and ProviderName of the element ServiceProvider indicate unique URL information and name of the service provider, respectively. When the Terminal 105 is located in the Home SP, the ProviderURI is a URL of its service provider, and when the Terminal 105 is located in the Visited SP after roaming, the ProviderURI is a URL of the service provider in the roaming area. The Terminal 105 uses the BSDAid, ProviderURI, and ProviderName during roaming in order to identify the service provider when it makes roaming registration in the Visited SP and the Home SP. For example, the BSDAid is needed to determine in which area the roaming terminal desires to receive the service when one service provider provides the BCAST service in several areas. The attribute 'id' is an identifier of the service that the roaming user desires to receive in the roaming area, and is used when the roaming service is registered. Finally, the PortalURL is used for acquiring information on the BSM 104 of the Home SP and the Visited SP, which performs and manages roaming registration. A roaming service registration request is actually delivered to the position stored in the PortalURL.

There is a need for a unique identifier of the Terminal 105 that requests the service, in addition to the information provided by the elements or attributes mentioned in Table 11. The unique identifier of the terminal is an identifier that the terminal basically has. In addition, as to the information of the items mentioned in Table 11, the information related to the Home SP of the roaming terminal is fully known by the terminal through the service guide of the Home SP. The attributes and elements mentioned to be needed for roaming in Table 11 are exemplary attributes and elements made based on the BCAST standard document. Therefore, if the BCAST standard document is updated, names of the attributes and elements affecting the present invention can also be changed according thereto.

Next, a description will be made of an exemplary roaming procedure according to an exemplary embodiment of the present invention. The roaming procedure can be achieved with two methods. The first method is performed in the case where when the terminal, after roaming, first desires to make roaming request registration in the Visited SP, the registration-requested entity is the BSM of the Home SP. The second method is performed in the case where when the terminal, after roaming, first desires to make roaming request registration in the Visited SP, the registration-requested entity is the BSM of the Visited SP. A detailed description of each method will be made hereinbelow.

Before a description of each method is given, FIG. 12 will be described.

Figure 12:
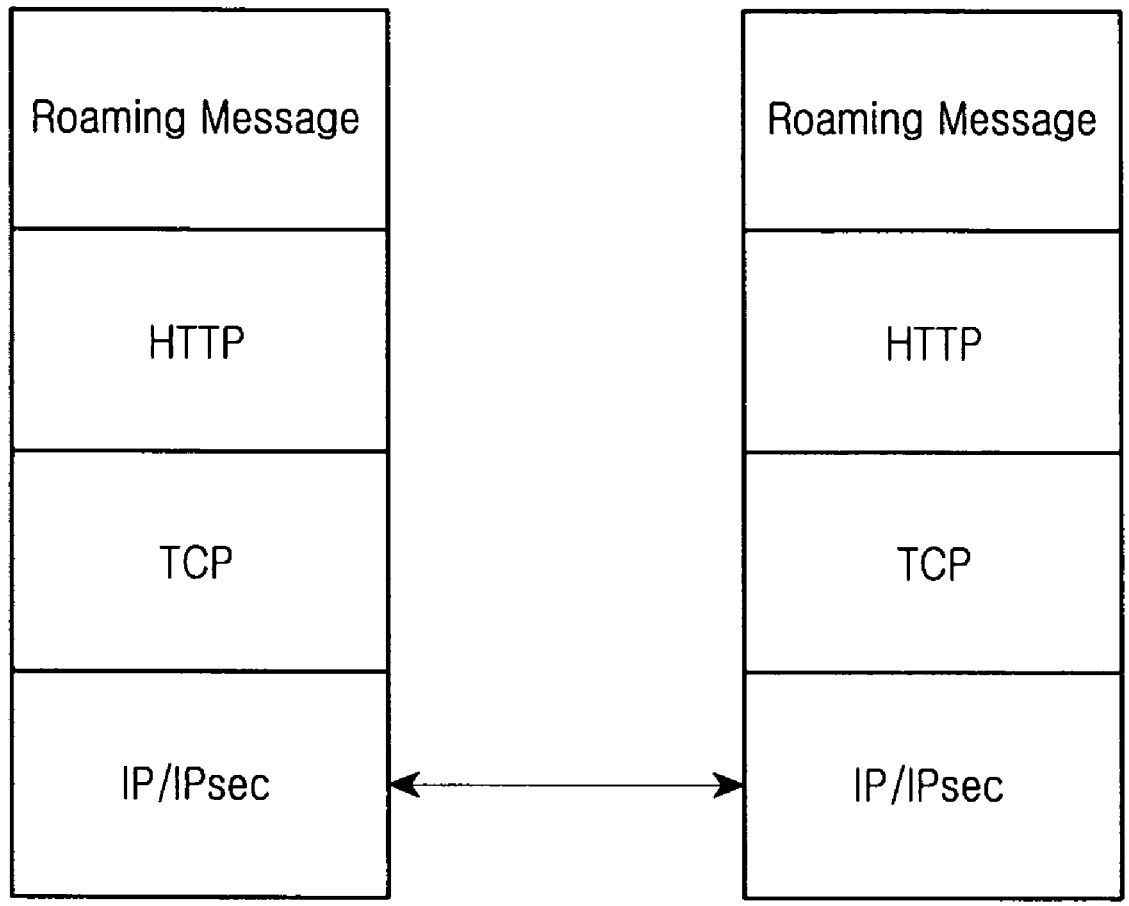
FIG. 12 is a diagram illustrating an exemplary protocol stack usable for communication between BSMs according to an exemplary embodiment of the present invention.

FIG. 12 is a diagram illustrating an exemplary protocol stack usable for communication between BSMs 104 according to an exemplary embodiment of the present invention. Although a HTTP protocol of FIG. 12 is a protocol originally designed to transmit web pages, it is now used as a protocol for transmitting a variety of information. Also, the messages for roaming, to be defined in an exemplary embodiment of the present invention, are generated, and those are transmitted using the HTTP protocol. HTTP-encapsulated roaming messages are encapsulated according to the transport layer protocol such as a lower TCP protocol. The TCP protocol is given by way of example, because it is a typical protocol for the transport layer. For security or efficiency, another transport layer protocol can also be used. If the TCP encapsulation is completed, IP is used as a network layer protocol. Because OMA BCAST is IP-based mobile broadcast service, IP should be used as the network layer protocol. However, for security, IPsec can be used together with IP. If a transmitting BSM transmits a message to a receiving BSM according to the above procedure, the receiving BSM can acquire the transmitted actual message by decapsulating the message in the reverse order of the above procedure. In communication between the BSMs according to an exemplary embodiment of the present invention, message exchange will be achieved using the protocol stack of FIG. 12.

Figure 4:
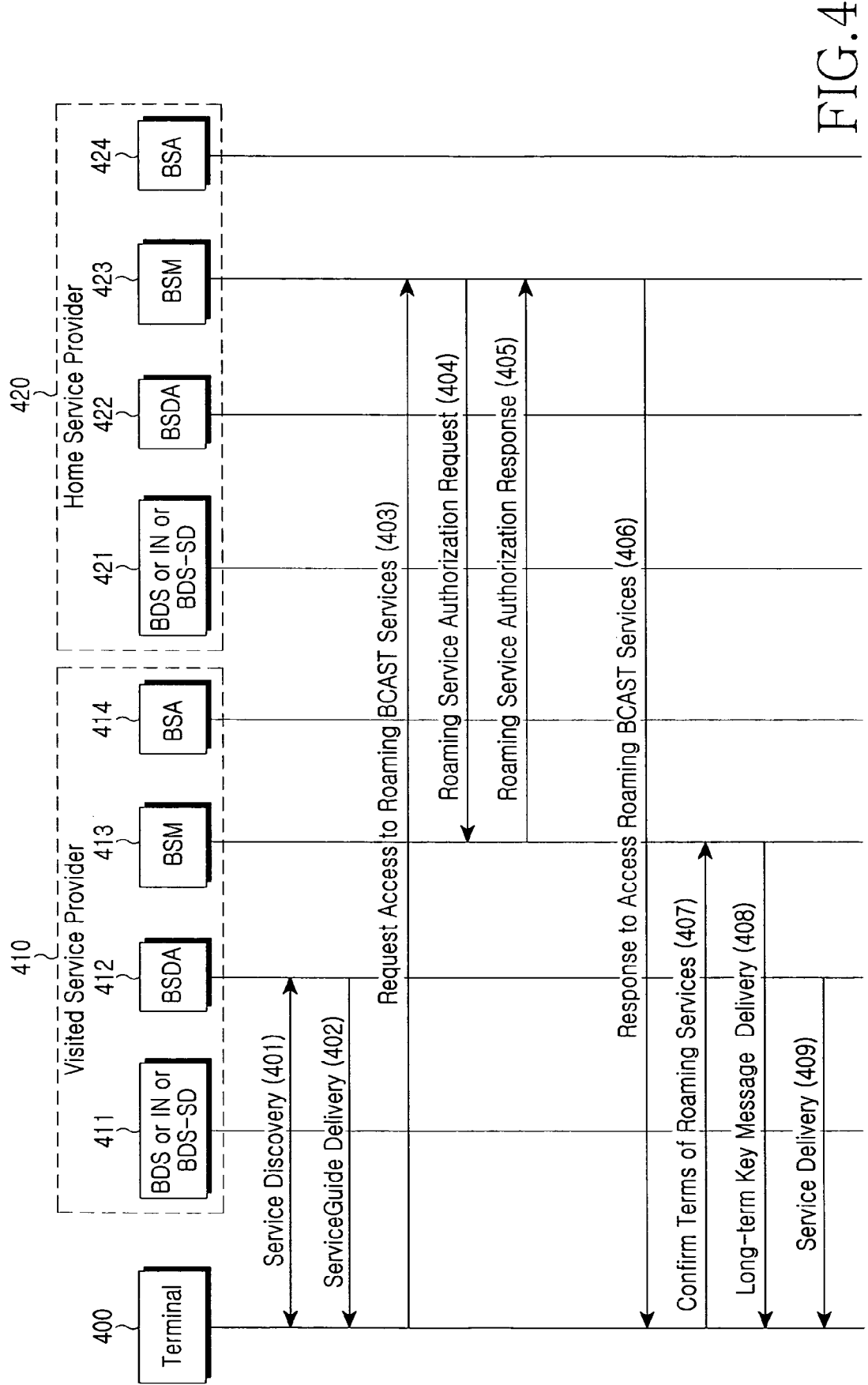
FIG. 4 is a signaling diagram illustrating a roaming procedure according to an exemplary embodiment of the present invention.

FIG. 4 is a signaling diagram illustrating a roaming procedure according to an exemplary embodiment of the present invention. Before a description of each step in the roaming procedure is given, each entity of FIG. 4 will be described. BSAs 424 and 414 in a Home SP 420 and a Visited SP 410 are equal in function to the BSA 102 of FIG. 1, so they are separately shown to differentiate the BSA in the Home SP 420 from the BSA in the Visited SP 410 during roaming. Similarly, BSMs 423 and 413 have the same function as that of the BSM 104 of FIG. 1, BSDAs 422 and 412 have the same function as that of the BSDA 103 of FIG. 1, and group entities 421 and 411, each composed of BDS-SD, BDS and/or IN, have the same function as the group entity of the BDS-SD 111, the BDS 112 and/or the IN 113 of FIG. 1. A Terminal 400 has the same function as that of the Terminal 105 of FIG. 1. The above-mentioned entities are not all used in the roaming procedure, so the entities used in the roaming procedure according to an exemplary embodiment of the present invention will be described.

In steps 401 and 402 corresponding to the part not directly specified in the roaming procedure, it is assumed that as the Terminal 400 arrives at the roaming area, the roaming procedure is automatically performed by the group entity 411 of BDS, IN and/or BDS-SD, and the BSDA 412, which are lower networks for transmitting the BCAST service. However, for reference, in step 401, the group entity 411 of BDS, IN and/or BDS-SD, which is a lower network of the BCAST, should perform roaming, provide the roaming indication information to the Terminal 400, and provide basic information based on which the Terminal 400 can receive the service guide. Using the basic information, the Terminal 400 can receive the service guide in step 402 by receiving the Service Guide Context fragment 201 of FIG. 2.

In step 402, upon receipt of the service guide, the Terminal 400 acquires the information described in Table 11.

In step 403, using the information acquired from Table 11, the Terminal 400 generates a message for making a roaming registration request to the Home SP 420, and sends the message to the BSM 423 of the Home SP 420. The contents of the Roaming Request message generated by the Terminal 400 in step 403 are shown in Table 12 below.

TABLE 12

Request ID
Terminal ID
Visited SP ID
Visited SP BSM ID
Visited BSDA ID
Purchase Item ID Request ID, a first item of Table 12, is an identifier given to consistently identify and manage one roaming registration request procedure. The Request ID is an identifier generated for allowing a terminal to uniquely identify its own roaming registration request. The Request ID is constant from the time it is generated in FIG. 4 until the time the roaming registration request procedure of FIG. 4 ends. Terminal ID is a unique ID for the terminal to uniquely identify a terminal. The Terminal ID is used for identifying who makes the roaming registration request. Visited SP ID is an identifier of the service provider that provides the service in the area where the roaming terminal stays. The Visited SP ID is used for providing the service provider of the Home SP 420 with the information indicating to whom the terminal make a roaming request. Here, when the BSM 423 of the Home SP 420 determines from the Visited SP ID that there is no roaming agreement made with the BSM 423 itself, the BSM 423 directly proceeds to step 406 where it can notify the roaming unavailability to the Terminal 400. Visited SP BSM ID is used for informing the Home SP of the entity that actually makes a negotiation on the roaming service registration procedure with the identifier of the BSM, used by the Visited SP 410. Visited BSDA ID is an identifier of the BSDA used by the Visited SP, and because one service provider can provide the service through several BSDAs, the Visited BSDA ID is used for indicating through which BSDA among the BSDAs used by the Visited SP the roaming terminal desires to receive the service. Finally, Purchase Item ID is used for indicating the service that the roaming user desires to receive. For the terminal that made the roaming registration request in step 403, the BSM 413 of the Visited SP 410 can additionally perform an authentication process on the terminal, and because the authentication process is not related to the basis of the present invention, a description thereof will be omitted for clarity and conciseness.

In step 404, for the roaming registration request received from the Terminal 400 in step 403, the BSM 423 of the Home SP 420 sends a roaming registration request to the BSM 413 of the Visited SP 410 to which the Terminal 400 is roaming. The contents of the message sent from the BSM 423 of the Home SP 420 to the BSM 413 of the Visited SP 410 in step 404 are shown in Table 13 below.

TABLE 13

Request ID
Terminal ID
Home SP ID
Home SP BSM ID
Visited BSDA ID
Terminal Subscription Type
Purchase Item ID Request ID, a first item of Table 13, is an identifier given to consistently identify and manage one roaming registration request procedure. The Request ID is an identifier generated for allowing a terminal to uniquely identify its own roaming registration request. The Request ID is constant from the time it is generated in FIG. 4 until the time the roaming registration request procedure of FIG. 4 ends. Terminal ID is a unique ID for the terminal to uniquely identify a terminal. The Terminal ID is used for identifying who makes the roaming registration request. Home SP ID is used for indicating from which service provider the terminal that requested the roaming registration in the Visited SP 410 has originally received the service. Using this information, the BSM 413 of the Visited SP 410 can recognize that the roaming-requested terminal belongs to the service provider with whom its roaming agreement is made. Home SP BSM ID is used for informing the Visited SP 410 of the entity for a negotiation needed in the roaming registration process. The BSM 413 of the Visited SP 410 responds to the roaming registration result depending on the Home SP BSM ID. Visited BSDA ID is used for providing the Visited SP 410 with the information indicating in which service area the terminal is currently requesting the service. Terminal Subscription Type is information provided to the Visited SP 410 to evaluate in which class the roaming-requested terminal can receive services of the Visited SP 410, and it is evaluated along with Purchase Item ID. The Terminal Subscription Type can be a class of the service that the roaming-requested terminal can receive from the roaming-requested Visited SP 410 based on the roaming agreement made between the Home SP 420 and the Visited SP 410. This can be defined in the form of a roaming allowed class number or code agreed between the two service providers, and its form is not defined in an exemplary embodiment of the present invention. Purchase Item ID is a service requested by the terminal, and depending on whether it can be received with the separate cost or depending on a roaming agreement between the Visited SP 410 and the Home SP 420, its reception possibility is determined based on the evaluation on whether it is processed with subscription of the roaming-requested terminal.

In step 405, the BSM 413 of the Visited SP 410 sends a response to the request received in step 404. The main purpose in step 405 is to inform the available scope of the roaming service requested by the terminal using the information received in step 404. A scope of the service that the terminal can receive from the Visited SP 410 can also be provided along with authorization for the roaming service requested by the terminal. The message sent from the BSM 413 of the Visited SP 410 to the BSM 423 of the Home SP 420 in step 405 is shown in Table 14 below.

TABLE 14

Request ID
Roaming Authorization Status
Roaming Service Allowed Scope

Request ID, a first item of Table 14, is an identifier given to consistently identify and manage one roaming registration request procedure. The Request ID is an identifier generated for allowing a terminal to uniquely identify its own roaming registration request. The Request ID is constant from the time it is generated in FIG. 4 until the time the roaming registration request procedure of FIG. 4 ends. Roaming Authorization Status is used for providing the evaluation result made on the roaming possibility using the information provided from the Visited SP 410 in step 404, to the BSM 423 of the Home SP 420 of the roaming-requested Terminal 400. Roaming Service Allowed Scope, when roaming is available, is used for allowing a value of the Terminal Subscription Type received in step 404 to indicate which reception right the roaming Terminal 400 will actually have in the Visited SP 410. The reception possibility of the service corresponding to the Purchase Item ID requested by the Terminal 400 is also defined in the Roaming Service Allowed Scope. In addition, the information related to occurrence of additional cost and a change in the charging system is also added to the Roaming Service Allowed Scope during roaming.

Steps 404 and 405 may also be omitted when necessary. For example, the steps can be omitted when the Terminal 400, after completing the roaming registration procedure, desires to make an additional service request while receiving the service. In this case, the BSM 423 of the Home SP 420 knows a part or all of the price policy for the roaming of the BSM 413 of the Visited SP 410.

In step 406, the Home SP 420 notifies the result on the roaming registration request received via the Visited SP 410 in step 405 to the Terminal 400. Actually, in step 406, the BSM 423 of the Home SP 420 forwards the message received in step 405, to the Terminal 400. After the Home SP 420 analyzes the roaming registration request of the terminal in step 403, if there is no roaming agreement with the Visited SP 410 in the area where the Terminal 400 stays, the Home SP 420 directly proceeds to step 406 where it fills the contents of Table 14 with a roaming request registration fail and sends it to the Terminal 400. In this case, the roaming is failed.

In step 407, the Terminal 400 sends a response to the roaming registration request that it sent to its Home SP 420. In this step, the Terminal 400 informs the BSM 413 of the Visited SP 410 whether it agrees with the Roaming Service Allowed Scope in the message received in step 406. If the Terminal 400 does not agree with the additional cost occurring during roaming or the change in the charging system, the roaming service is not achieved. However, if the Terminal 400 agrees, it proceeds to the next step. Table 15 below shows a message with which the Terminal 400 provides a final confirm for the roaming to the Visited SP 410.

TABLE 15

Request ID
Roaming Confirm Status

Request ID, a first item of Table 15, is an identifier given to consistently identify and manage one roaming registration request procedure. The Request ID is an identifier generated for allowing a terminal to uniquely identify its own roaming registration request. The Request ID is constant from the time it is generated in FIG. 4 until the time the roaming registration request procedure of FIG. 4 ends. Roaming Confirm Status is an item used for informing the Visited SP 410 whether or not the Terminal 400 will perform the roaming.

In step 408, the Terminal 400 receives a Long-Term Key message used for deciphering the received service when it finally determined to receive the roaming service. The Terminal 400 receives the Long-Term Key message in step 408 using the long-term key reception method defined in the BCAST standard, and this method will not be dealt with in an exemplary embodiment of the present invention.

In step 409, the Terminal 400 receives the service from the Visited SP 410 through the roaming.

Although it is also possible to enable the roaming using the message items defined in FIG. 4 in the Service Provisioning message and procedure defined in OMA BCAST as well as the roaming procedure described in FIG. 4, this is not dealt with in the present invention. For the Service Provisioning, refer to the documents in the OMA web site http://www.openmobilealliance.org/ftp/Public_documents/BAC/BCAST/Permanent_documents/OMA-TS-BCAST_Services-V1_0-20050909-D.zip, which are incorporated by reference. The reference documents were the newest edition as of the filing date of this application, and if there is any update in the documents in the future, the updated edition will be applied.

Figure 5:
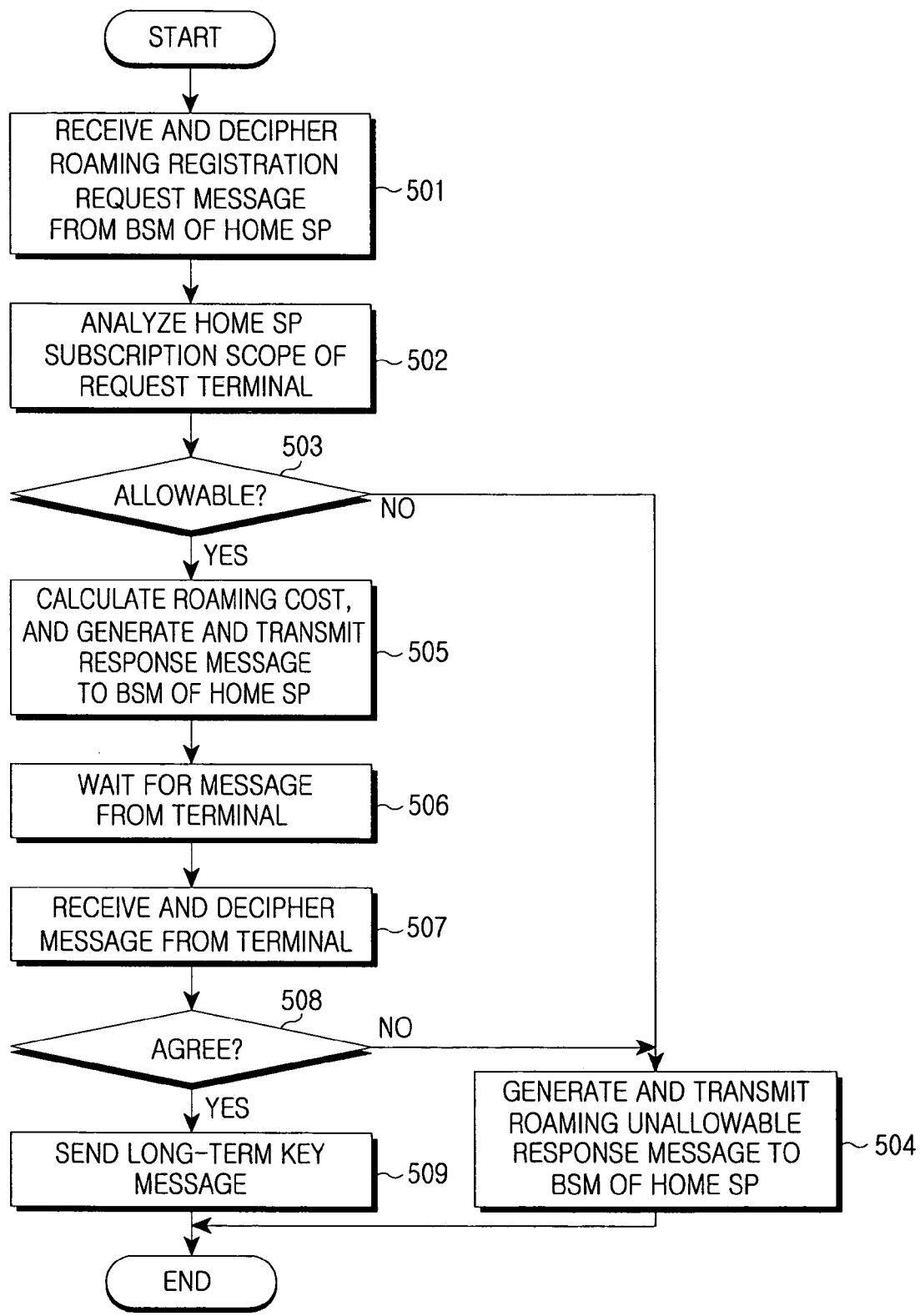
FIG. 5 is a flowchart illustrating an operation of a BSM of a Visited SP according to an exemplary embodiment of the present invention.

FIG. 5 is a flowchart illustrating an operation of a BSM 413 of a Visited SP 410 according to an exemplary embodiment of the present invention. A description of FIG. 5 will be made with reference to FIG. 4.

In step 501, the BSM 413 of the Visited SP 410 receives a roaming registration request from a BSM 423 of a Home SP 420 of a roaming Terminal 400, and deciphers the received request message. The contents of the received message are shown in Table 13, and the BSM 413 of the Visited SP 410 analyzes Terminal Subscription Type among the contents of the received message in step 502. Thereafter, in step 503, the BSM 413 of the Visited SP 410 determines a roaming allowed scope by analyzing a relationship between subscription of the roaming-requested terminal and its subscription policy. If the subscription of the roaming-requested terminal is insufficient to support the roaming, the BSM 413 of the Visited SP 410 generates a message for rejecting the roaming request and delivers the generated message to the BSM 423 of the Home SP 420 in step 504. However, if it is determined that the roaming is available with subscription of the roaming-requested terminal, the BSM 413 of the Visited SP 410 determines in step 505 whether there is a particular requirement such as Purchase Item. If there is a particular requirement, the BSM 413 of the Visited SP 410 calculates the charge, and if there is no particular requirement, the BSM 413 of the Visited SP 410 calculates the additional charge occurring during the roaming. After completion of the calculation, the BSM 413 of the Visited SP 410 generates a response message to the roaming request. The contents of the generated message are shown in Table 14.

After completion of step 505, the BSM 413 of the Visited SP 410 waits for the final confirm for the roaming from the Terminal 400 in step 506. If the roaming-requested Terminal 410 sends a Final Confirm message for the roaming, the BSM 413 of the Visited SP 410 receives and deciphers the message in step 507. The contents of the received message are shown in Table 15, and the BSM 413 of the Visited SP 410 determines in step 508 whether the Terminal 400 agrees with the roaming condition. If the Terminal 400 does not agree with the roaming condition, the roaming procedure with the corresponding Terminal 400 is terminated. Otherwise, if the Terminal 400 agrees with the roaming condition, the BSM 413 of the Visited SP 410 sends a Long-Term Key message for deciphering the received service in step 509. Upon receipt of the Long-Term Key message, the Terminal 400 can use the roaming service within its agreed scope.

Figure 6:
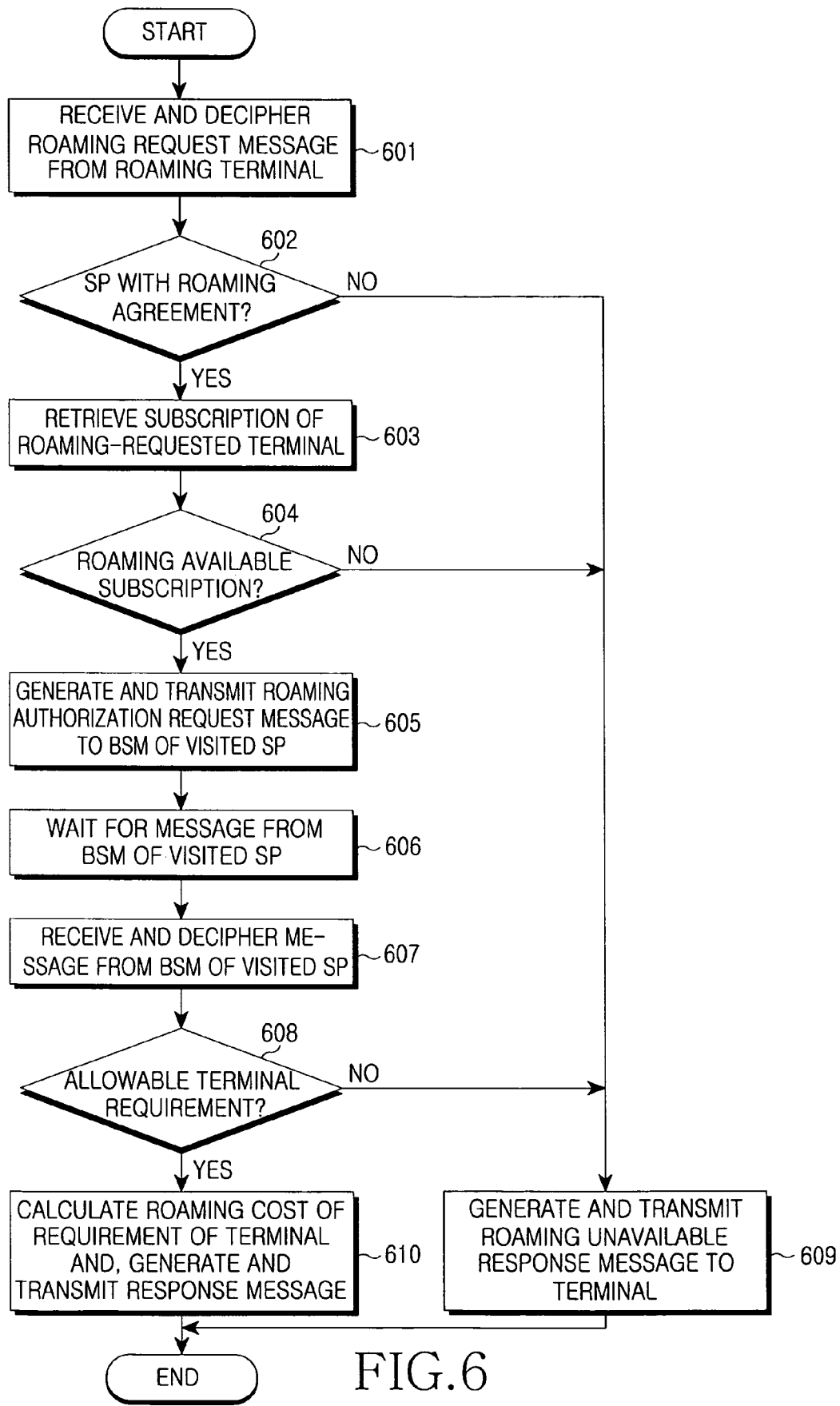
FIG. 6 is a flowchart illustrating an operation of a BSM of a Home SP according to an exemplary embodiment of the present invention.

FIG. 6 is a flowchart illustrating an operation of a BSM 423 of a Home SP 420 according to an exemplary embodiment of the present invention. A description of FIG. 6 will be made with reference to FIG. 4.

In step 601, the BSM 423 of the Home SP 420 receives a Roaming Request message from a roaming Terminal 400, and deciphers the received message. The message received by the Home SP 420 is shown in Table 12. Using the deciphered message, the BSM 423 of the Home SP 420 first determines in step 602 whether there is a roaming agreement with a Visited SP 410 where the roaming-requested Terminal 400 stays. If there is no agreement, the BSM 423 of the Home SP 420 proceeds to step 609 where it performs a no-roaming agreement process. In step 609, the BSM 423 of the Home SP 420 can also include the cause of the roaming unavailability, when necessary, while notifying Roaming Unavailable subscription, or can deliver the type of the partially available service if possible. However, if there is a roaming agreement, the BSM 423 of the Home SP 420 retrieves subscription of the corresponding Terminal 400 in step 603, and then determines in step 604 whether the retrieved subscription of the Terminal 400 is Roaming Allowable subscription.

If the retrieved subscription is Roaming Unsupported subscription, the BSM 423 of the Home SP 420 proceeds to step 609 to inform that the corresponding subscription is Roaming Unavailable subscription. In step 609, the BSM 423 of the Home SP 420 can include even the cause of the roaming unavailability when necessary while notifying the Roaming Unavailable subscription, or can deliver the type of the partially available service if possible. If the retrieved subscription is roaming-supported subscription, the BSM 423 of the Home SP 420 sends a Roaming Authorization Request message to a BSM 413 of the Visited SP 410 in step 605. The contents of this message are shown in Table 13. After sending the request message, the BSM 423 of the Home SP 420 waits for a response from the Visited SP 410 in step 606. Upon receipt of the response to the request, the BSM 423 of the Home SP 420 deciphers the received message in step 607, and analyzes the results on the requirement in step 608. If the requirement is permitted by the Visited SP 410, the BSM 423 of the Home SP 420 generates a message for notifying the results and delivers the message to the roaming-requested Terminal 400 in step 610. Otherwise, the BSM 423 of the Home SP 420 proceeds to step 609 where it can include even the cause of the roaming unavailability when necessary while notifying the Roaming Unavailable subscription, or can deliver the type of the partially available service if possible.

Figure 7:
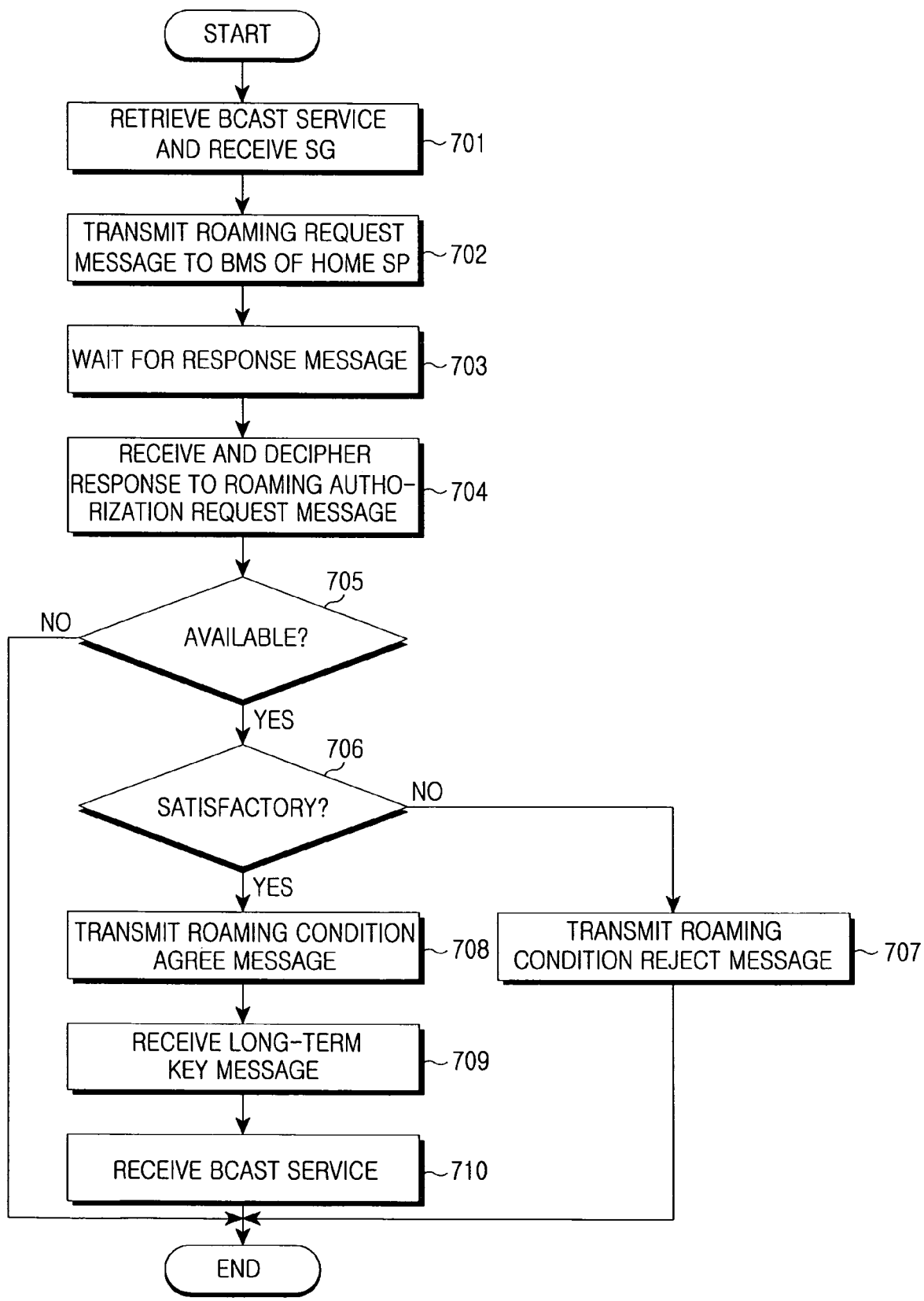
FIG. 7 is a flowchart illustrating an operation of a Terminal according to an exemplary embodiment of the present invention.

FIG. 7 is a flowchart illustrating an operation of a Terminal 400 according to an exemplary embodiment of the present invention. A description of FIG. 7 will be made with reference to FIG. 4.

The Terminal 400 can discover a Visited SP 410 through a lower BDS-SD 111, BDS 112 or IN 113 in an area other than the area of its Home SP 420, and detect the BCAST service of the corresponding area. Upon detecting the BCAST service, the Terminal 400 can find a Service Guide Context fragment 201 and fully receive the service guide using a Service Guide Delivery Descriptor fragment 202 depending on the Service Guide Context fragment 201 in step 701. Upon receipt of the service guide, the Terminal 400, if it desires to receive the roaming service, sends a Roaming Request message for roaming service authorization to a BSM 423 of its Home SP 420 in step 702. The contents of the sent message are shown in Table 12. After sending the Roaming Request message, the Terminal 400 waits for a response in step 703. If a roaming agreement between the BSM 423 of the Home SP 420 and the BSM 413 of the Visited SP 410 is determined, the Terminal 400 receives a response message to the request from the BSM 423 of the Home SP 420 and deciphers the received response message in step 704. The contents of the response message are shown in Table 14. Thereafter, the Terminal 400 determines in step 705 whether the roaming is available by deciphering the response message.

If the roaming is unavailable, the Terminal 400 gives up the roaming. However, if the roaming is available, the Terminal 400 checks the roaming condition in the Visited SP 410 in step 706 to determine whether the Terminal 400 is acceptable. If the Terminal 400 does not agree with the roaming condition, the Terminal 400 transmits a Confirm message for rejecting the roaming to the BSM 413 of the Visited SP 410 in step 707. However, if the Terminal 400 agrees with the roaming condition, the Terminal 400 sends a Confirm message indicating the agreement to the BSM 413 of the Visited SP 410 in step 708. After sending the agreement message, the Terminal 400 receives a Long-Term Key message in step 709, and receives the BCAST service after preparing for service or content deciphering in step 710.

A description will now be made of a roaming procedure according to an exemplary embodiment of the present invention.

Figure 8:
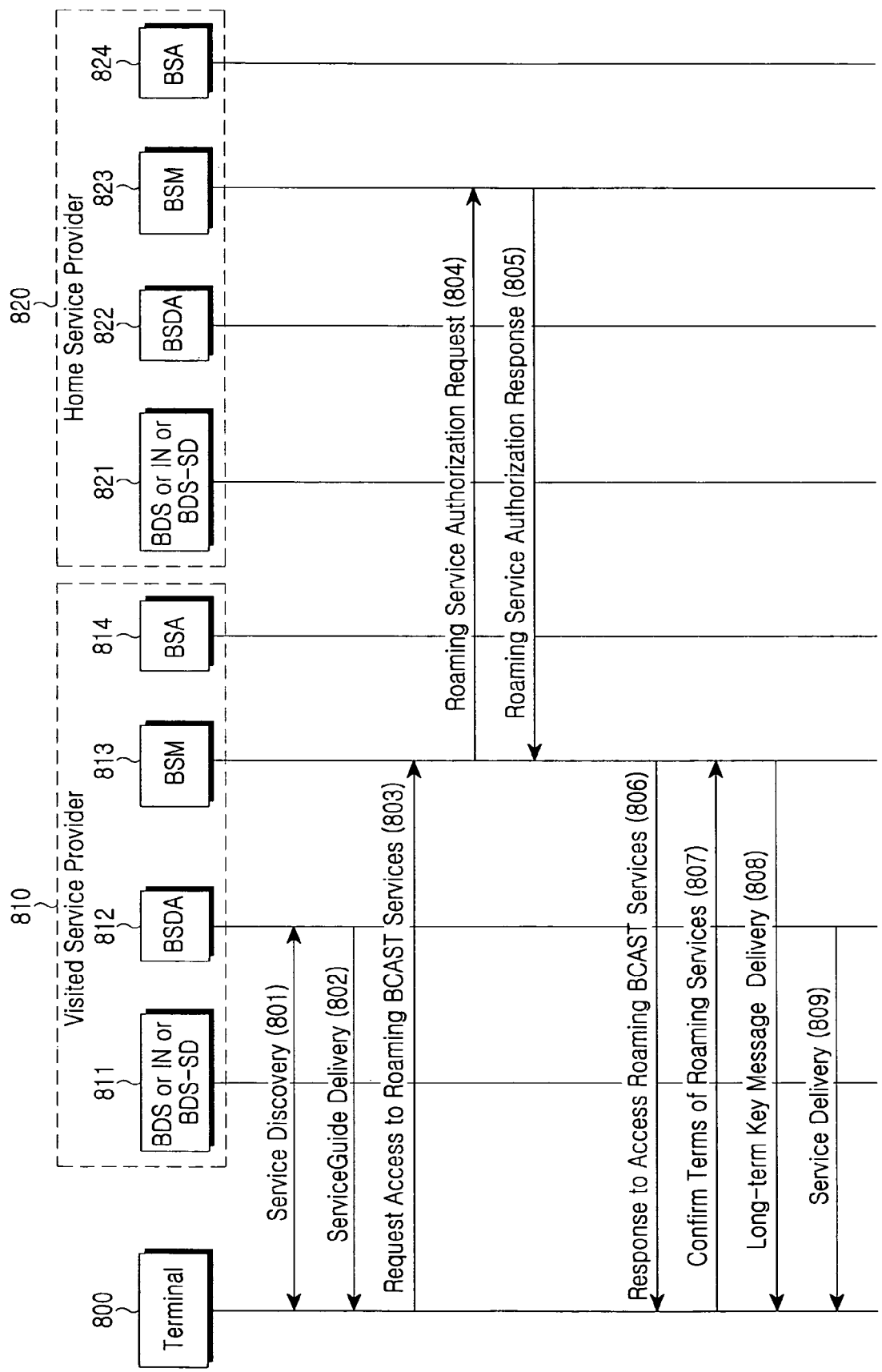
FIG. 8 is a signaling diagram illustrating a roaming procedure according to an exemplary embodiment of the present invention.

FIG. 8 is a signaling diagram illustrating a roaming procedure according to an exemplary embodiment of the present invention.

Before a description of each step in the roaming procedure according to an exemplary embodiment of the present invention is given, each entity of FIG. 8 will be described.

Figure 1:
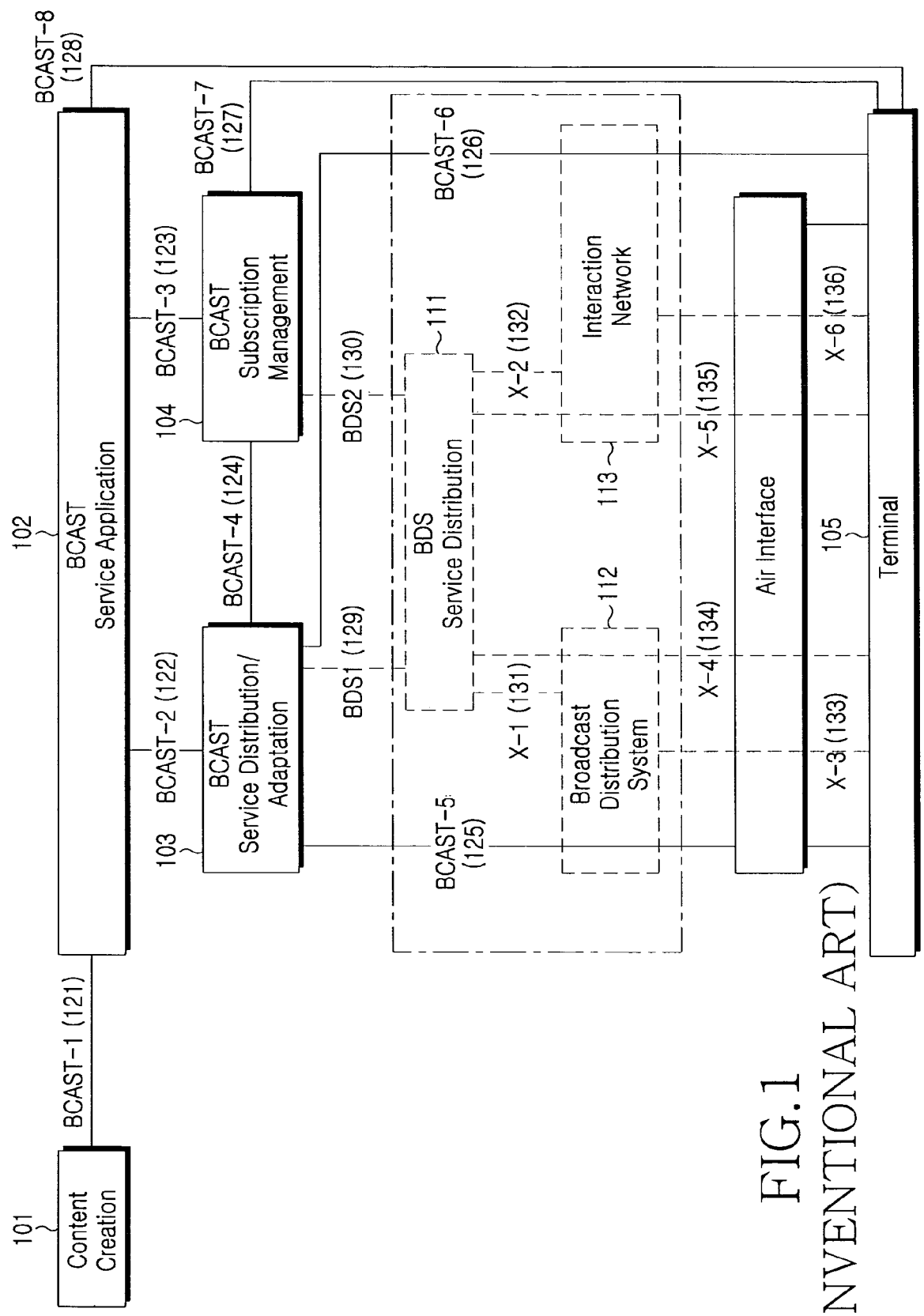
FIG. 1 is a diagram illustrating a functional structure of a mobile broadcasting system.

BSAs 824 and 814 in a Home SP 820 and a Visited SP 810 are equal in function to the BSA 102 of FIG. 1, so they are separately shown to differentiate the BSA in the Home SP 820 from the BSA in the Visited SP 810 during roaming. Similarly, BSMs 823 and 813 have the same function as that of the BSM 104 of FIG. 1, BSDAs 822 and 812 have the same function as that of the BSDA 103 of FIG. 1, and group entities 821 and 811, each composed of BDS-SD, BDS and/or IN, have the same function as the group entity of the BDS-SD 111, the BDS 112 and/or the IN 113 of FIG. 1. A Terminal 800 has the same function as that of the Terminal 105 of FIG. 1. The above-mentioned entities are not all used in the roaming procedure according to an exemplary embodiment of the present invention, so the entities used in the roaming procedure will be described.

In steps 801 and 802 corresponding to the part not directly specified in the roaming procedure, it is assumed that as the Terminal 800 arrives at the roaming area, the roaming procedure is automatically performed by the group entity 811 of BDS, IN and/or BDS-SD, and the BSDA 812, which are lower networks for supporting the BCAST service. However, for reference, in step 801, the group entity 811 of BDS, IN and/or BDS-SD, which is a lower network of the BCAST, should perform roaming, provide the roaming indication information to the Terminal 800, and provide basic information based on which the Terminal 800 can receive the service guide. Using the basic information, the Terminal 800 can receive the service guide in step 802 by receiving the Service Guide Context fragment 201 of FIG. 2.

In step 802, upon receipt of the service guide, the Terminal 800 acquires the information described in Table 11.

In step 803, using the information acquired from Table 11, the Terminal 800 generates a Roaming Request message for making a roaming registration request to the Visited SP 810, and sends the message to the BSM 813 of the Visited SP 810. The contents of the Roaming Request message generated by the Terminal 800 in step 803 are shown in Table 16 below.

TABLE 16

Request ID
Terminal ID
Home SP ID
Home SP BSM ID
Purchase Item ID

Request ID, a first item of Table 16, is an identifier given to consistently identify and manage one roaming registration request procedure. The Request ID is an identifier generated for allowing a terminal to uniquely identify its own roaming registration request. The Request ID is constant from the time it is generated in FIG. 8 until the time the roaming registration request procedure of FIG. 8 ends. Terminal ID is a unique ID for the terminal to uniquely identify a terminal. The Terminal ID is used for identifying who makes the roaming registration request. Home SP ID is an identifier used for allowing the roaming terminal to inform the Visited SP 810 who it's Home SP 820 is. Using this information, the Visited SP 810 can determine to which entity the roaming-requested Terminal 800 originally belongs, and can also determine a roaming relationship with the corresponding entity. Here, when the BSM 813 of the Visited SP 810 determines from the Home SP ID that there is no roaming agreement made with the BSM 813 itself, the BSM 813 directly proceeds to step 806 where it can notify a roaming unavailability to the Terminal 800.

Home SP BSM ID is used for informing the Visited SP 810 of the entity that actually makes a negotiation on the roaming service registration procedure with the identifier of the BSM, used by the Home SP 820. Finally, Purchase Item ID is used for indicating the service that the roaming user desires to receive. For the terminal that made the roaming registration request in step 803, the BSM 813 of the Visited SP 810 can additionally perform an authentication process on the terminal. This can be performed spontaneously by the BSM 813 of the Visited SP 810, or can be performed through a connection with a BSM 823 of the Home SP 820 or through the third authentication entity. Because the authentication process is not related to the basis of the present invention, a description thereof will be omitted herein for clarity and conciseness.

In step 804, for the roaming registration request received from the Terminal 800 in step 803, the BSM 813 of the Visited SP 810 sends a roaming registration request to the BSM 823 of the Home SP 820 of the Terminal 800. The contents of the message sent from the BSM 813 of the Visited SP 810 to the BSM 823 of the Home SP 820 in step 804 are shown in Table 17 below.

TABLE 17

Request ID
Terminal ID
Visited SP ID
Visited SP BSM ID

Request ID, a first item of Table 17, is an identifier given to consistently identify and manage one roaming registration request procedure. The Request ID is an identifier generated for allowing a terminal to uniquely identify its own roaming registration request. The Request ID is constant from the time it is generated in FIG. 8 until the time the roaming registration request procedure of FIG. 8 ends. Terminal ID is a unique ID for the terminal to uniquely identify a terminal. The Terminal ID is used for identifying who makes the roaming registration request. Visited SP ID is used by the Visited SP 810 to provide its own information to the BSM 823 of the Home SP 820 of the roaming-requested terminal. Visited SP BSM ID is used for providing the BSM 823 of the Home SP 820 with the information indicating the entity with which the Visited SP 810 will make a roaming-related negotiation. This is because the Visited SP 810 can have several BSMs.

In step 805, the BSM 823 of the Home SP 820 sends a response to the roaming registration request received in step 804. Table 18 below shows the contents of the message sent from the BSM 823 of the Home SP 820 to the BSM 813 of the Visited SP 810.

TABLE 18

Request ID
Roaming Authorization Status
Terminal Subscription Type

Request ID, a first item of Table 18, is an identifier given to consistently identify and manage one roaming registration request procedure. The Request ID is an identifier generated for allowing a terminal to uniquely identify its own roaming registration request. The Request ID is constant from the time it is generated in FIG. 8 until the time the roaming registration request procedure of FIG. 8 ends. Roaming Authorization Status is used for allowing the Home SP 820 to determine whether the roaming is authorized by retrieving subscription of the roaming-requested Terminal 800 in the Visited SP 810 using the Terminal ID received in step 804, and to provide the results to the Visited SP 810. Terminal Subscription Type is information provided so that the Visited SP 810 can evaluate which reception right the roaming Terminal 800 will have in the Visited SP 810. The Terminal Subscription Type can be a class of the service that the roaming-requested Terminal 800 can receive from the roaming-requested Visited SP 810 based on the roaming agreement made between the Home SP 820 and the Visited SP 810. This can be defined in the form of a roaming allowed class number or code agreed between the two service providers, and its form is not defined in an exemplary embodiment of the present invention.

Steps 804 and 805 may also be omitted when necessary. For example, the steps can be omitted when the Terminal 800, after completing the roaming registration procedure, desires to make an additional service request while receiving the service.

In step 806, the Visited SP 810 sends a response to the received roaming registration request to the Terminal 800. The contents of the message sent from the BSM 813 of the Visited SP 810 to the Terminal 800 in step 806 are shown in Table 19 below.

TABLE 19

Request ID
Roaming Authorization Status
Roaming Service Allowed Scope

Request ID, a first item of Table 19, is an identifier given to consistently identify and manage one roaming registration request procedure. The Request ID is an identifier generated for allowing a terminal to uniquely identify its own roaming registration request. The Request ID is constant from the time it is generated in FIG. 8 until the time the roaming registration request procedure of FIG. 8 ends. Roaming Authorization Status is used for providing the evaluation result made on the roaming possibility using the information provided from the Home SP 820 in step 805, to the roaming-requested Terminal 800.

Roaming Service Allowed Scope, when roaming is available, is used for allowing a value of the Terminal Subscription Type received in step 805 to indicate which reception right the roaming Terminal 800 will actually have in the Visited SP 810. The reception possibility of the service corresponding to the Purchase Item ID requested by the Terminal 800 is also defined in the Roaming Service Allowed Scope. In addition, the information related to occurrence of additional cost and a change in the charging system is also added to the Roaming Service Allowed Scope during roaming.

In step 807, the Terminal 800 informs the BSM 813 of the Visited SP 810 whether it agrees with the information in the Roaming Service Allowed Scope in the message received in step 806 as a response to the roaming registration request to its Visited SP 810. If the Terminal 800 does not agree with the additional cost occurring during roaming or the change in the charging system, the roaming service is not achieved. However, if the Terminal 800 agrees, it proceeds to the next step. Table 20 below shows a Confirm message with which the Terminal 800 provides a final confirm for the roaming to the Visited SP 810.

TABLE 20

| Request ID |
|---|
| Roaming Confirm Status |

Request ID, a first item of Table 20, is an identifier given for enabling to consistently identify and manage one roaming registration request procedure. The Request ID is an identifier generated for allowing a terminal to uniquely identify its own roaming registration request. The Request ID is constant from the time it is generated in FIG. 8 until the time the roaming registration request procedure of FIG. 8 ends. Roaming Confirm Status is an item used for indicating whether or not the Terminal 800 will roam to the Visited SP 810.

In step 808, the Terminal 800 receives a Long-Term Key message used for deciphering the received service when it finally determined to receive the roaming service. The Terminal 800 receives the Long-Term Key message in step 808 using the long-term key reception method defined in the BCAST standard, which this method will not be dealt with in an exemplary embodiment of the present invention.

In step 809, the Terminal 800 receives the service from the Visited SP 810 through the roaming.

Although it is also possible to enable the roaming using the message items defined in FIG. 8 in the Service Provisioning message and procedure defined in OMA BCAST as well as the roaming procedure described in FIG. 8, this is not dealt with in an exemplary embodiment of the present invention. For the Service Provisioning, refer to the documents in the OMA web site http://www.openmobilealliance.org/ftp/Public_documents/BAC/BCAST/Permanent_documents/OMA-TS-BCAST_Services-V1_0-20050909-D.zip, which are incorporated by reference. The reference documents were the newest edition as of the filing date of this application, and if there is any update in the documents in the future, the updated edition will be applied.

Figure 9:
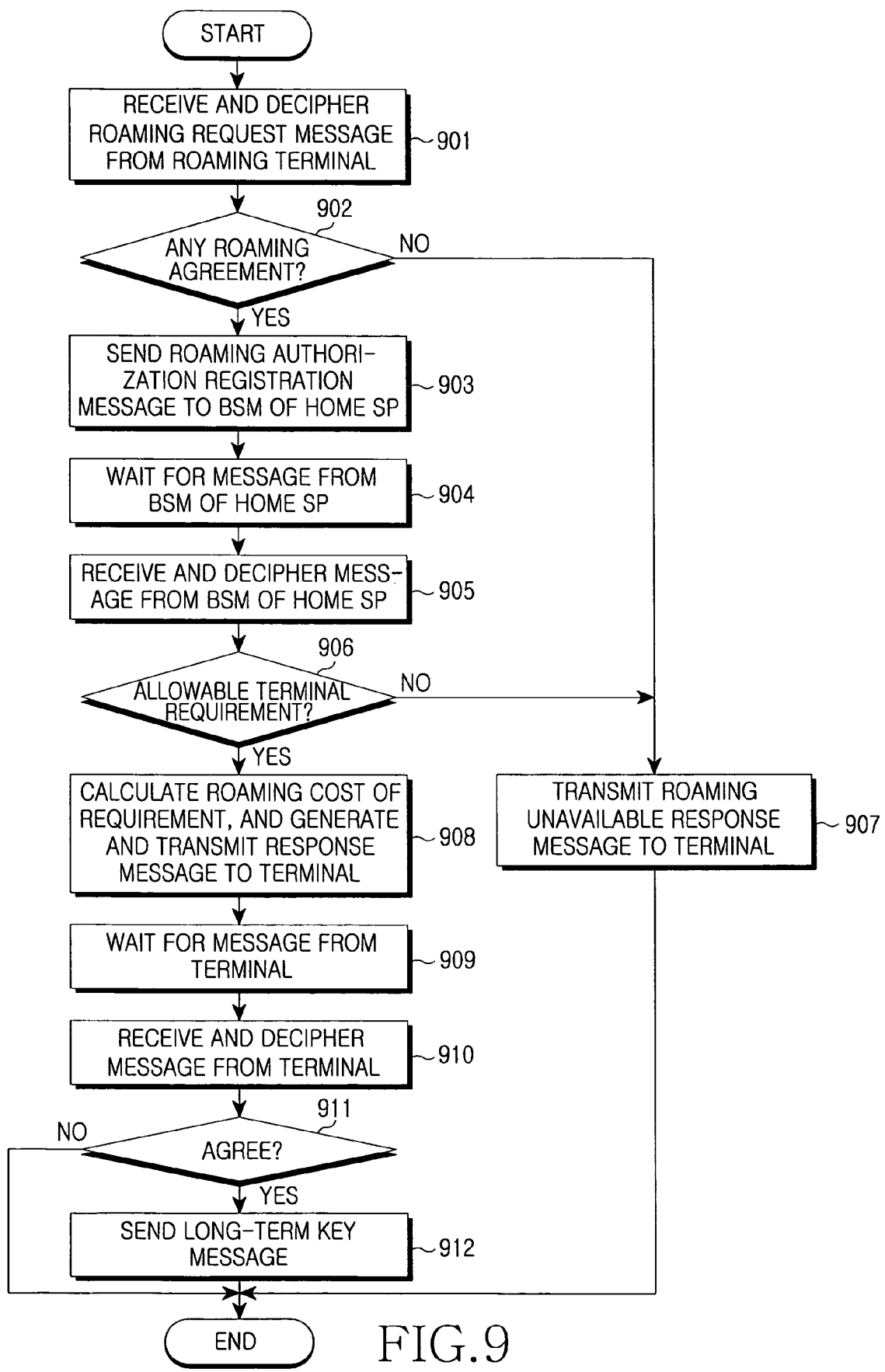
FIG. 9 is a flowchart illustrating an operation of a BSM of a Visited SP according to an exemplary embodiment of the present invention.

FIG. 9 is a flowchart illustrating an operation of a BSM 813 of a Visited SP 810 according to an exemplary embodiment of the present invention. A description of FIG. 9 will be made with reference to FIG. 8.

In step 901, the BSM 813 of the Visited SP 810 receives a Roaming Request message for a roaming registration request from a roaming Terminal 800, and deciphers the received message. The contents of the received message are shown in Table 16. Using the deciphered contents of the message, the BSM 813 of the Visited SP 810 determines in step 902 whether the roaming-requested Terminal 800 is a terminal of the service provider having a roaming agreement with the Terminal 800 itself. If the roaming-requested Terminal 800 is a terminal belonging to the service provider having no roaming agreement with the Terminal 800 itself, the BSM 813 of the Visited SP 810 proceeds to step 907 where it transmits a Roaming Unavailable Response message (or Roaming Service Unauthorized Response message) to the Terminal 800. In step 907, the BSM 813 of the Visited SP 810 can include even the cause of the roaming unavailability when necessary while transmitting the Roaming Unavailable message, or can deliver the type of the partially available service if possible.

However, if the Terminal 800 belongs to the service provider having a roaming agreement with the Terminal 800 itself, the BSM 813 of the Visited SP 810 transmits a Terminal Request message to the BSM 823 of the Home SP 820 of the roaming-requested terminal in step 903. The contents of the transmitted message are shown in Table 17. Thereafter, in step 904, the BSM 813 of the Visited SP 810 waits for a response message from the BSM 823 of the Home SP 820 of the roaming-requested Terminal 800. Upon receipt of the response message from the BSM 823 of the Home SP 820, the BSM 813 of the Visited SP 810 deciphers the received message in step 905. The contents of the received message are shown in Table 18. Thereafter, in step 906, the BSM 813 of the Visited SP 810 checks the contents of the received message, and then determines whether it can authorize the Terminal 800 to perform the roaming and whether it will authorize the Terminal 800 to perform the roaming using the subscription information of the terminal. If the BSM 813 of the Visited SP 810 cannot authorize the Terminal 800 to perform the roaming, it transmits a Roaming Unavailable message to the terminal in step 907. In step 907, the BSM 813 of the Visited SP 810 can include even the cause of the roaming unavailability when necessary while transmitting the Roaming Unavailable message, or can deliver the type of the partially available service if possible.

If the BSM 813 of the Visited SP 810 can authorize the Terminal 800 to perform the roaming, it generates a response message taking into account the additional charge occurring during roaming and the change in the charging system using the subscription information of the Terminal 800, and transmits the response message to the terminal in step 908. After transmitting the response message, the BSM 813 of the Visited SP 810 waits for a response from the Terminal 800 in step 909. Upon receipt of the Final Confirm message for the roaming from the Terminal 800, the BSM 813 of the Visited SP 810 deciphers the received message in step 910, and determines in step 911 whether the terminal has roamed. If the contents of the received message indicate roaming rejection, the roaming request procedure is terminated. Otherwise, if the contents of the received message indicate roaming acceptance, a Long-Term Key message is transmitted to the terminal in step 912.

Figure 10:
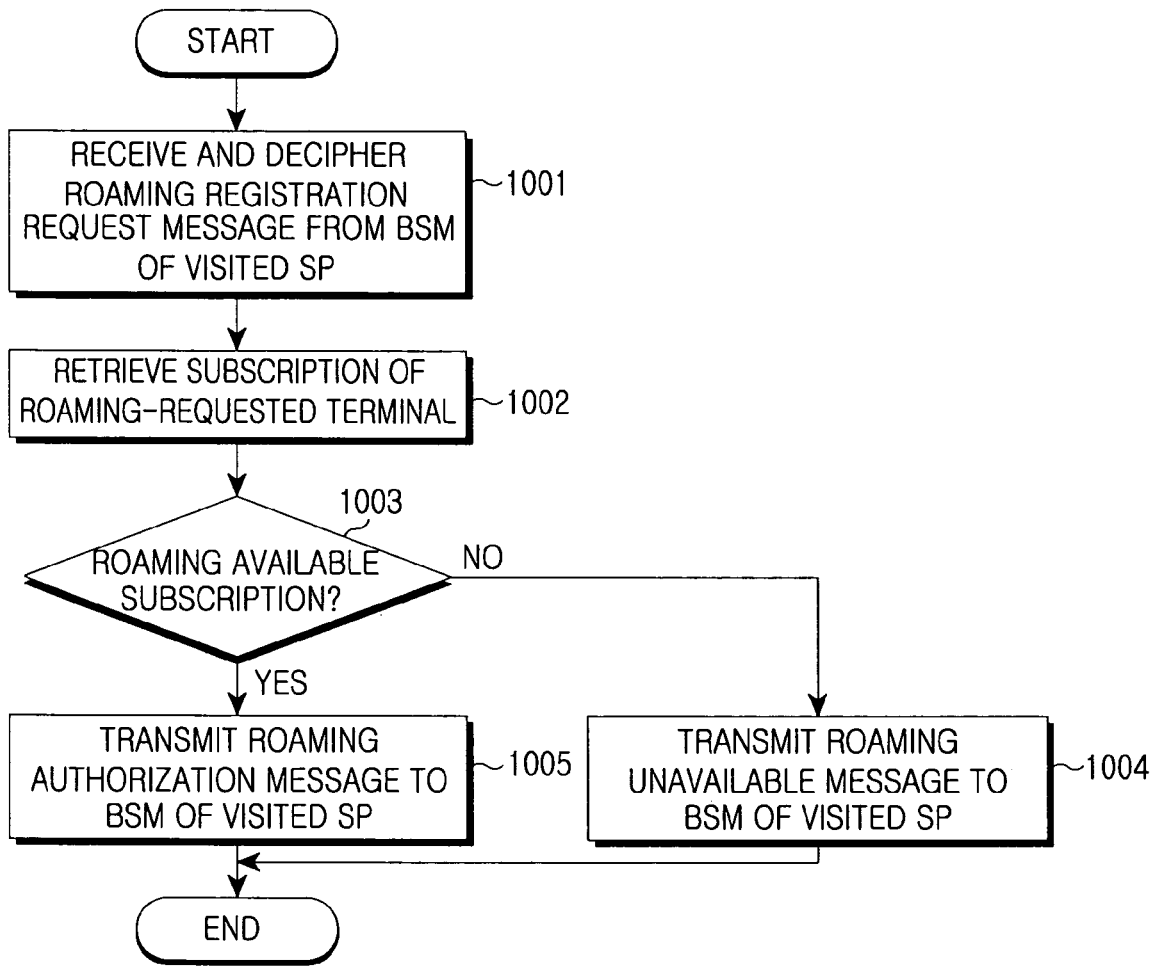
FIG. 10 is a flowchart illustrating an operation of a BSM of a Home SP according to an exemplary embodiment of the present invention.

FIG. 10 is a flowchart illustrating an operation of a BSM 823 of a Home SP 820 according to an exemplary embodiment of the present invention. A description of FIG. 10 will be made with reference to FIG. 8.

In step 1001, the BSM 823 of the Home SP 820 receives a Roaming Request message for a roaming-requested terminal from a BSM 813 of a Visited SP 810. The contents of the message received by the Home SP 820 are shown in Table 17. The BSM 823 of the Home SP 820 retrieves subscription of the roaming-requested terminal in the Visited SP 810 in step 1002, and determines in step 1003 whether the roaming-requested Terminal 800 is allowed to receive the roaming service. If the roaming-requested Terminal 800 is allowed to receive the roaming service, the BSM 823 of the Home SP 820 transmits in step 1005 to the Visited SP 810 a message including the contents shown in Table 18 where the subscription of the Terminal 800 is included. If the roaming-requested Terminal 800 is not authorized to receive the roaming service, the BSM 823 of the Home SP 820 transmits a Roaming Unavailable message (or Roaming Unauthorized message) to the Visited SP 810 in step 1004. Here, the contents of the message are shown in Table 14.

Figure 11:
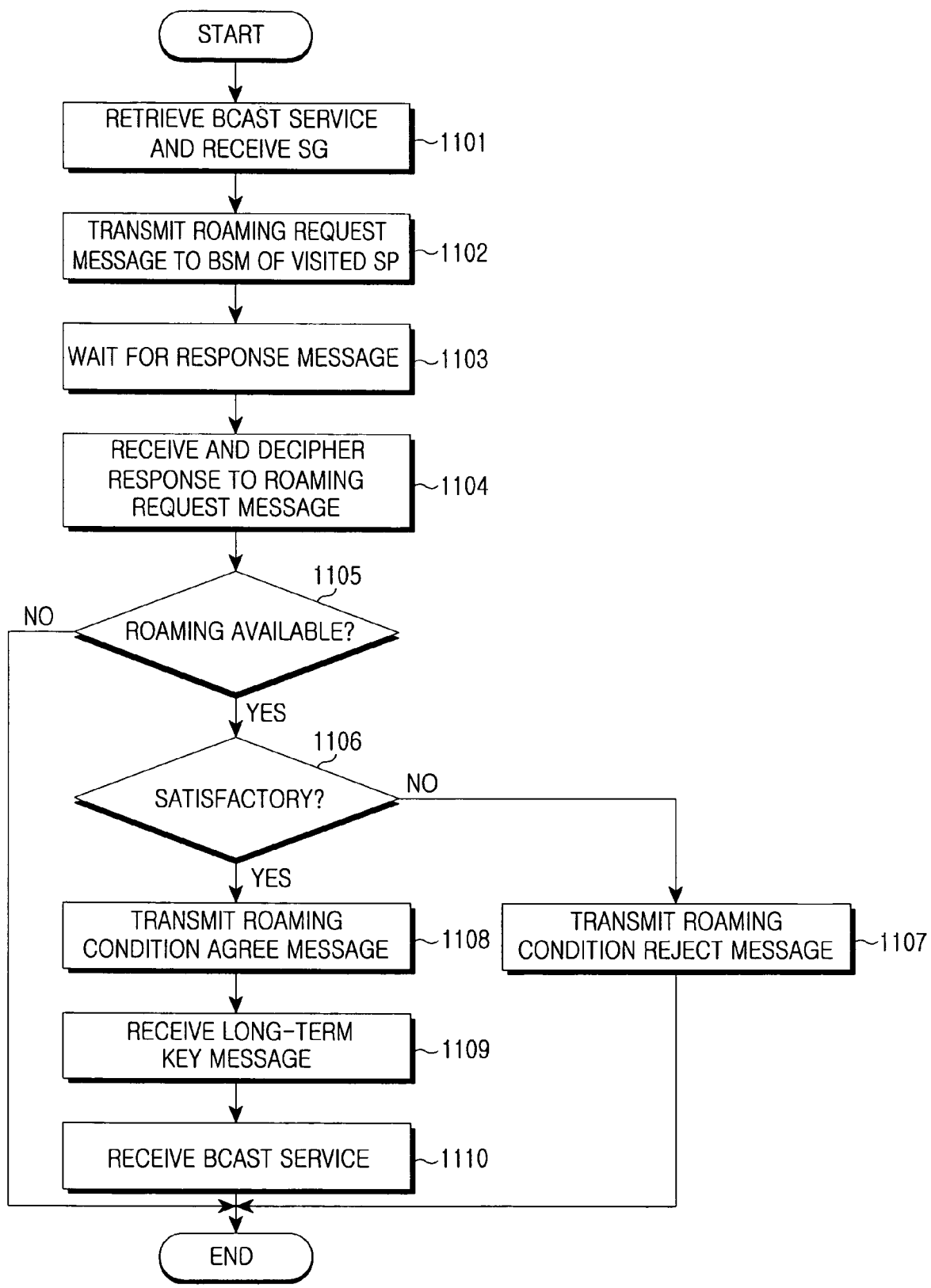
FIG. 11 is a flowchart illustrating an operation of a Terminal according to an exemplary embodiment of the present invention.

FIG. 11 is a flowchart illustrating an operation of a Terminal 800 according to an exemplary embodiment of the present invention. A description of FIG. 11 will be made with reference to FIG. 8.

The Terminal 800 can discover a Visited SP 810 through a lower BDS-SD 111, BDS 112 or IN 113 in an area other than the area of its Home SP 820, and detect the BCAST service of the corresponding area. Upon detecting the BCAST service, the Terminal 800 can find a Service Guide Context fragment 201 and fully receive the service guide using a Service Guide Delivery Descriptor fragment 202 depending on the Service Guide Context fragment 201 in step 1101. Upon receipt of the service guide, the Terminal 800, if it desires to receive the roaming service, sends a Roaming Request message for roaming service authorization to a BSM 813 of the Visited SP 810 in step 1102. The contents of the sent message are shown in Table 16.

After sending the Roaming Request message, the Terminal 800 waits for a response in step 1103. If a roaming agreement between the BSM 823 of the Home SP 820 and the BSM 813 of the Visited SP 810 is determined, the Terminal 800 receives a response message to the request from the BSM 813 of the Visited SP 810 and deciphers the received response message in step 1104. The contents of the response message are shown in Table 19. Thereafter, the Terminal 800 determines in step 1105 whether the roaming is available by deciphering the response message.

If the roaming is unavailable, the Terminal 800 gives up the roaming. However, if the roaming is available, the Terminal 800 checks the roaming condition in the Visited SP 810 in step 1106 to determine whether the Terminal 800 is acceptable. If the Terminal 800 does not agree with the roaming condition, the Terminal 800 transmits a Confirm message for rejecting the roaming to the BSM 813 of the Visited SP 810 in step 1107. However, if the Terminal 800 agrees with the roaming condition, the Terminal 800 sends a Confirm message indicating the agreement to the BSM 813 of the Visited SP 810 in step 1108. After sending the agreement message, the Terminal 800 receives a Long-Term Key message in step 1109, and receives the BCAST service after preparing for service or content deciphering in step 1110.

Figure 13:
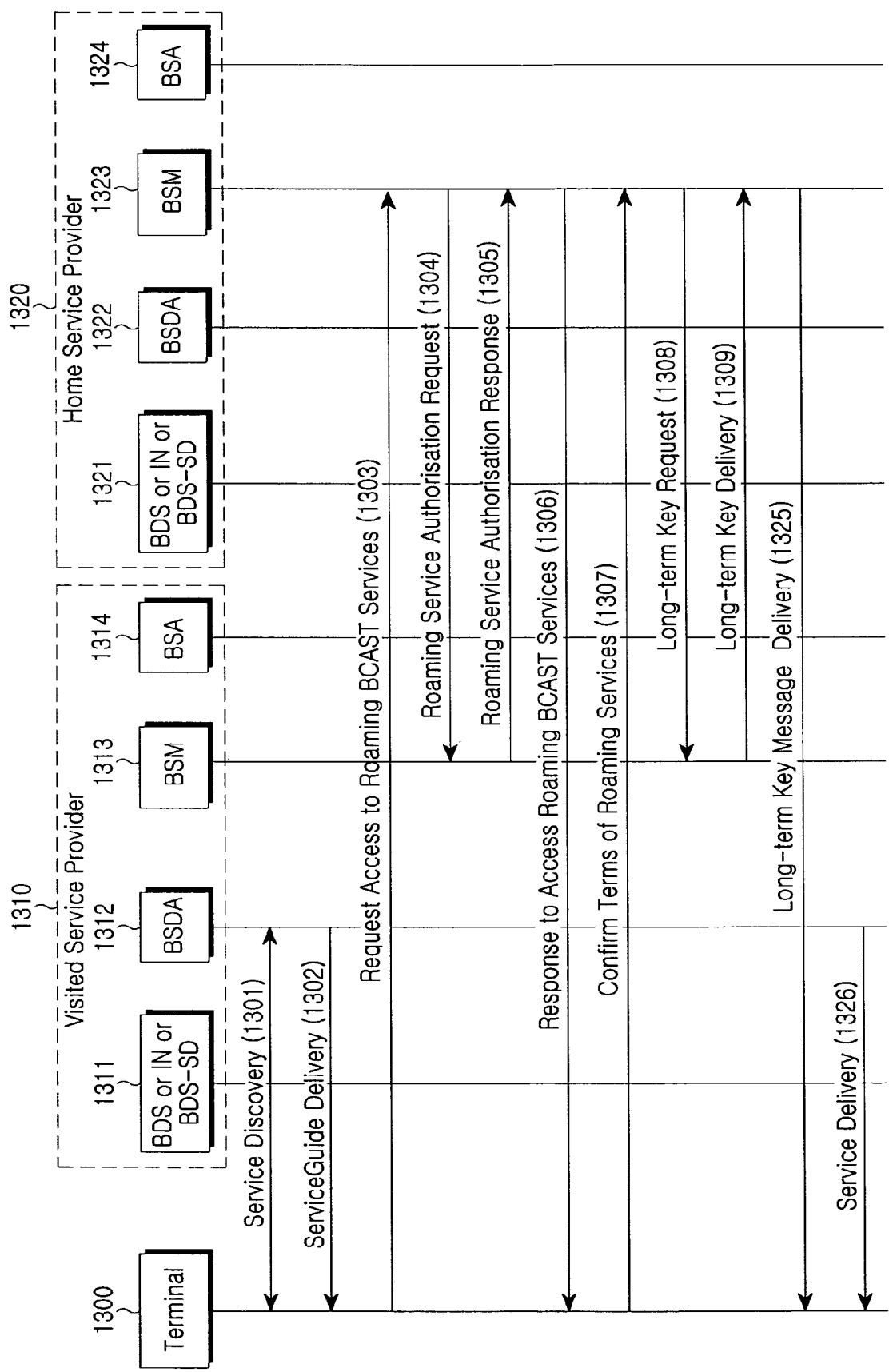
FIG. 13 is a signaling diagram illustrating a roaming procedure according to an exemplary embodiment of the present invention.

FIG. 13 is a signaling diagram illustrating a roaming procedure according to an exemplary embodiment of the present invention. Before a description of each step in the roaming procedure according to the third embodiment is given, each entity of FIG. 13 will be described. BSAs 1324 and 1314 in a Home SP 1320 and a Visited SP 1310 are equal in function to the BSA 102 of FIG. 1, so they are separately shown to differentiate the BSA in the Home SP 1320 from the BSA in the Visited SP 1310 during roaming. Similarly, BSMs 1323 and 1313 have the same function as that of the BSM 104 of FIG. 1, BSDAs 1322 and 1312 have the same function as that of the BSDA 103 of FIG. 1, and group entities 1321 and 1311, each composed of BDS-SD, BDS and/or IN, have the same function as the group entity of the BDS-SD 111, the BDS 112 and/or the IN 113 of FIG. 1. A Terminal 1300 has the same function as that of the Terminal 105 of FIG. 1. The above-mentioned entities are not all used in the roaming procedure according to an exemplary embodiment of the present invention, so the entities used in the roaming procedure will be described.

As shown in FIG. 13, in steps 1301 and 1302 corresponding to the part not directly specified in the roaming procedure, it is assumed that as the Terminal 1300 arrives at the roaming area, the roaming procedure is automatically performed by the group entity 1311 of BDS, IN and/or BDS-SD, and the BSDA 1312, which are lower networks for supporting the BCAST service. However, for reference, in step 1301, the group entity 1311 of BDS, IN and/or BDS-SD, which is a lower network of the BCAST, should perform roaming, provide the roaming indication information to the Terminal 1300, and provide basic information based on which the Terminal 1300 can receive the service guide. Using the basic information, the Terminal 1300 can receive the service guide in step 1302 by receiving the Service Guide Context fragment 201 of FIG. 2.

In step 1302, upon receipt of the service guide, the Terminal 1300 acquires the information described in Table 11. In step 1303, the Terminal 1300 generates a Roaming Request message for making a roaming registration request to the Home SP 1320 using the information acquired from Table 11, and sends the Roaming Request message to the BSM 1323 of the Home SP 1320. The contents of the Roaming Request message generated by the Terminal 1300 in step 1303 are shown in Table 21.

TABLE 21

Request ID
Terminal ID
Visited SP ID
Visited SP BSM ID
Visited BSDA ID
Purchase Item ID Request ID, a first item of Table 21, is an identifier given to consistently identify and manage one roaming registration request procedure. The Request ID is an identifier generated for allowing a terminal to uniquely identify its own roaming registration request. The Request ID is constant from the time it is generated in FIG. 13 until the time the roaming registration request procedure of FIG. 13 ends. Terminal ID is a unique ID for the terminal for enabling to uniquely identify a terminal. The Terminal ID is used for identifying who makes the roaming registration request.

Visited SP ID is an identifier of the service provider that provides the service in the area where the roaming terminal stays. The Visited SP ID is used for providing the service provider of the Home SP 1320 with the information indicating to whom the terminal make a roaming request. Here, when the BSM 1323 of the Home SP 1320 determines from the Visited SP ID that there is no roaming agreement made with the BSM 1323 itself, the BSM 1323 directly proceeds to step 1306 where it can notify a roaming unavailability to the Terminal 1300. Visited SP BSM ID is used for informing the Home SP 1320 of the entity that actually makes a negotiation on the roaming service registration procedure with the identifier of the BSM, used by the Visited SP 1310. Visited BSDA ID is an identifier of the BSDA used by the Visited SP 1310, and because one service provider can provide the service through several BSDAs, the Visited BSDA ID is used for indicating through which BSDA the roaming Terminal 1300 desires to receive the service. Finally, Purchase Item ID is used for indicating the service that the roaming user desires to receive. For the Terminal 1300 that made the roaming registration request in step 1303, the BSM 1323 of the Home SP 1320 can additionally perform an authentication process on the Terminal 1300, and the detailed authentication process will not be dealt with in an exemplary embodiment of the present invention.

In step 1304, for the roaming registration request received from the Terminal 1300 in step 1303, the Terminal 1300 sends a roaming registration request to the BSM 1313 of its roaming Visited SP 1310. The contents of the message sent from the BSM 1323 of the Home SP 1320 to the BSM 1313 of the Visited SP 1310 in step 1304 are shown in Table 22.

TABLE 22

Request ID
Terminal ID
Home SP ID
Home SP BSM ID
Visited BSDA ID
Terminal Subscription Type
Purchase Item ID Request ID, a first item of Table 22, is an identifier given to consistently identify and manage one roaming registration request procedure. The Request ID is an identifier generated for allowing a terminal to uniquely identify its own roaming registration request. The Request ID is constant from the time it is generated in FIG. 13 until the time the roaming registration request procedure of FIG. 13 ends. Terminal ID is a unique ID for the terminal for enabling to uniquely identify a terminal. The Terminal ID is used for identifying who makes the roaming registration request. Home SP ID is used for indicating from which service provider the terminal that requested the roaming registration in the Visited SP 1310 has originally received the service. Using this information, the BSM 1313 of the Visited SP 1310 can recognize that the roaming-requested Terminal 1300 belongs to the service provider with whom its roaming agreement is made. Home SP BSM ID is used for informing the Visited SP 1310 of the entity for a negotiation needed in the roaming registration process. The BSM 1313 of the Visited SP 1310 responds to the roaming registration result depending on the Home SP BSM ID. Visited BSDA ID is used for providing the Visited SP 1310 with the information indicating in which service area the terminal is currently requesting the service. Terminal Subscription Type is information provided to the Visited SP 1310 to evaluate in which class the roaming-requested Terminal 1300 can receive services of the Visited SP 1310, and it is evaluated along with Purchase Item ID. The Terminal Subscription Type can be a class of the service that the roaming-requested Terminal 1300 can receive from the roaming-requested Visited SP 1310 based on the roaming agreement made between the Home SP 1320 and the Visited SP 1310. This can be defined in the form of a roaming allowed class number or code agreed between the two service providers, and its form is not defined in this invention. Purchase Item ID is a service requested by the terminal, and depending on whether it can be received with the separate cost or depending on a roaming agreement between the Visited SP 1310 and the Home SP 1320, its reception possibility is determined based on the evaluation on whether it is processed with subscription of the roaming-requested terminal.

In step 1305, the BSM 1313 of the Visited SP 1310 sends a response to the request received in step 1304. The main purpose in step 1305 is to inform the available scope of the roaming service requested by the terminal using the information received in step 1304. A scope of the service that the terminal can receive from the Visited SP 1310 can also be provided along with authorization for the roaming service requested by the terminal. The message sent from the BSM 1313 of the Visited SP 1310 to the BSM 1323 of the Home SP 1320 in step 1305 is shown in Table 23 below.

TABLE 23

Request ID
Roaming Authorization Status
Roaming Service Allowed Scope

Request ID, a first item of Table 23, is an identifier given to consistently identify and manage one roaming registration request procedure. The Request ID is an identifier generated for allowing a terminal to uniquely identify its own roaming registration request. The Request ID is constant from the time it is generated in FIG. 13 until the time the roaming registration request procedure of FIG. 13 ends. Roaming Authorization Status is used for providing the evaluation result made on the roaming possibility using the information provided from the Visited SP 1310 in step 1304, to the BSM 1323 of the Home SP 1320 of the roaming-requested Terminal 1300. Roaming Service Allowed Scope, when roaming is available, is used for allowing a value of the Terminal Subscription Type received in step 1304 to indicate which reception right the roaming Terminal 1300 will actually have in the Visited SP 1310. The reception possibility of the service corresponding to the Purchase Item ID requested by the Terminal 1300 is also defined in the Roaming Service Allowed Scope. In addition, the information related to occurrence of additional cost and a change in the charging system is also added to the Roaming Service Allowed Scope during roaming.

Steps 1304 and 1305 may also be omitted when necessary. For example, the steps can be omitted when the Terminal 1300, after completing the roaming registration procedure, desires to make an additional service request while receiving the service. In this case, the BSM 1323 of the Home SP 1320 knows a part or all of the price policy for the roaming of the BSM 1313 of the Visited SP 1310.

In step 1306, the Home SP 1320 notifies the result on the roaming registration request received via the Visited SP 1310 in step 1305 to the Terminal 1300. Actually, in step 1306, the BSM 1323 of the Home SP 1320 forwards the message received in step 1305, to the Terminal 1300. After the Home SP 1320 analyzes the roaming registration request of the terminal in step 1303, if there is no roaming agreement with the Visited SP 1310 in the area where the Terminal 1300 stays, the Home SP 1320 directly proceeds to step 1306 where it fills the contents of Table 23 with a roaming request registration fail and sends it to the Terminal 1300. In this case, the roaming is failed.

In step 1307, the Terminal 1300 sends a response to the roaming registration request that it sent to its Home SP 1320. In this step, the Terminal 1300 informs the BSM 1323 of the Visited SP 1320 whether it agrees with information in the Roaming Service Allowed Scope in the message received in step 1306. If the Terminal 1300 does not agree with the additional cost occurring during roaming or the change in the charging system, the roaming service is not achieved. However, if the Terminal 1300 agrees, it proceeds to the next step. Table 24 below shows a message with which the Terminal 1300 provides a final confirm for the roaming to the Home SP 1320.

TABLE 24

Request ID
Roaming Confirm Status

Request ID, a first item of Table 24, is an identifier given to consistently identify and manage one roaming registration request procedure. The Request ID is an identifier generated for allowing a terminal to uniquely identify its own roaming registration request. The Request ID is constant from the time it is generated in FIG. 13 until the time the roaming registration request procedure of FIG. 13 ends. Roaming Confirm Status is an item used for informing the Home SP 1320 whether or not the Terminal 1300 will perform the roaming.

In step 1308, as the Terminal 1300 agrees with the roaming in step 1307, the BSM 1323 of the Home SP 1320 sends to the BSM 1313 of the Visited SP 1310 a Long-Term Key message necessary for deciphering the service requested by the Terminal 1300.

In step 1309, the BSM 1313 of the Visited SP 1310 delivers the Long-Term Key message requested by the BSM 1323 of the Home SP 1320.

In step 1325, the BSM 1323 of the Home SP 1320 delivers the Long-Term Key message necessary for deciphering the roaming service requested by the Terminal 1300.

Steps 1308, 1309 and 1325 are achieved using the long-term key transmission/reception method defined in the BCAST standard, and a detailed process thereof will now be dealt with in an exemplary embodiment of the present invention.

In step 1326, the Terminal 1300 receives the service of the Visited SP 1310 through the roaming.

Although it is also possible to enable the roaming using the message items defined in FIG. 13 in the Service Provisioning message and procedure defined in OMA BCAST as well as the roaming procedure described in FIG. 13, this is not dealt with in the present invention. For the Service Provisioning, refer to the documents in the OMA web site http://www.openmobilealliance.org/ftp/Public_documents/BAC/BCAST/ Permanent_documents/OMA-TS-BCAST_Services-V1_0- 20050909-D.zip, which are incorporated by reference. The reference documents were the newest edition as of the filing date of this application, and if there is any update in the documents in the future, the updated edition will be applied.

Figure 14:
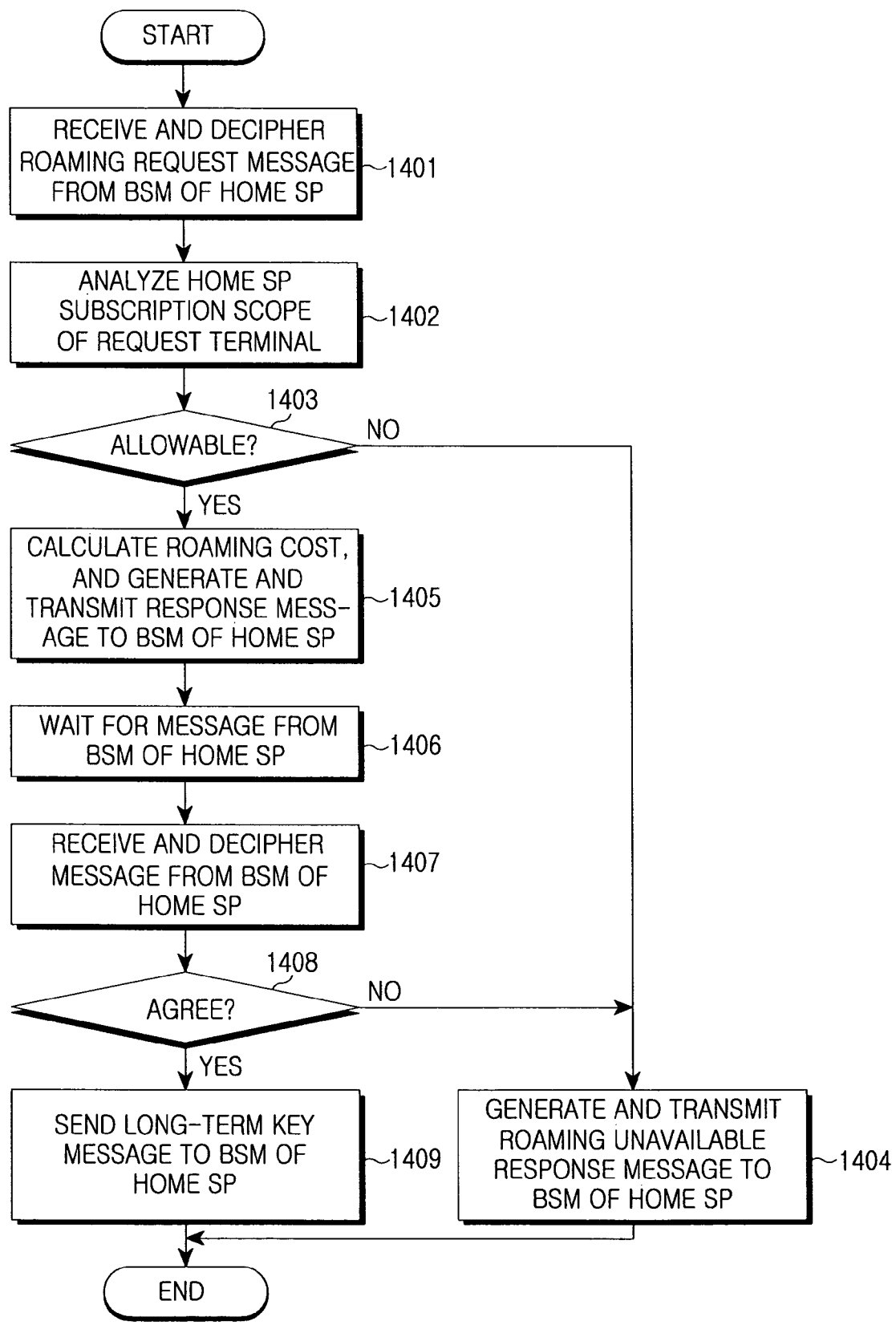
FIG. 14 is a flowchart illustrating an operation of a BSM of a Visited SP according to an exemplary embodiment of the present invention.

FIG. 14 is a flowchart illustrating an operation of a BSM 1313 of a Visited SP 1310 according to an exemplary embodiment of the present invention. A description of FIG. 14 will be made with reference to FIG. 13.

In step 1401, the BSM 1313 of the Visited SP 1310 receives a roaming registration request from a BSM 1323 of a Home SP 1320 of a roaming Terminal 1300, and deciphers the received request message. The contents of the received message are shown in Table 22, and the BSM 1313 of the Visited SP 1310 analyzes Terminal Subscription Type among the contents of the received message in step 1402. Thereafter, in step 1403, the BSM 1313 of the Visited SP 1310 determines a roaming allowed scope by analyzing a relationship between subscription of the roaming-requested terminal and its subscription policy. If the subscription of the roaming-requested terminal is insufficient to support the roaming, the BSM 1323 of the Home SP 1320 generates a message for rejecting the roaming request and delivers the generated message to the BSM 1323 of the Home SP 1320 in step 1404. However, if it is determined that the roaming is available with subscription of the roaming-requested Terminal 1300, the BSM 1313 of the Visited SP 1310 determines in step 1405 whether there is a particular requirement such as Purchase Item. If there is a particular requirement, the BSM 1313 of the Visited SP 1310 calculates the charge, and if there is no particular requirement, the BSM 1313 of the Visited SP 1310 calculates the additional charge occurring during the roaming. After completion of the calculation, the BSM 1313 of the Visited SP 1310 generates a response message to the roaming request. The contents of the generated message are shown in Table 23.

After completion of step 1405, the BSM 1313 of the Visited SP 1310 waits for the final confirm for the roaming from the Home SP 1320 in step 1406. Upon receipt of a Final Confirm message for the roaming of the roaming-requested Terminal 1300 from the Home SP 1320, the BSM 1313 of the Visited SP 1310 deciphers the received message in step 1407. After deciphering the received message, the BSM 1313 of the Visited SP 1310 determines in step 1408 whether the Terminal 1300 agrees with the roaming condition. If the Terminal 1300 does not agree with the roaming condition, the corresponding roaming procedure is terminated. Otherwise, if the Terminal 1300 agrees with the roaming condition, the BSM 1313 of the Visited SP 1310 sends a Long-Term Key message for deciphering the received service to the Home SP 1320 in step 1409. Upon receipt of the Long-Term Key message, the Home SP 1320 forwards the received Long-Term Key message to the Terminal 1300 so that the Terminal 1300 may use the roaming service within its agreed scope.

Figure 15A:
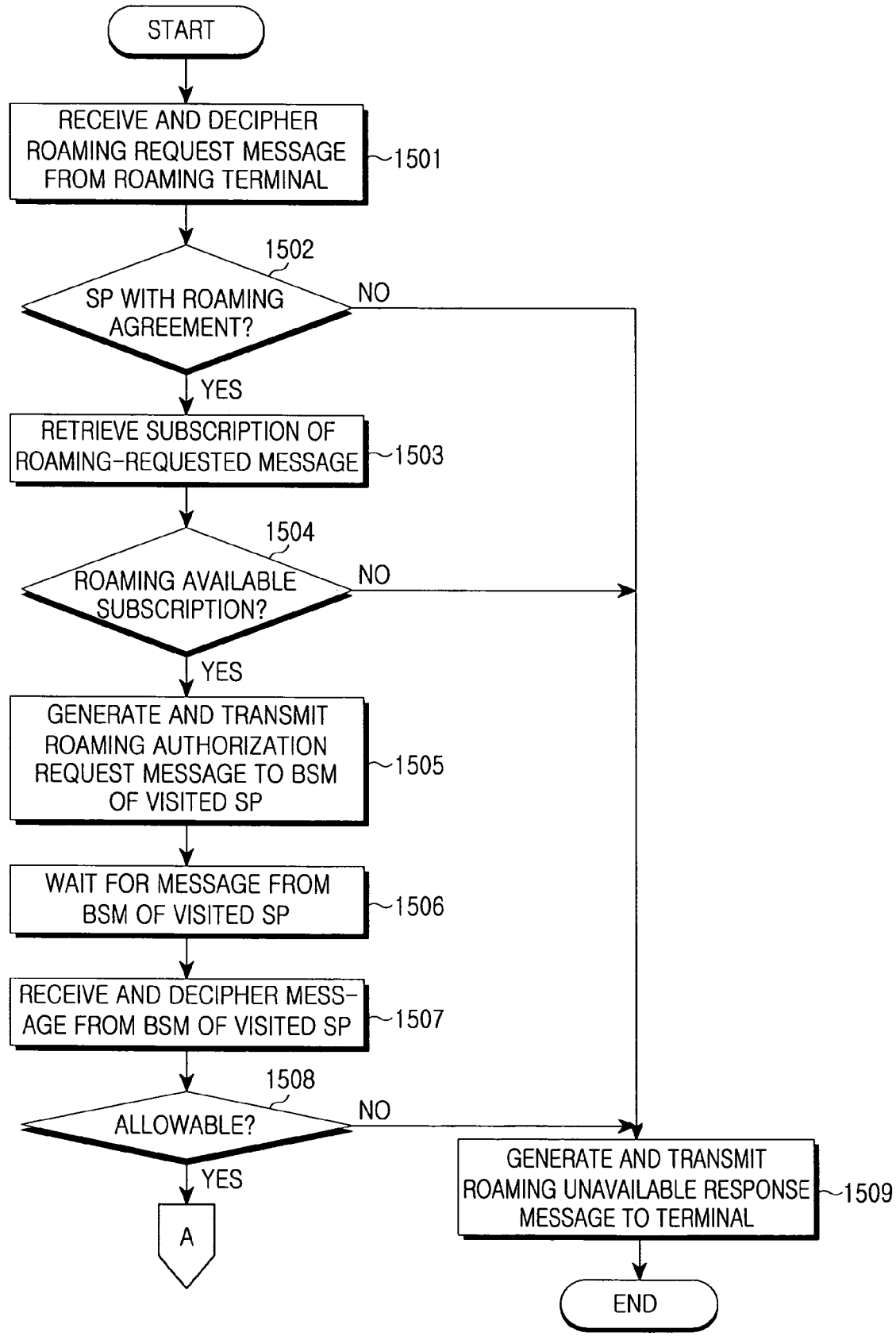
FIGS. 15A and 15B are flowcharts illustrating an operation of a BSM of a Home SP according to an exemplary embodiment of the present invention.
Figure 15B:
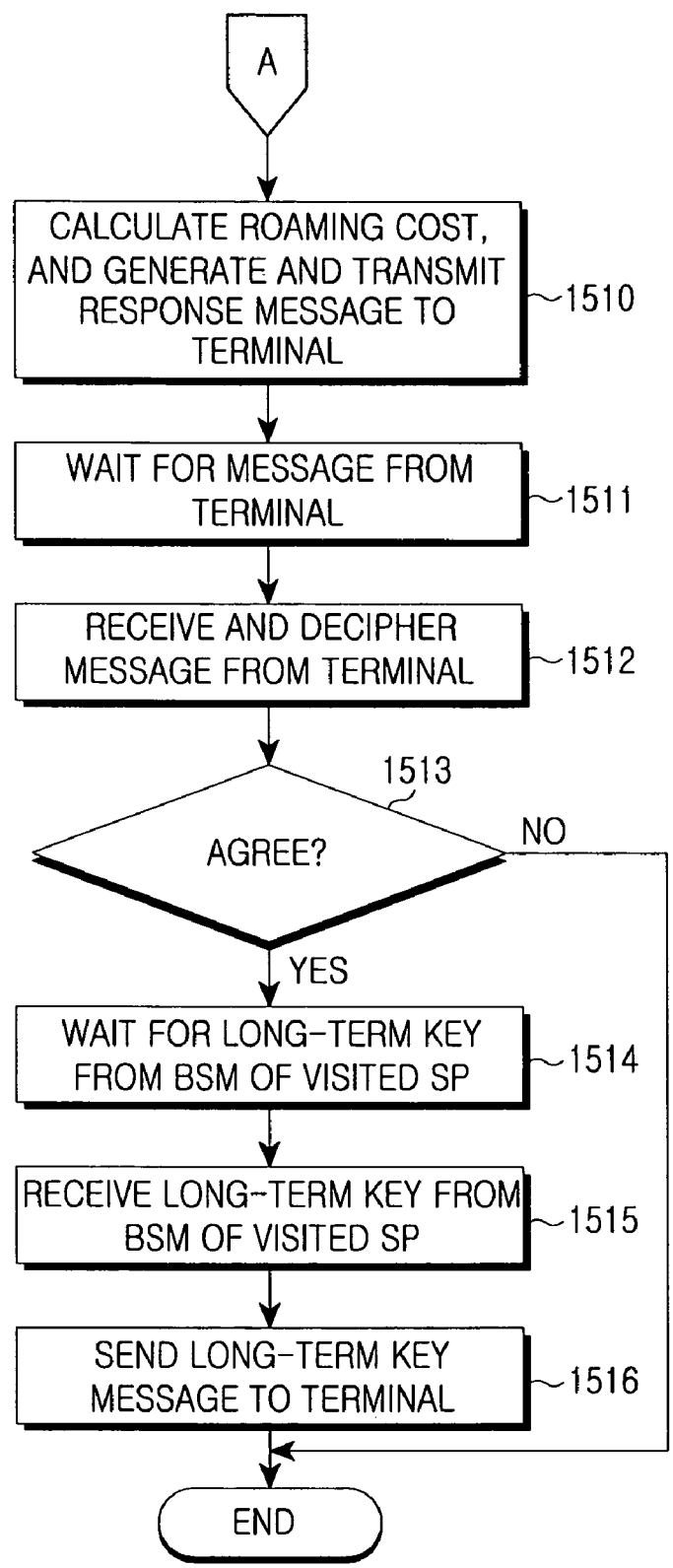

FIGS. 15A and 15B are flowcharts illustrating an operation of a BSM 1323 of a Home SP 1320 according to an exemplary embodiment of the present invention. A description of FIGS. 15A and 15B will be made with reference to FIG. 13.

In step 1501, the BSM 1323 of the Home SP 1320 receives a Roaming Request message for a roaming registration request from a roaming Terminal 1300, and deciphers the received message. The message received by the Home SP 1320 is shown in Table 21. Using the deciphered message, the BSM 1323 of the Home SP 1320 first determines in step 1502 whether there is a roaming agreement with a Visited SP 1310 where the roaming-requested Terminal 1300 stays. If there is no agreement, the BSM 1323 of the Home SP 1320 proceeds to step 1509 where it performs a no-roaming agreement process. In step 1509, the BSM 1323 of the Home SP 1320 can include even the cause of the roaming unavailability when necessary while notifying Roaming Unavailable subscription, or can deliver the type of the partially available service if possible. However, if there is a roaming agreement, the BSM 1323 of the Home SP 1320 retrieves subscription of the corresponding Terminal 1300 in step 1503, and then determines in step 1504 whether the retrieved subscription of the Terminal 1300 is a Roaming Allowable subscription.

If the retrieved subscription is a Roaming Unsupported subscription, the BSM 1323 of the Home SP 1320 proceeds to step 1509 to inform that the corresponding subscription is a Roaming Unavailable subscription. In step 1509, the BSM 1323 of the Home SP 1320 can also include the cause of the roaming unavailability when necessary while notifying the Roaming Unavailable subscription, or can deliver the type of the partially available service if possible. If the retrieved subscription is Roaming Supported subscription, the BSM 1323 of the Home SP 1320 sends a Roaming Authorization Request message to a BSM 1313 of the Visited SP 1310 in step 1505. The contents of this message are shown in Table 22. After sending the request message, the BSM 1323 of the Home SP 1320 waits for a response from the Visited SP 1310 in step 1506. Upon receipt of the response to the request, the BSM 1323 of the Home SP 1320 deciphers the received message in step 1507, and analyzes the results on the requirement in step 1508. If the requirement is unacceptable, the BSM 1323 of the Home SP 1320 proceeds to step 1509 where it can also include the cause of the roaming unavailability when necessary while notifying the Roaming Unavailable subscription, or can deliver the type of the partially available service if possible. However, if it is determined that roaming is available with subscription of the roaming-requested terminal, the BSM 1323 of the Home SP 1320 determines in step 1510 whether there is a particular requirement such as Purchase Item, in addition to the message received in step 1507. If there is a particular requirement, the BSM 1323 of the Home SP 1320 calculates the charge, and if there is no particular requirement, the BSM 1323 of the Home SP 1320 calculates the additional charge occurring during the roaming. After completion of the calculation, the BSM 1323 of the Home SP 1320 generates a response message to the roaming request. The contents of the generated message are shown in Table 23.

After completion of step 1510, the BSM 1323 of the Home SP 1320 waits for the final confirm for the roaming from the Terminal 1300 in step 1511. Upon receipt of a Final Confirm message for the roaming from the Terminal 1300, the BSM 1323 of the Home SP 1320 deciphers the received message in step 1512. The contents of the received message are shown in Table 24, and the BSM 1323 of the Home SP 1320 determines in step 1513 whether the Terminal 1300 agrees with the roaming condition. If the Terminal 1300 does not agree with the roaming condition, the corresponding roaming procedure is terminated. Otherwise, if the Terminal 1300 agrees with the roaming condition, the BSM 1323 of the Home SP 1320 sends a request for a Long-Term Key message for deciphering the received service and waits for the Long-Term Key message in step 1514. Upon receipt of the Long-Term Key message from the Visited SP 1310 in step 1515, the Home SP 1320 forwards the received Long-Term Key message to the Terminal 1300 in step 1516, so the Terminal 1300 can use the roaming service within its agreed scope.

Figure 16:
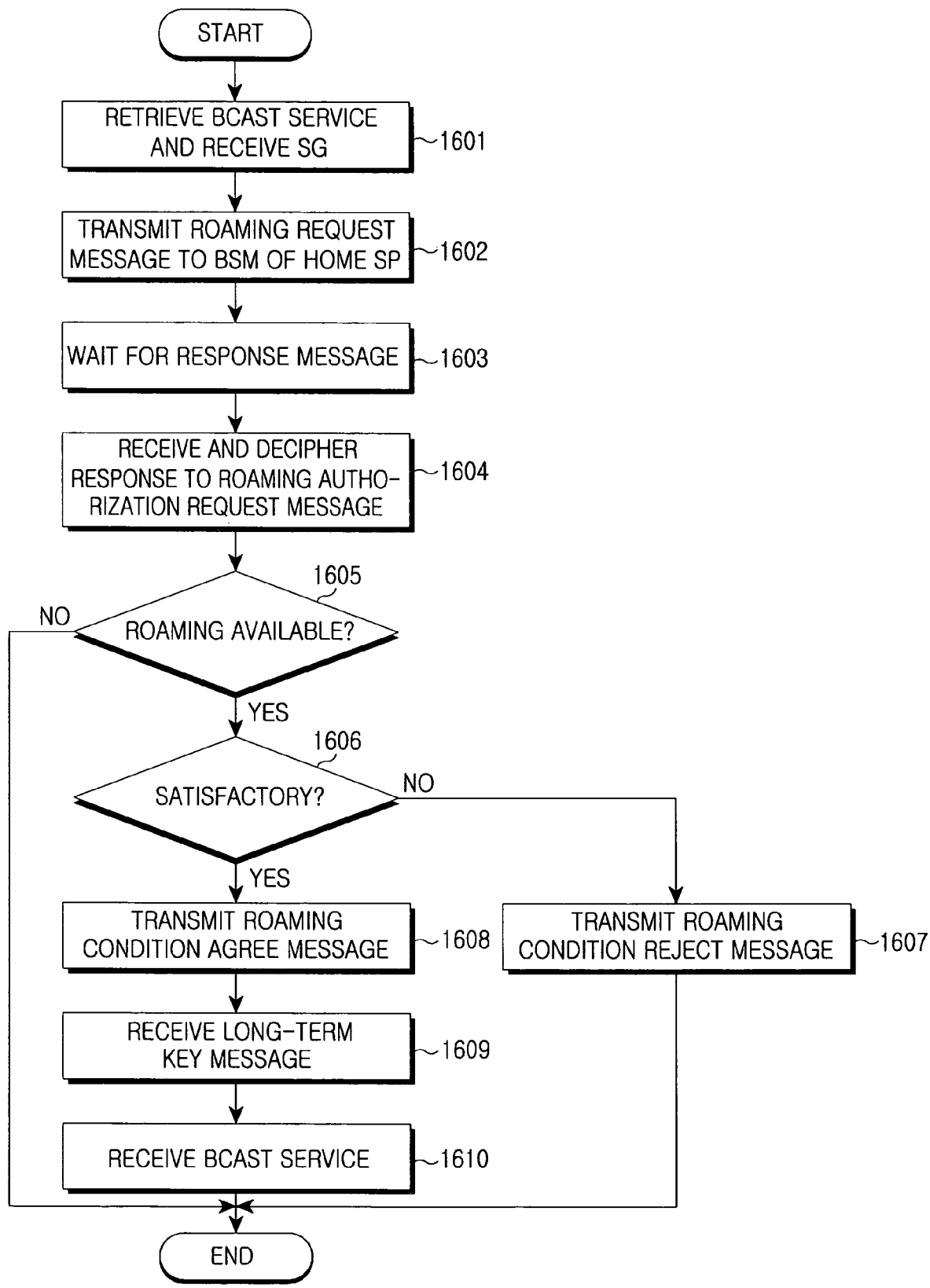
FIG. 16 is a flowchart illustrating an operation of a Terminal according to an exemplary embodiment of the present invention.

FIG. 16 is a flowchart illustrating an operation of a Terminal 1300 according to an exemplary embodiment of the present invention. A description of FIG. 16 will be made with reference to FIG. 13.

The Terminal 1300 can discover a Visited SP 1310 through a lower BDS-SD 111, BDS 112 or IN 113 in an area other than the area of its Home SP 1320, and detect the BCAST service of the corresponding area. Upon detecting the BCAST service, the Terminal 1300 can find a Service Guide Context fragment 201 and fully receive the service guide using a Service Guide Delivery Descriptor fragment 202 depending on the Service Guide Context fragment 201 in step 1601. Upon receipt of the service guide, the Terminal 1300, if it desires to receive the roaming service, sends a Roaming Request message for roaming service authorization to a BSM 1323 of its Home SP 1320 in step 1602. The contents of the sent message are shown in Table 21. After sending the Roaming Request message, the Terminal 1300 waits for a response in step 1603. If a roaming agreement between the BSM 1323 of the Home SP 1320 and the BSM 1313 of the Visited SP 1310 is determined, the Terminal 1300 receives a response message to the request from the BSM 1323 of the Home SP 1320 and deciphers the received response message in step 1604. The contents of the response message are shown in Table 23. Thereafter, the Terminal 1300 determines in step 1605 whether the roaming is available by deciphering the response message.

If the roaming is unavailable, the Terminal 1300 gives up the roaming. However, if the roaming is available, the Terminal 1300 checks the roaming condition in the Visited SP 1310 in step 1606 to determine whether the Terminal 1300 is acceptable. If the Terminal 1300 does not agree with the roaming condition, the Terminal 1300 transmits a Confirm message for rejecting the roaming to the BSM 1323 of the Home SP 1320 in step 1607. However, if the Terminal 1300 agrees with the roaming condition, the Terminal 1300 sends a Confirm message indicating the agreement to the BSM 1323 of the Home SP 1320 in step 1608. After sending the agreement message, the Terminal 1300 receives a Long-Term Key message in step 1609, and receives the BCAST service after preparing for service or content deciphering in step 1610.

A description will now be made of a purchase item list request procedure for roaming according to a fourth embodiment of the present invention.

Figure 17:
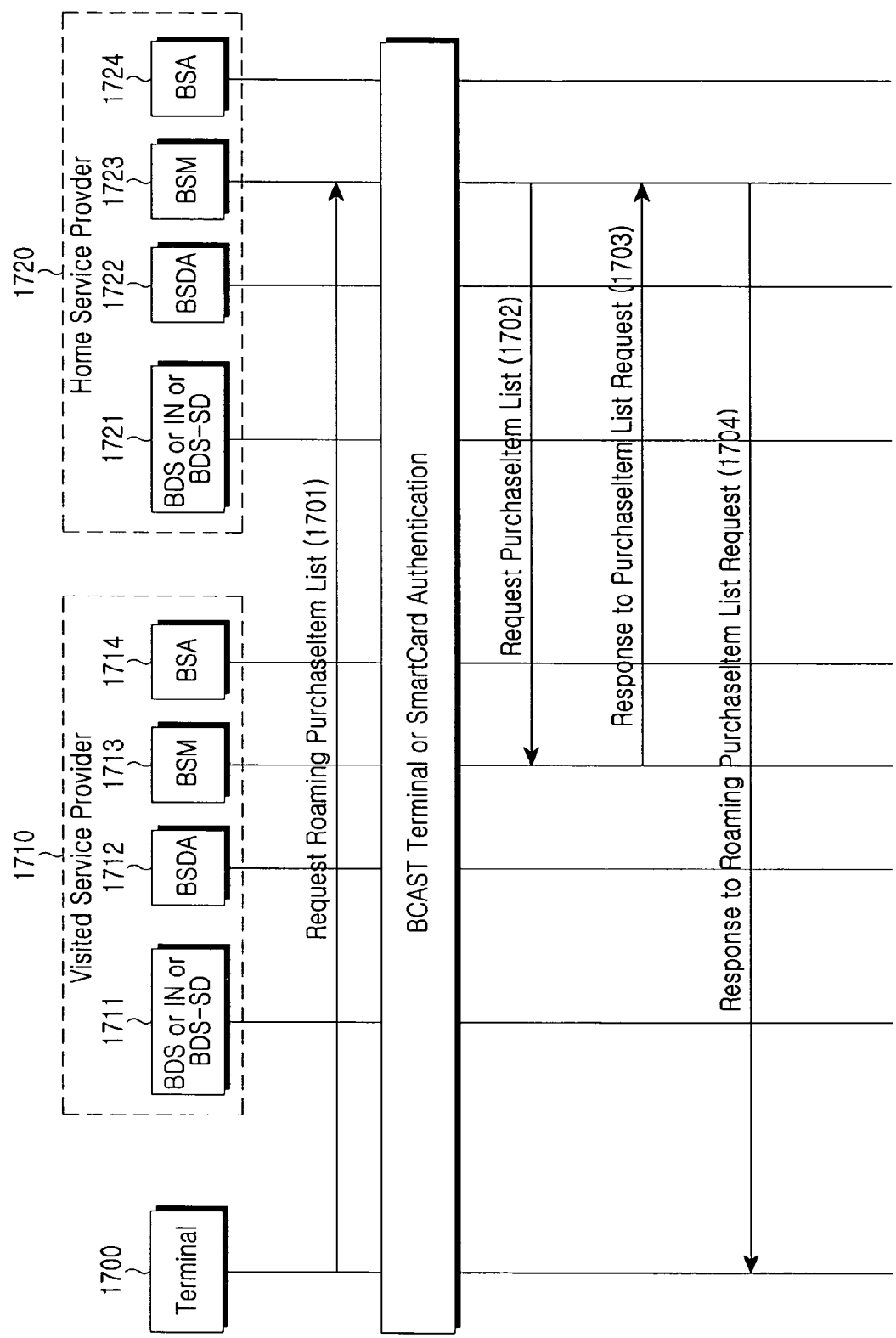
FIG. 17 is a signaling diagram illustrating a purchase item list request procedure for roaming according to an exemplary embodiment of the present invention.

FIG. 17 is a signaling diagram illustrating a purchase item list request procedure for roaming according to an exemplary embodiment of the present invention. Before a description of each step in the purchase item list request procedure for roaming according to an exemplary embodiment is given, each entity of FIG. 17 will first be described.

BSAs 1724 and 1714 in a Home SP 1720 and a Visited SP 1710 are equal in function to the BSA 102 of FIG. 1, so they are separately shown to differentiate the BSA in the Home SP 1720 from the BSA in the Visited SP 1710 during roaming. Similarly, BSMs 1723 and 1713 have the same function as that of the BSM 104 of FIG. 1, BSDAs 1722 and 1712 have the same function as that of the BSDA 103 of FIG. 1, and group entities 1721 and 1711, each composed of BDS-SD, BDS and/or IN, have the same function as the group entity of the BDS-SD 111, the BDS 112 and/or the IN 113 of FIG. 1. A Terminal 1700 has the same function as that of the Terminal 105 of FIG. 1. The above-mentioned entities are not all used in the purchase item list request procedure for roaming according to an exemplary embodiment of the present invention, so the entities used in the purchase item list request procedure for roaming will be described. The procedure shown in FIG. 17 can be optionally used during roaming, and it can be used between steps 402 and 403 of FIG. 4, or between steps 1302 and 1303 of FIG. 13.

Referring to FIG. 17, in step 1701, using the information shown in Table 11 acquired through reception of a service guide, the Terminal 1700 generates a Purchase Item List Request message for requesting information indicating which purchase items the Terminal 1700 can join during the roaming, and sends the generated message to the BSM 1723 of the Home SP 1720. The contents of the Purchase Item List Request message generated by the Terminal 1700 in step 1701 are shown in Table 25 below.

TABLE 25

Request ID
Terminal ID
Visited SP ID
Visited SP BSM ID
Visited BSDA ID

Request ID, a first item of Table 25, is an identifier given to consistently identify and manage one roaming registration request procedure. The Request ID is an identifier generated for allowing a terminal to uniquely identify its own roaming registration request. The Request ID can be used together with the purchase item list request procedure for roaming shown in FIG. 17, and is equal to the Request ID in Tables 16-20 or Tables 21-24. Terminal ID is a unique ID for the terminal for enabling to uniquely identify a terminal. The Terminal ID is used for identifying who makes the roaming registration request. Visited SP ID is an identifier of the service provider that provides the service in the area where the roaming terminal stays.

The Visited SP ID is used for providing the service provider of the Home SP 1720 with the information indicating to whom the terminal make a roaming request. Here, when the BSM 1723 of the Home SP 1720 determines from the Visited SP ID that there is no roaming agreement made with the BSM 1723 itself, the BSM 1723 directly proceeds to step 1704 where it can notify the roaming unavailability to the Terminal 1700. Visited SP BSM ID is used for informing the Home SP of the entity that actually makes a negotiation on the roaming service registration procedure with the identifier of the BSM, used by the Visited SP 1710.

Visited BSDA ID is an identifier of the BSDA used by the Visited SP 1710, and because one service provider can provide the service through several BSDAs, the Visited BSDA ID is used for indicating through which BSDA among the BSDAs used by the Visited SP 1710 the roaming Terminal 1700 desires to receive the service. For the terminal that made the purchase item list request for roaming in step 1701, the BSM 1723 of the Home SP 1720 can additionally perform an authentication process on the terminal, and because the authentication process is not related to the basis of the present invention, a description thereof will be omitted herein for clarity and conciseness.

In step 1702, upon receipt of the Purchase Item List Request message from the Terminal 1700, the BSM 1723 of the Home SP 1720 sends a request for a purchase item list to the BSM 1713 of the Visited SP 1710 to which the Terminal 1700 is roaming. The contents of the message sent from the BSM 1723 of the Home SP 1720 to the BSM 1713 of the Visited SP 1710 are shown in Table 26 below.

TABLE 26

Request ID
Terminal ID
Home SP ID
Home SP BSM ID
Visited BSDA ID
Terminal Subscription Type Request ID, a first item of Table 26, is an identifier given to consistently identify and manage one roaming registration request procedure. The Request ID is an identifier generated for allowing a terminal to uniquely identify its own roaming registration request. The Request ID can be used together with the purchase item list request procedure for roaming shown in FIG. 17, and is equal to the Request ID in Tables 16-20 or Tables 21-24. Terminal ID is a unique ID for the terminal for enabling to uniquely identify a terminal. The Terminal ID is used for identifying who makes the purchase item list request for roaming.

Home SP ID is used for indicating from which service provider the Terminal 1700 that requested the purchase item list for roaming in the Visited SP 1710 has originally received the service. Using this information, the BSM 1713 of the Visited SP 1710 can recognize that the Terminal 1700 that requested the purchase item list for roaming belongs to the service provider with whom its roaming agreement is made. Home SP BSM ID is used for informing the Visited SP 1710 of the entity for a negotiation needed in the purchase item list search process. The BSM 1713 of the Visited SP 1710 responds to the purchase item list request result depending on the Home SP BSM ID.

Visited BSDA ID is used for providing the Visited SP 1710 with the information indicating in which service area the terminal is currently requesting the service. Terminal Subscription Type is information provided to the Visited SP 1710 to evaluate in which class the terminal that requested the purchase item list for roaming can receive services of the Visited SP 1710. The Terminal Subscription Type can be a class of the service that the roaming-requested Terminal 1710 can receive from the roaming-requested Visited SP 1710 based on the roaming agreement made between the Home SP 1720 and the Visited SP 1710. This can be defined in the form of a roaming allowed class number or code agreed between the two service providers, and its form is not defined in an exemplary embodiment of the present invention.

In step 1703, the BSM 1713 of the Visited SP 1710 sends a response to the request received in step 1702. The main purpose in step 1703 is to inform the purchase item list requested by the Terminal 1700 using the information received in step 1702. The BSM 1713 of the Visited SP 1710 can optionally provide Roaming Service Allowed Scope as well. The message sent from the BSM 1713 of the Visited SP 1710 to the BSM 1723 of the Home SP 1720 in step 1703 is shown in Table 27 below.

TABLE 27

Request ID
Roaming Authorization Status
Roaming Service Allowed Scope
Purchase Item List Request ID, a first item of Table 27, is an identifier given to consistently identify and manage one roaming registration request procedure. The Request ID is an identifier generated for allowing a terminal to uniquely identify its own roaming registration request. The Request ID can be used together with the purchase item list request procedure for roaming shown in FIG. 17, and is equal to the Request ID in Tables 16-20 or Tables 21-24. Roaming Authorization Status, which is an item indicating an allowed status of the request, is used for providing the result on the request to the BSM 1723 of the Home SP 1720 of the roaming Terminal 1700 using the information provided in step 1702. Roaming Service Allowed Scope, which is an optional item, is used for allowing a value of the subscription type of the roaming terminal to indicate which reception right the roaming Terminal 1700 will actually have in the Visited SP 1710. Purchase Item List, a list of purchase item IDs, is a list of services that the roaming Terminal 1700 can join in the Visited SP 1710.

In step 1704, the Home SP 1720 notifies the result on the purchase item list request for roaming received via the Visited SP 1710 in step 1703 to the Terminal 1700. Actually, in step 1704, the BSM 1723 of the Home SP 1720 forwards the message received in step 1703, to the Terminal 1700. After the Home SP 1720 analyzes the request of the terminal in step 1701, if there is no roaming agreement with the Visited SP 1710 in the area where the Terminal 1700 stays, the Home SP 1720 directly proceeds to step 1704 where it fills the contents of Table 27 with a requested process fail and sends it to the Terminal 1700. In this case, the Terminal 1700 fails in the request. Upon receipt of the purchase item list in step 1704, the Terminal 1700 displays the purchase item of its received service guide for the user in such a way of displaying the purchase items in the list through comparison with the purchase items in the received list.

Figure 18:
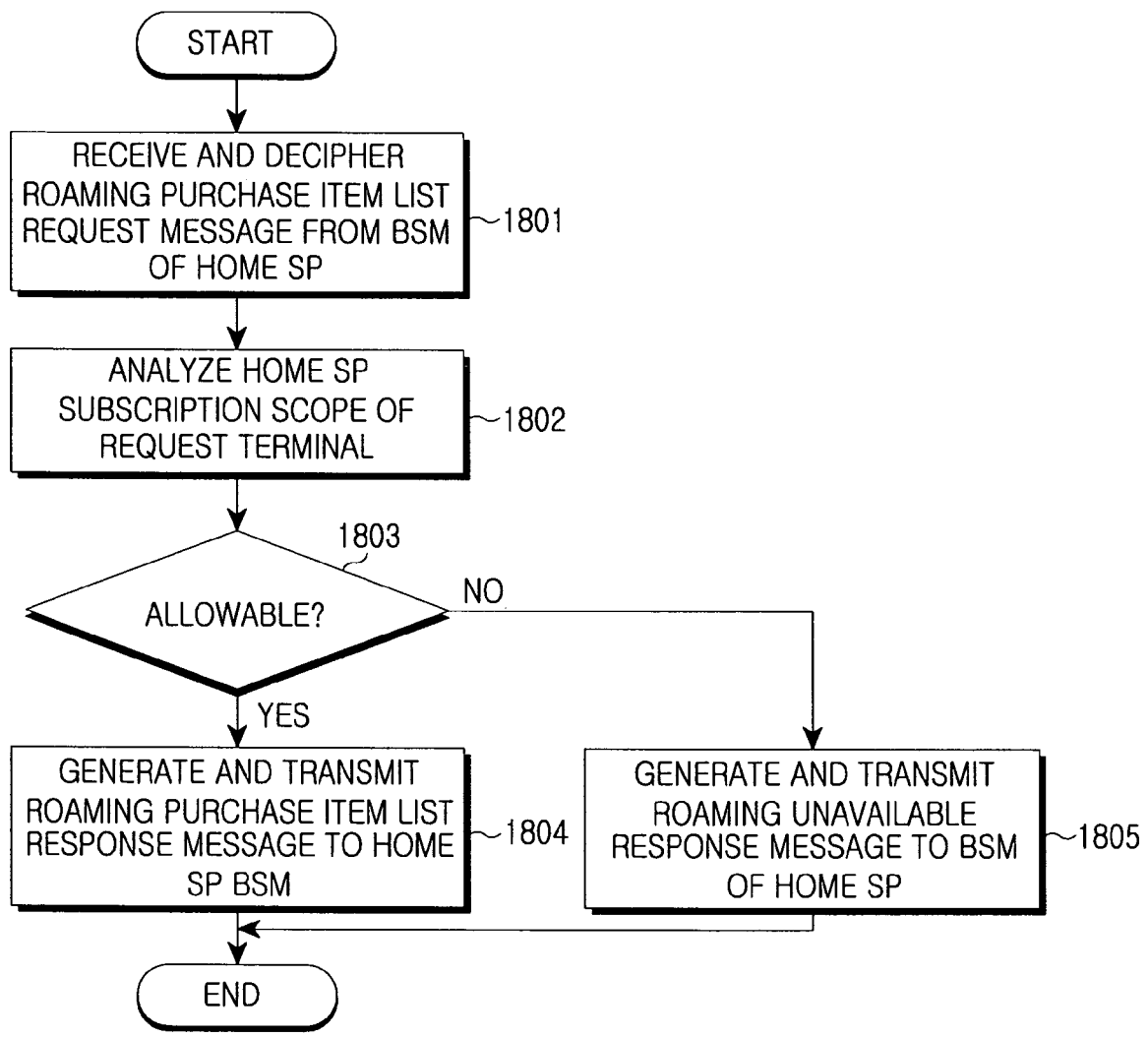
FIG. 18 is a flowchart illustrating an operation of a BSM of a Visited SP according to an exemplary embodiment of the present invention.

FIG. 18 is a flowchart illustrating an operation of a BSM 1713 of a Visited SP 1710 according to an exemplary embodiment of the present invention. A description of FIG. 18 will be made with reference to FIG. 17.

Referring to FIG. 18, in step 1801, the BSM 1713 of the Visited SP 1710 receives a Purchase Item List Request message from a BST 1723 of a Home SP 1720 of a roaming Terminal 1700, and deciphers the received message. The received message is shown in Table 26. In step 1802, the BSM 1713 of the Visited SP 1710 analyzes Terminal Subscription Type among the contents of the received Purchase Item List Request message.

After analyzing the contents with the subscription policy of the terminal that requested the purchase item list in step 1802, the BSM 1713 of the Visited SP 1710 checks the purchase item list subscribable during the roaming in step 1803. If subscription of the roaming-requested Terminal 1700 is insufficient to support the roaming, the BSM 1713 of the Visited SP 1710 generates a message for rejecting the request and delivers the message to the BSM 1723 of the Home SP 1720 in step 1805. If it is determined that the roaming is available with the subscription of the roaming-requested terminal, the BSM 1713 of the Visited SP 1710 generates a purchase item list and sends a response message to the BSM 1723 of the Home SP 1720 in step 1804. The contents of this message are shown in Table 27.

Figure 19:
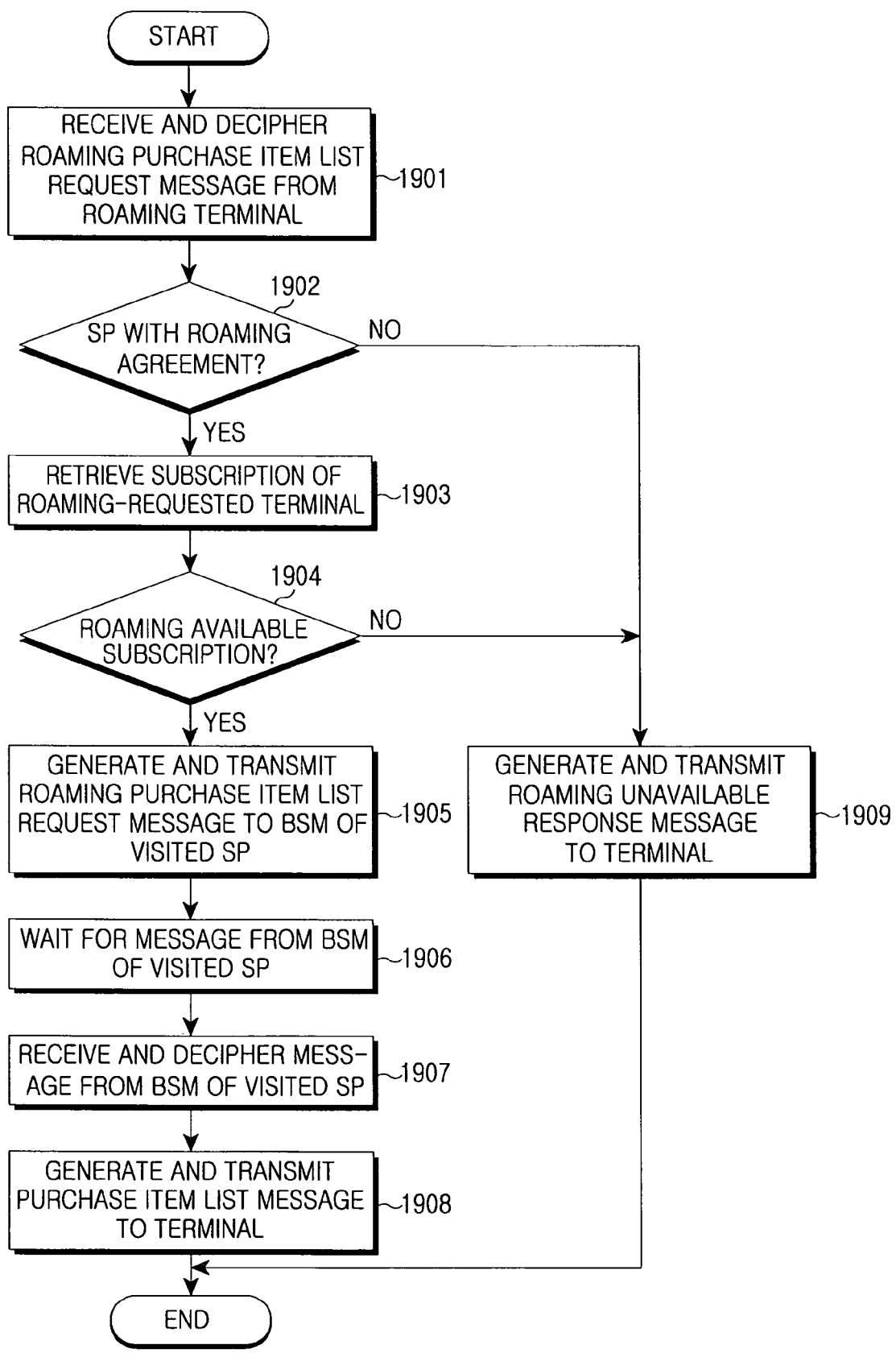
FIG. 19 is a diagram illustrating an operation of a BSM of a Home SP according to an exemplary embodiment of the present invention.

FIG. 19 is a diagram illustrating an operation of a BSM 1723 of a Home SP 1720 according to the fourth embodiment of the present invention. A description of FIG. 19 will be made with reference to FIG. 17.

Referring to FIG. 19, in step 1901, the BSM 1723 of the Home SP 1720 receives a Purchase Item List Request message for roaming from a roaming Terminal 1700, and deciphers the received message. The message received by the Home SP 1720 is shown in Table 25. Using the deciphered message, the BSM 1723 of the Home SP 1720 first determines in step 1902 whether there is a roaming agreement with a Visited SP 1710 where the Terminal 1700 that requested the purchase item list during the roaming stays. If there is no roaming agreement, the BSM 1723 of the Home SP 1720 proceeds to step 1909 where it performs a roaming-unavailable process. In step 1909, the BSM 1723 of the Home SP 1720 can include even the cause of the roaming unavailability when necessary while notifying Roaming Unavailable subscription.

However, if there is a roaming agreement, the BSM 1723 of the Home SP 1720 retrieves subscription of the corresponding Terminal 1700 in step 1903, and determines in step 1904 whether the retrieved subscription of the Terminal 1700 is a Roaming Allowable subscription.

If the received subscription of the Terminal 1700 is a Roaming Unsupported subscription, the BSM 1723 of the Home SP 1720 proceeds to step 1909 to inform that the corresponding subscription is a Roaming Unavailable subscription. In step 1909, the BSM 1723 of the Home SP 1720 can also include the cause of the roaming unavailability when necessary while notifying the Roaming Unavailable subscription.

If the retrieved subscription is Roaming Supported subscription, the BSM 1723 of the Home SP 1720 sends a Purchase Item List Request message for roaming to a BSM 1713 of the Visited SP 1710 in step 1905. The contents of this message are shown in Table 26. After sending the request message, the BSM 1723 of the Home SP 1720 waits for a response from the Visited SP 1710 in step 1906. Upon receipt of the response to the request, the BSM 1723 of the Home SP 1720 deciphers the received response message in step 1907, and generates a message indicating the result on the purchase item list request for roaming and delivers the generated message to the Terminal 1700 in step 1908.

Figure 20:
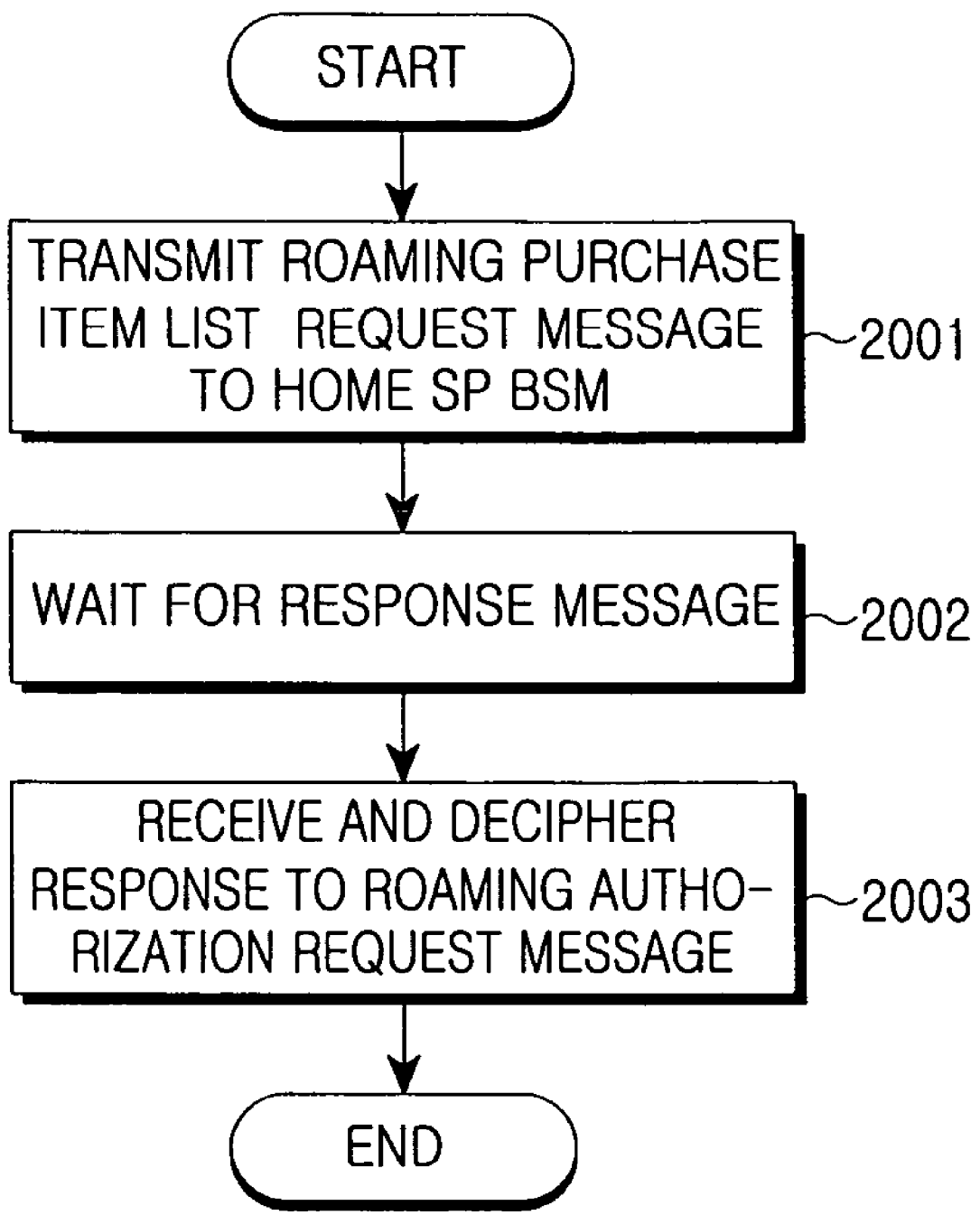
FIG. 20 is a flowchart illustrating an operation of a Terminal according to an exemplary embodiment of the present invention.

FIG. 20 is a flowchart illustrating an operation of a Terminal 1700 according to an exemplary embodiment of the present invention. A description of FIG. 20 will be made with reference to FIG. 17.

Referring to FIG. 20, in step 2001, the Terminal 1700 sends a Purchase Item List Request message for roaming to a BSM 1723 of its Home SP 1720 to determine a list of purchase items for which the Terminal 1700 can subscribe in a corresponding area while performing the roaming. Thereafter, in step 2002, the Terminal 1700 waits for a response from the BSM 1723 of the Home SP 1720. The contents of the transmitted message are shown in Table 25. Upon receipt of the response message from the BSM 1723 of the Home SP 1720, the Terminal 1700 compares the received purchase item list with the purchase items in its received service guide, and displays the purchase item in the list in step 2003. Here, the message received by the Terminal 1700 is shown in Table 27.

A description will now be made of a purchase item list request procedure for roaming according to an exemplary embodiment of the present invention.

Figure 21:
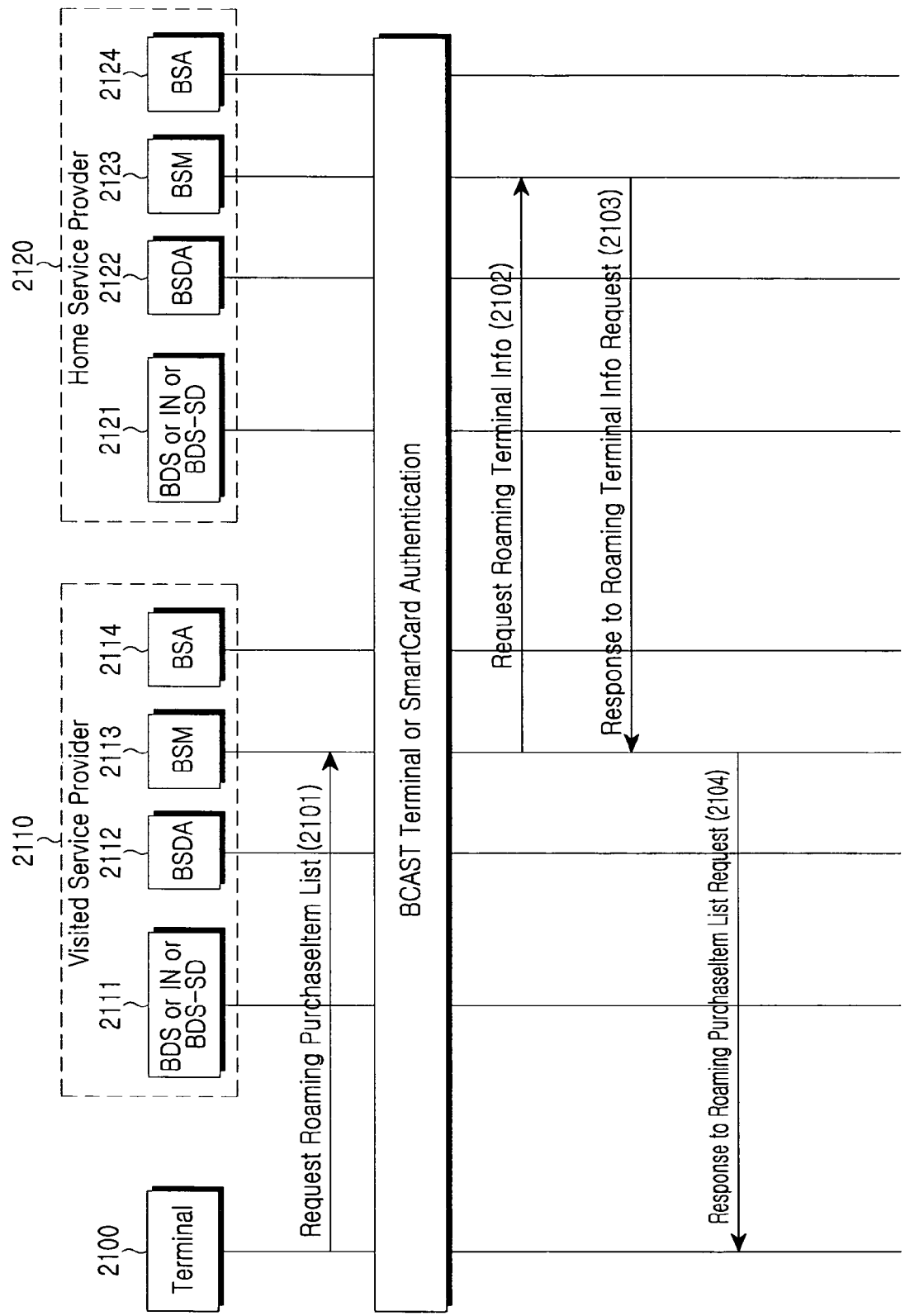
FIG. 21 is a signaling diagram illustrating a purchase item list request procedure for roaming according to an exemplary embodiment of the present invention.

FIG. 21 is a signaling diagram illustrating a purchase item list request procedure for roaming according to an exemplary embodiment of the present invention. Before a description of each step in the purchase item list request procedure for roaming is given, each entity of FIG. 21 will first be described. BSAs 2124 and 2114 in a Home SP 2120 and a Visited SP 2110 are equal in function to the BSA 102 of FIG. 1, so they are separately shown to differentiate the BSA in the Home SP 2120 from the BSA in the Visited SP 2110 during roaming. Similarly, BSMs 2123 and 2113 have the same function as that of the BSM 104 of FIG. 1, BSDAs 2122 and 2112 have the same function as that of the BSDA 103 of FIG. 1, and group entities 2121 and 2111, each composed of BDS-SD, BDS and/or IN, have the same function as the group entity of the BDS-SD 111, the BDS 112 and/or the IN 113 of FIG. 1. A Terminal 2100 has the same function as that of the Terminal 105 of FIG. 1. The above-mentioned entities are not all used in the purchase item list request procedure for roaming according to an exemplary embodiment of the present invention, so the entities used in the purchase item list request procedure for roaming will be described. The procedure shown in FIG. 21 can be optionally used during roaming, and it can be used between steps 802 and 803 of an exemplary embodiment of the present invention.

Referring to FIG. 21, in step 2101, using the information shown in Table 11 acquired through reception of a service guide, the Terminal 2100 generates a Purchase Item List Request message for requesting information indicating which purchase items the Terminal 2100 can join during the roaming, and sends the generated message to the BSM 2113 of the Visited SP 2110. The contents of the Purchase Item List Request message generated by the Terminal 2100 in step 2101 are shown in Table 28 below.

TABLE 28

Request ID
Terminal ID
Home SP ID
Home SP BSM ID

Request ID, a first item of Table 28, is an identifier given to consistently identify and manage one roaming registration request procedure. The Request ID is an identifier generated for allowing a terminal to uniquely identify its own roaming registration request. The Request ID can be used together with the purchase item list request procedure for roaming shown in FIG. 21, and is equal to the Request ID in Tables 16-20. Terminal ID is a unique ID for the terminal for enabling to uniquely identify a terminal. The Terminal ID is used for identifying who makes the roaming registration request.

Home SP ID is an identifier used for allowing the roaming Terminal 2100 to inform the Visited SP 2110 who it's Home SP 2120 is. Using this information, the Visited SP 2110 can determine to which entity the roaming-requested Terminal 2100 originally belongs, and can also determine a roaming relationship with the corresponding entity. Here, when the BSM 2113 of the Visited SP 2110 determines from the Home SP ID that there is no roaming agreement made with the BSM 2113 itself, the BSM 2113 directly proceeds to step 2104 where it can notify a roaming unavailability to the Terminal 2100.

Home SP BSM ID is used for informing the Visited SP 2110 of the entity that actually makes a negotiation on a roaming service registration procedure with the identifier of the BSM 2123 used by the Home SP 2120. Finally, Purchase Item ID is used for indicating the service that the roaming user desires to receive. For the terminal that made the purchase item list request for roaming in step 2101, the BSM 2113 of the Visited SP 2110 can additionally perform an authentication process on the terminal, and this can be performed spontaneously by the BSM 2113 of the Visited SP 2110, or can be performed through a connection with the BSM 2123 of the Home SP 2120 or through the third authentication entity. Because the authentication process is not related to the basis of the present invention, a description thereof will be omitted herein for clarity and conciseness.

In step 2102, for the purchase item list request for roaming received from the Terminal 2100 in step 2101, the BSM 2113 of the Visited SP 2110 sends a request for subscription information for the corresponding terminal to the BSM 2123 of the Home SP 2120. The contents of the message sent from the BSM 2113 of the Visited SP 2110 to the BSM 2123 of the Home SP 2120 in step 2102 are shown in Table 29 below.

TABLE 29

Request ID
Terminal ID
Visited SP ID
Visited SP BSM ID

Request ID, a first item of Table 29, is an identifier given to consistently identify and manage one roaming registration request procedure. The Request ID is an identifier generated for allowing a terminal to uniquely identify its own roaming registration request. The Request ID can be used together with the purchase item list request procedure for roaming shown in FIG. 21, and is equal to the Request ID in Tables 16-20. Terminal ID is a unique ID for the terminal for enabling to uniquely identify a terminal. The Terminal ID is used for identifying who makes the roaming registration request. Visited SP ID is used by the Visited SP 2110 to provide its own informing to the BSM 2123 of the Home SP 2120 of the terminal that requested the purchase item list when the terminal is roaming thereto. Visited SP BSM ID is used by the Visited SP 2110 to provide the BSM 2123 of the Home SP 2120 with the information indicating the entity with which a roaming-related negotiation is to be made. This is because the Visited SP 2110 can have several BSMs.

In step 2103, the BSM 2123 of the Home SP 2120 responds to the Terminal subscription information request received in step 2102. Table 30 below shows the contents of the message sent from the BSM 2123 of the Home SP 2120 to the BSM 2113 of the Visited SP 2110.

TABLE 30

Request ID
Roaming Authorization Status
Terminal Subscription Type

Request ID, a first item of Table 30, is an identifier given to consistently identify and manage one roaming registration request procedure. The Request ID is an identifier generated for allowing a terminal to uniquely identify its own roaming registration request. The Request ID can be used together with the purchase item list request procedure for roaming shown in FIG. 21, and is equal to the Request ID in Table 16-20. Roaming Authorization Status is used for allowing the Home SP 2120 to determine whether the roaming is authorized by retrieving subscription of the Terminal 2100 that requested the purchase item list for roaming in the Visited SP 2110 using the Terminal ID received in step 2103, and to provide the results to the Visited SP 2110.

Terminal Subscription Type is information provided for allowing the Visited SP 2110 to evaluate which reception right the roaming Terminal 2100 will actually have in the Visited SP 2110. The Terminal Subscription Type can be a class of the service that the roaming-requested Terminal 2100 can receive from the roaming-requested Visited SP 2110 based on the roaming agreement made between the Home SP 2120 and the Visited SP 2110. This can be defined in the form of a roaming allowed class number or code agreed between the two service providers, and its form is not defined in an exemplary embodiment of the present invention.

In step 2104, the Visited SP 2110 sends a response to the received purchase item list request for roaming to the Terminal 2100. The contents of the message sent from the BSM 2113 of the Visited SP 2110 to the Terminal 2100 in step 2104 are shown in Table 31 below.

TABLE 31

Request ID
Roaming Authorization Status
Purchase Item List

Request ID, a first item of Table 31, is an identifier given to consistently identify and manage one roaming registration request procedure. The Request ID is an identifier generated for allowing a terminal to uniquely identify its own roaming registration request. The Request ID can be used together with the purchase item list request procedure for roaming shown in FIG. 21, and is equal to the Request ID in Tables 16-20. Roaming Authorization Status is used for allowing the Home SP 2120 to inform the Terminal 2100 of the result on the purchase item list request for roaming, using the information provided in step 2103. Purchase Item List, a list of purchase item IDs, is a list of services that the roaming Terminal 2100 can join in the Visited SP 2110.

In step 2104, upon receipt of the purchase item list, the Terminal 2100 displays the purchase item of its received service guide for the user in such a way of displaying the purchase items in the list through comparison with the purchase items in the received list.

Figure 22:
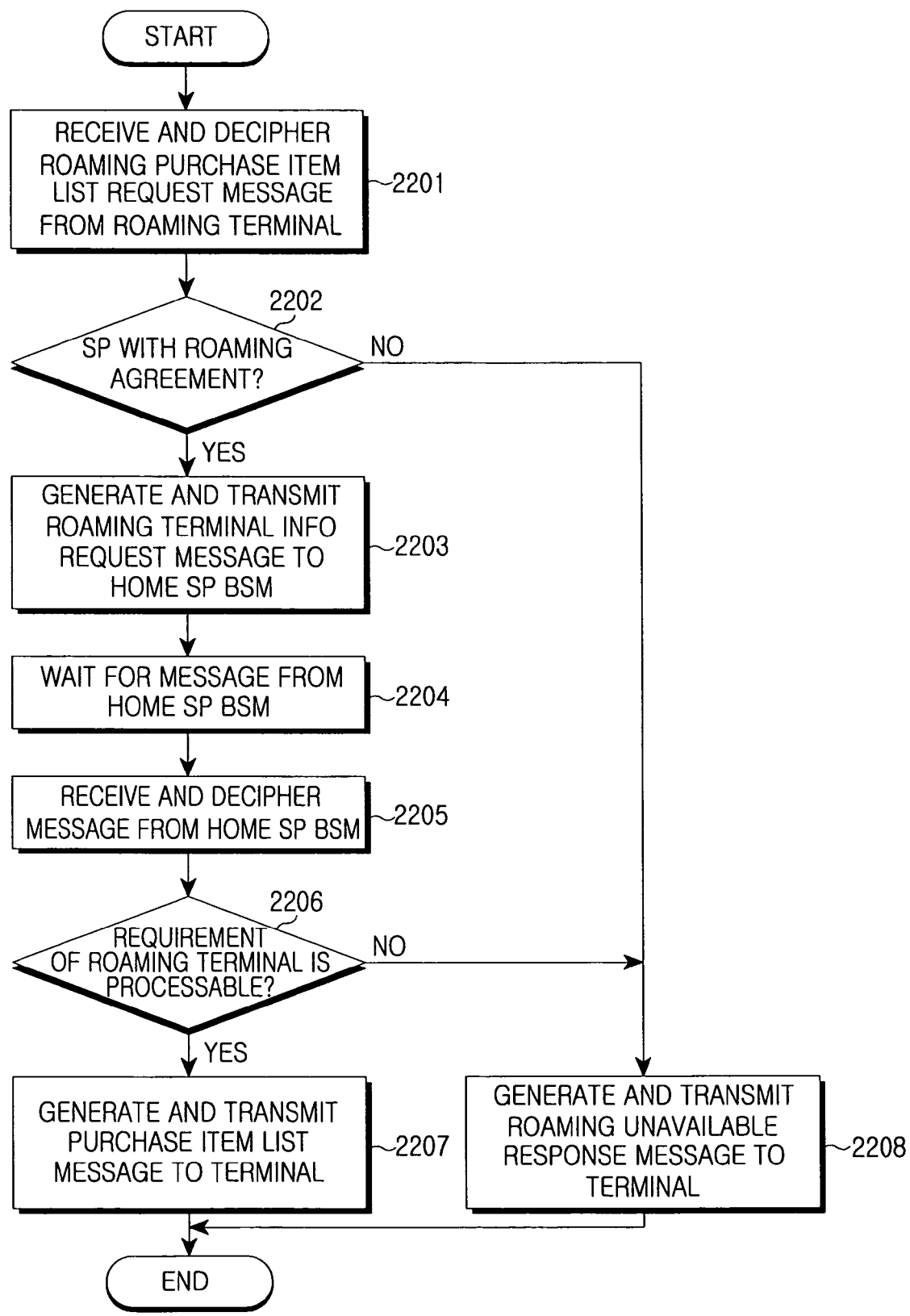
FIG. 22 is a flowchart illustrating an operation of a BSM of a Visited SP according to an exemplary embodiment of the present invention.

FIG. 22 is a flowchart illustrating an operation of a BSM 2113 of a Visited SP 2110 according to an exemplary embodiment of the present invention. A description of FIG. 22 will be made with reference to FIG. 21.

Referring to FIG. 22, in step 2201, the BSM 2113 of the Visited SP 2110 receives a message for a purchase item list request for roaming from a roaming Terminal 2100, and deciphers the received request message. The contents of the received message are shown in Table 28. In step 2202, the BSM 2113 of the Visited SP 2110 determines whether the Terminal 2100 that requested the purchase item list for roaming using the contents of the deciphered message is a terminal of the service provider having a roaming agreement with the terminal. If the Terminal 2100 belongs to the service provider having no roaming agreement, then the BSM 2113 of the Visited SP 2110 proceeds to step 2208 where it transmits a Roaming Unavailable Response message to the Terminal 2100. In step 2208, the BSM 2113 of the Visited SP 2110 can include even the cause of the roaming unavailability when necessary while notifying the Roaming Unavailable message.

However, if the Terminal 2100 belongs to the service provider having the roaming agreement therewith, the BSM 2113 of the Visited SP 2110 transmits a Terminal Request message to a BSM 2123 of a Home SP 2120 of the terminal that requested the purchase item list for roaming in step 2203. Here, the contents of the transmitted message are shown in Table 29. Thereafter, in step 2204, the BSM 2113 of the Visited SP 2110 waits for a response message from the BSM 2123 of the Home SP 2120 of the roaming-requested Terminal 2100. In step 2205, the BSM 2113 of the Visited SP 2110 receives the response message from the BSM 2123 of the Home SP 2120, and deciphers the received response message. The contents of the received response message are shown in Table 30.

After analyzing the contents of the received message, the BSM 2113 of the Visited SP 2110 determines in step 2206 whether it is authorized to provide the purchase item list for roaming to the Terminal 2100. If the BSM 2113 of the Visited SP 2110 is not authorized to do so, it transmits a Roaming Unavailable message to the Terminal 2100 in step 2208. In step 2208, the BSM 2113 of the Visited SP 2110 can include even the cause of the roaming unavailability when necessary while notifying the Roaming Unavailable message. However, if the BSM 2113 of the Visited SP 2110 is authorized to do so, it generates a purchase item list for roaming using the subscription information of the Terminal 2100, and transmits the purchase item list to the Terminal 2100 in step 2207.

Figure 23:
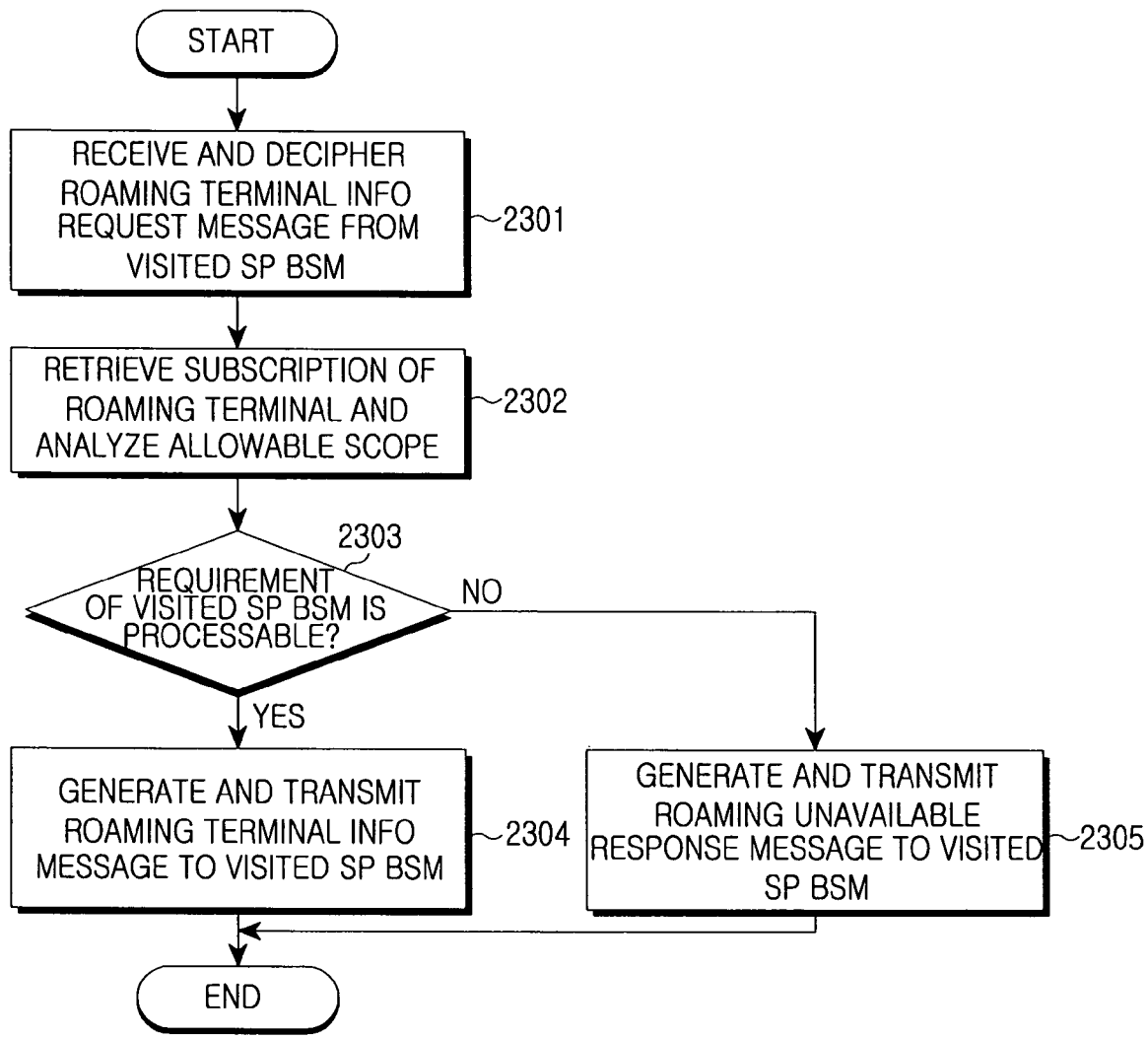
FIG. 23 is a flowchart illustrating an operation of a BSM of a Home SP according to an exemplary embodiment of the present invention.

FIG. 23 is a flowchart illustrating an operation of a BSM 2123 of a Home SP 2120 according to an exemplary embodiment of the present invention. A description of FIG. 23 will be made with reference to FIG. 21.

Referring to FIG. 23, in step 2301, the BSM 2123 of the Home SP 2120 receives a Terminal Subscription Information Request message for the terminal that requested a purchase item list request for roaming from a BSM 2113 of a Visited SP 2110, and deciphers the received message. The contents of the message received by the Home SP 2120 are shown in Table 29. In step 2302, the BSM 2123 of the Home SP 2120 retrieves subscription of the Terminal 2100 that requested the purchase item list for roaming in the Visited SP 2110. Thereafter, the BSM 2123 of the Home SP 2120 determines in step 2303 whether the Terminal 2100 that requested the purchase item list for roaming is allowed to receive the roaming service. If the Terminal 2100 is allowed to receive the roaming service, the BSM 2123 of the Home SP 2120 transmits a message including the contents shown in Table 30 where subscription of the Terminal 2100 is included, to the Visited SP 2110 in step 2304. However, if the Terminal 2100 is not allowed to receive the roaming service, the BSM 2123 of the Home SP 2120 transmits a Roaming Unavailable message to the Visited SP 2110 in step 2305.

Figure 24:
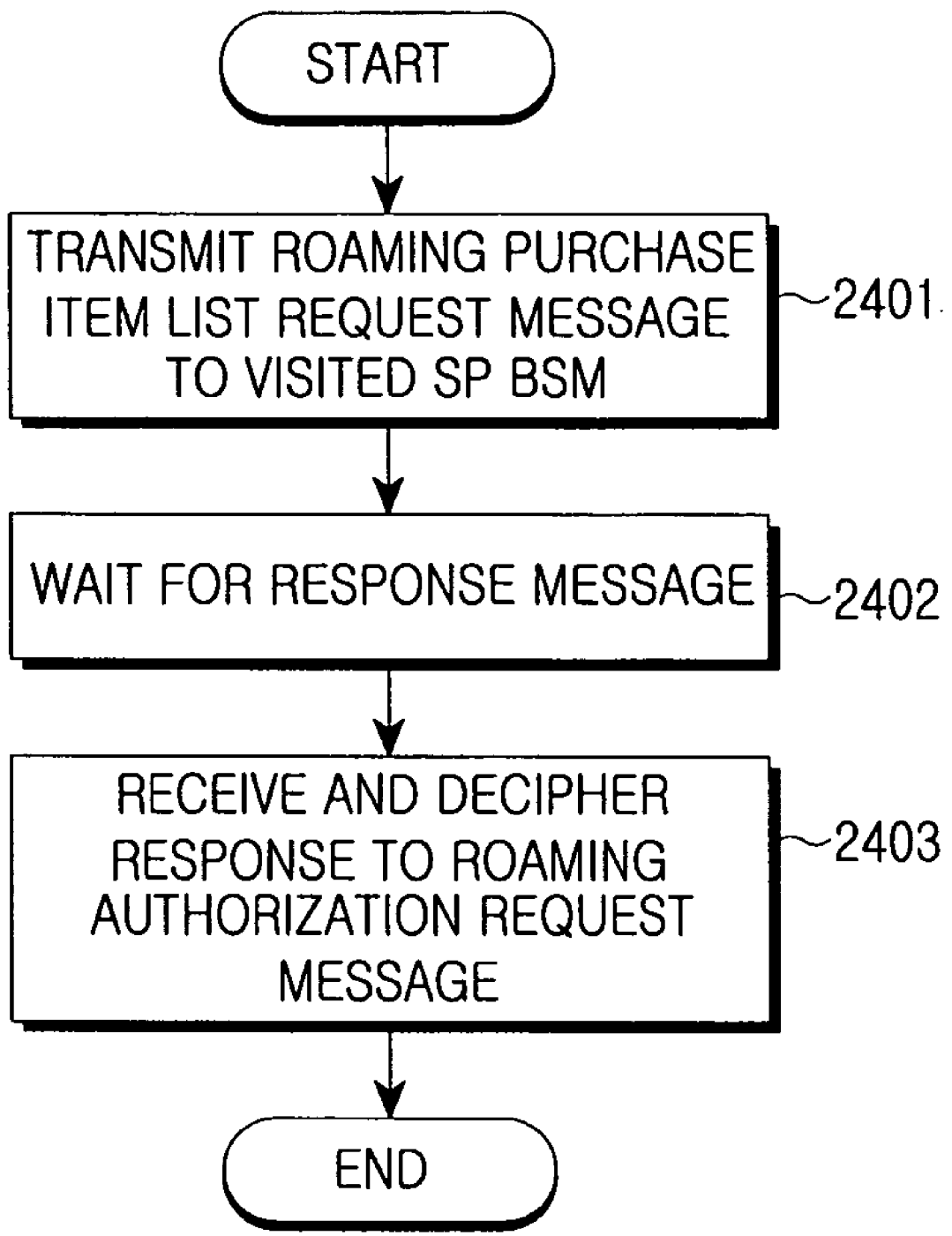
FIG. 24 is a flowchart illustrating an operation of a Terminal according to an exemplary embodiment of the present invention.

FIG. 24 is a flowchart illustrating an operation of a Terminal 2100 according to an exemplary embodiment of the present invention. A description of FIG. 24 will be made with reference to FIG. 21.

Referring to FIG. 24, in step 2401, the Terminal 2100 sends a Purchase Item List Request message for roaming to a BSM 2113 of a Visited SP 2110 to determine a list of purchase items for which the Terminal 2100 can subscribe in a corresponding area while performing the roaming. The contents of the sent message are shown in Table 28. In step 2402, the Terminal 2100 waits for a response from the BSM 2113 of the Visited SP 2110. Thereafter, in step 2403, the Terminal 2100 receives the response message from the BSM 2113 of the Visited SP 2110, compares the received purchase item list with the purchase items in its received service guide, and displays the purchase item in the list. Here, the message received by the Terminal 2100 is shown in Table 31.

As can be understood from the foregoing description, exemplary embodiments of the present invention provide a procedure and method for enabling roaming in a mobile broadcasting system, and the procedure provides a communication procedure between the home service provider for which the user first subscribed and the visited service provider having a roaming agreement with the home serving provider. In addition, exemplary embodiments of the present invention provide the message and procedure capable of supporting various charging systems for the roaming service requested by the user.

While the invention has been shown and described with reference to a certain exemplary embodiments thereof, it will be understood by those skilled in the art that various changes in form and details may be made therein without departing from the spirit and scope of the invention as defined by the appended claims.

What is claimed is:

1. A roaming service method in a mobile broadcasting system, the method comprising:

receiving, by a terminal, a service guide from a corresponding visited service provider (Visited SP) when the terminal moves to a roaming area;

transmitting, by the terminal, a request message for requesting a purchase item allowable for individual services to a home service provider (Home SP) based on the received service guide;

upon receipt of the request message, negotiating, by the Home SP, roaming authorization and allowable scope for the individual services with the Visited SP where the terminal is located, based on the request message; and transmitting, by the Home SP, the allowable scope for the individual services, negotiated with the Visited SP, to the terminal, as a response to the request message sent by the terminal;

wherein the allowable scope for the individual services indicates at least one of an actual reception right of a service corresponding to the purchase item which the terminal is allowed to have, a reception possibility of the service, information on an occurrence of additional cost associated with a reception of the service, and information on a change in a charging system associated with the roaming of the terminal wherein the negotiating comprises:

transmitting, by the Home SP, a roaming request message to the Visited SP based on the received the request message, wherein the roaming request message includes the purchase item and terminal subscription type information for determining in which class the roaming-requested terminal can receive services of the Visited SP, wherein the class agreed between the Home SP and the Visited SP;

receiving, by the Home SP, a roaming response message from the Visited SP based on the roaming request message, wherein the roaming response message includes the allowed scope of service.

2. The roaming service method of claim 1, further comprising:
   transmitting, by the terminal, at least one of agreement and disagreement on the allowable scope for the individual services to the Visited SP; and
   if the terminal agrees, transmitting, by the Visited SP, an enciphering key for receiving the agreed service.

3. The roaming service method of claim 2, wherein the enciphering key is a long-term key.

4. The roaming service method of claim 1, further comprising:
   transmitting, by the terminal, at least one of agreement and disagreement on the allowable scope for the individual services to the Home SP; and
   sending, by the Home SP, a request for an enciphering key for receiving the service agreed by the terminal to the Visited SP, receiving the enciphering key from the Visited SP, and transmitting the received enciphering key to the terminal.

5. The roaming service method of claim 4, wherein the enciphering key is a long-term key.

6. The roaming service method of claim 1, further comprising transmitting, by the Home SP, charging information for a roaming service to the terminal.

7. A roaming service method in a mobile broadcasting system, the method comprising:
   receiving, by a terminal, a service guide from a corresponding visited service provider (Visited SP) when the terminal moves to a roaming area;
   transmitting, by the terminal, a request message for requesting a purchase item allowable for the individual services to a visited service provider (Visited SP) based on the received service guide;
   upon receipt of the request message, determining by the Visited SP whether a roaming service of the terminal is authorized from a home service provider (Home SP) for which the terminal has subscribed, based on the request message; and
   verifying, by the Visited SP, authorization of the roaming service of the terminal and an allowable scope for the individual roaming services, and transmitting the verified allowable scope to the terminal as a response to the request message sent by the terminal;
   wherein the allowable scope for the individual services indicates at least one of an actual reception right of a service corresponding to the purchase item which the terminal is allowed to have, a reception possibility of the service, information on an occurrence of additional cost associated with a reception of the service, and information on a change in a charging system associated with the roaming of the terminal,
   wherein the verifying comprises:
   transmitting, by the Visited SP, a roaming request message to the Home SP based on the received the request message;
   receiving, by the Visited SP, a roaming response message from the Home SP based on the roaming request message, wherein the roaming response message includes the allowed scope of service and terminal subscription type information for determining in which class the roaming-requested terminal can receive services of the Visited SP, wherein the class agreed between the Home SP and the Visited SP.

8. The roaming service method of claim 7, further comprising:
   transmitting, by the terminal, at least one of agreement and disagreement on the allowable scope for the individual services to the Visited SP; and
   if the terminal agrees, transmitting, by the Visited SP, an enciphering key for receiving the agreed service.

9. The roaming service method of claim 8, wherein the enciphering key is a long-term key.

10. The roaming service method of claim 7, further comprising transmitting, by the Visited SP, charging information for a roaming service to the terminal.

11. A mobile broadcasting system comprising:
    a home service provider (Home SP) for, upon receipt of a request message from a terminal, negotiating roaming authorization and allowable scope for individual roaming services with a visited service provider (Visited SP) where the terminal is located, based on the request message;
    the Visited SP for transmitting the allowable scope for the individual roaming services to the terminal as a response to the request message sent by the terminal; and
    the terminal for verifying the roaming authorization and the allowable scope for the individual roaming services, and receiving an enciphering key from the at least one of the Home SP and the Visited SP;
    wherein the allowable scope for the individual services indicates at least one of an actual reception right of a service corresponding to the purchase item which the terminal is allowed to have, a reception possibility of the service, information on an occurrence of additional cost associated with a reception of the service, and information on a change in a charging system associated with the roaming of the terminal,
    wherein the Home SP transmits a roaming request message to the Visited SP based on the received the request message, wherein the roaming request message includes the purchase item and terminal subscription type information for determining in which class the roaming-requested terminal can receive services of the Visited SP, wherein the class agreed between the Home SP and the Visited SP and receives a roaming response message from the Visited SP based on the roaming request message, wherein the roaming response message includes the allowed scope of service.

12. The mobile broadcasting system of claim 11, wherein the Home SP further transmits charging information for a roaming service to the terminal.

13. The mobile broadcasting system of claim 12, wherein the enciphering key is a long-term key.

14. A mobile broadcasting system comprising:
    a visited service provider (Visited SP) for, upon receipt of a request message from a terminal, inquiring of a home service provider (Home SP) for which the terminal has subscribed, regarding authorization of the roaming service, based on the request message, verifying the roaming authorization and allowable scope for individual roaming services, and transmitting the verified allowable scope to the terminal as a response to the request message sent by the terminal;
    the Home SP for, upon receipt of a request for the roaming service of the terminal from the Visited SP, determining whether to authorize the roaming service of the terminal, and transmitting the result to the Visited SP; and
    the terminal for verifying the roaming authorization and the allowable scope for the individual roaming services, and receiving an enciphering key from the at least one of the Home SP and the Visited SP;

wherein the allowable scope for the individual services indicates at least one of an actual reception right of a service corresponding to the purchase item which the terminal is allowed to have, a reception possibility of the service, information on an occurrence of additional cost associated with a reception of the service, and information on a change in a charging system associated with the roaming of the terminal, wherein the Visited SP transmits a roaming request message to the Home SP based on the received the request message and receives a roaming response message from the Home SP based on the roaming request message, wherein the roaming response message includes the allowed scope of service and terminal subscription type information for determining in which class the roaming-requested terminal can receive services of the Visited SP, wherein the class agreed between the Home SP and the Visited SP.

15. The mobile broadcasting system of claim 14, wherein the Visited SP further transmits charging information for a roaming service to the terminal.

16. The mobile broadcasting system of claim 14, wherein the enciphering key is a long-term key.

17. A terminal in a mobile broadcasting system, comprising:

a controller for generating a request message for requesting a purchase item allowable for individual services based on a service guide received from a corresponding visited service provider (Visited SP), when the terminal moves to a roaming area, and deciphering a response message to the request; and a transceiver for transmitting the generated request message to at least one of a home service provider (Home SP) and the Visited SP, and receiving the response message from the at least one of the Home SP and the Visited SP as a response to the request message and transmitting the received response message to the controller, the response message including allowable scope for the individual services;

wherein the allowable scope for the individual services indicates at least one of an actual reception right of a service corresponding to the purchase item which the terminal is allowed to have, a reception possibility of the service, information on an occurrence of additional cost associated with a reception of the service, and information on a change in a charging system associated with the roaming of the terminal, wherein the Home SP transmits to the Visited SP terminal subscription type information for determining in which class the roaming-requested terminal can receive services of the Visited SP, wherein the class a reed between the Home SP and the Visited SP.

18. The terminal of claim 17, wherein the response message further includes charging information for a roaming service to the terminal.

* * * * *